(12) United States Patent
Chou et al.

(10) Patent No.: US 11,719,863 B2
(45) Date of Patent: *Aug. 8, 2023

(54) LIGHT BLOCKING SHEET, OPTICAL LENS SET, IMAGING LENS ASSEMBLY AND ELECTRONIC DEVICE

(71) Applicant: LARGAN PRECISION CO., LTD., Taichung (TW)

(72) Inventors: Ming-Ta Chou, Taichung (TW); Ming-Shun Chang, Taichung (TW); Chih-Wen Hsu, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 285 days.

This patent is subject to a terminal disclaimer.

(21) Appl. No.: 17/076,849

(22) Filed: Oct. 22, 2020

(65) Prior Publication Data

US 2021/0041606 A1   Feb. 11, 2021

Related U.S. Application Data

(63) Continuation of application No. 16/252,611, filed on Jan. 19, 2019, now Pat. No. 10,845,507, which is a (Continued)

(30) Foreign Application Priority Data

Feb. 24, 2017   (TW) .................................. 106106466
Apr. 24, 2017   (TW) .................................. 106113646

(51) Int. Cl.
  *G02B 5/00*   (2006.01)
  *G02B 7/02*   (2021.01)
  (Continued)

(52) U.S. Cl.
  CPC ............. *G02B 5/005* (2013.01); *G02B 7/021* (2013.01); *G02B 7/09* (2013.01); *G02B 9/08* (2013.01);
  (Continued)

(58) Field of Classification Search
  CPC ...... G02B 5/005; G02B 27/0988; G02B 7/02; G02B 7/021; G02B 9/08; G02B 5/00;
  (Continued)

(56) References Cited

U.S. PATENT DOCUMENTS 9,304,233 B2   4/2016   Kim
9,400,383 B2   7/2016   Liang
(Continued)

FOREIGN PATENT DOCUMENTS

TW   M490029 U   11/2014

*Primary Examiner* — William R Alexander
(74) *Attorney, Agent, or Firm* — McClure, Qualey & Rodack, LLP

(57) ABSTRACT

A light blocking sheet having a central axis includes a central hole and a plurality of inner extended portions. The central axis passes through the central hole, which is enclosed by a hole inner surface. The hole inner surface has a first corresponding circle and a second corresponding circle, wherein a diameter of the first corresponding circle is greater than a diameter of the second corresponding circle. The inner extended portions are adjacent to and surround the central hole, wherein each of the inner extended portions is extended and tapered from the first corresponding circle towards the second corresponding circle and includes an inner surface, and the inner surface includes a line pair. The line pair includes two line sections, wherein one end of one line section thereof and one end of the other line section thereof are towards the second corresponding circle and approach to each other.

7 Claims, 44 Drawing Sheets

Related U.S. Application Data continuation of application No. 15/635,380, filed on Jun. 28, 2017, now Pat. No. 10,228,497.

(51) Int. Cl.
    *G03B 9/02*     (2021.01)
    *G02B 27/09*     (2006.01)
    *G02B 27/00*     (2006.01)
    *G02B 7/09*     (2021.01)
    *G02B 9/08*     (2006.01)
    *H04N 23/54*     (2023.01)

(52) U.S. Cl.
    CPC ..... *G02B 27/0018* (2013.01); *G02B 27/0988* (2013.01); *G03B 9/02* (2013.01); *G02B 5/003* (2013.01); *H04N 23/54* (2023.01)

(58) Field of Classification Search
    CPC ...... G02B 5/003; G02B 7/09; G02B 27/0018; G03B 9/00; G03B 9/02; G03B 7/085; G03B 9/04; G03B 9/06; H04N 23/54
    USPC .......................................................... 359/740
See application file for complete search history.

(56) References Cited

U.S. PATENT DOCUMENTS

| | | | |
|---|---|---|---|
| 10,228,497 B2* | 3/2019 | Chou | G02B 5/005 |
| 10,845,507 B2* | 11/2020 | Chou | G02B 27/0018 |
| 2015/0253532 A1 | 9/2015 | Lin | |
| 2015/0253569 A1* | 9/2015 | Lin | G02B 5/003 |
| | | | 359/503 |
| 2016/0170204 A1* | 6/2016 | Liang | G02B 7/021 |
| | | | 359/738 |
| 2017/0176730 A1 | 6/2017 | Ford et al. | |
| 2017/0227735 A1 | 8/2017 | Chou | |
| 2018/0003959 A1 | 1/2018 | Lin et al. | |
| 2018/0024309 A1 | 1/2018 | Wei | |
| 2018/0106983 A1 | 4/2018 | Tsai et al. | |
| 2018/0129011 A1 | 5/2018 | Tsai et al. | |
| 2019/0121049 A1* | 4/2019 | Yoshida | G02B 7/02 |

* cited by examiner

LIGHT BLOCKING SHEET, OPTICAL LENS SET, IMAGING LENS ASSEMBLY AND ELECTRONIC DEVICE

RELATED APPLICATIONS

The present application is a continuation of the application Ser. No. 16/252,611, filed on Jan. 19, 2019, U.S. Pat. No. 10,845,507, issued on Nov. 24, 2020, which is a continuation of the application Ser. No. 15/635,380, filed on Jun. 28, 2017, U.S. Pat. No. 10,228,497 issued on Mar. 12, 2019, and claims priority to Taiwan Application Serial Numbers 106106466, filed on Feb. 24, 2017, and 106113646, filed on Apr. 24, 2017, the entire contents of which are hereby incorporated herein by reference.

BACKGROUND

Technical Field

The present disclosure relates to a light blocking sheet, an optical lens set and an imaging lens assembly. More particularly, the present disclosure relates to a light blocking sheet, an optical lens set and an imaging lens assembly which are applicable to portable electronic devices.

Description of Related Art

In general, besides the lens elements disposed in an imaging lens assembly, a light blocking sheet is often provided between two lens elements for blocking the unwanted light in the imaging lens assembly. FIG. 16 is a schematic view and also a top view of a conventional light blocking sheet 90. In FIG. 16, a central axis z of the conventional light blocking sheet 90 passes through a central hole 91, which is enclosed by a hole inner surface 92, and an entire of the hole inner surface 92 is annular and circular. However, the reflected light from the hole inner surface 92 usually results in the unwanted residual light around the image, and thereby the stray light reflection becomes more intense to affect the image quality.

Given the above, how to improve the hole inner surfaces of the light blocking sheets, so as to reduce the unwanted residual light around the image and the stray light reflection caused by the light blocking sheets has become one of the important subjects.

SUMMARY

According to one aspect of the present disclosure, a light blocking sheet having a central axis includes a central hole and a plurality of inner extended portions. The central axis passes through the central hole, which is enclosed by a hole inner surface. The hole inner surface has a first corresponding circle and a second corresponding circle, wherein a diameter of the first corresponding circle is greater than a diameter of the second corresponding circle. The inner extended portions are adjacent to and surround the central hole, wherein each of the inner extended portions is extended and tapered from the first corresponding circle towards the second corresponding circle and includes an inner surface, and the inner surface includes a line pair. The line pair includes two line sections, wherein one end of one line section thereof and one end of the other line section thereof are towards the second corresponding circle and approach to each other, and the other end of the one line section and the other end of the other line section are towards the first corresponding circle and far away from each other. When the diameter of the first corresponding circle is $\varphi1$, the diameter of the second corresponding circle is $\varphi2$, a distance between two ends of the inner surface of each of the inner extended portions is w, and an angle between the two line sections of the line pair is $\theta$, the following conditions are satisfied: $\varphi1 > \varphi2$; $0.02 < \pi \times (\varphi1 - \varphi2)/(2 \times w) < 0.9$; and 129 degrees $< \theta <$ 177 degrees.

According to another aspect of the present disclosure, an optical lens set includes the light blocking sheet according to the foregoing aspect and at least two lens elements. One lens element thereof includes a first connecting structure, wherein the first connecting structure includes a first receiving surface and a first conical surface. Another lens element thereof includes a second connecting structure, wherein the second connecting structure includes a second receiving surface and a second conical surface, the first receiving surface and the second receiving surface are corresponding and connected to each other, the first conical surface and the second conical surface are corresponding and connected to each other, the first connecting structure and the second connecting structure are for aligning the one lens element and the another lens element with the central axis, and an outer diameter of the light blocking sheet is smaller than an outer diameter of the one lens element and an outer diameter of the another lens element. A receiving space is defined by the one lens element and the another lens element, wherein the receiving space is closer to the central axis than both the first conical surface and the second conical surface are to the central axis. The light blocking sheet is received in the receiving space. The outer diameter of the light blocking sheet is smaller than or equal to a minimum diameter of the first conical surface and a minimum diameter of the second conical surface.

According to another aspect of the present disclosure, an imaging lens assembly includes the optical lens set according to the foregoing aspect and a plastic barrel. The optical lens set with the light blocking sheet is disposed along the central axis in the plastic barrel. The plastic barrel includes a barrel hole, wherein a minimum diameter position of the barrel hole and the central hole of the light blocking sheet are corresponding to each other along the central axis.

According to another aspect of the present disclosure, an electronic device includes the imaging lens assembly according to the foregoing aspect and an image sensor, wherein the image sensor is disposed on an image surface of the imaging lens assembly.

According to another aspect of the present disclosure, an imaging lens assembly includes an optical lens set and a plastic barrel. The optical lens set includes the light blocking sheet according to the foregoing aspect and at least two lens elements, wherein the light blocking sheet is disposed between one lens element thereof and another lens element thereof. The optical lens set with the light blocking sheet is disposed along the central axis in the plastic barrel. The plastic barrel includes a barrel hole, wherein a minimum diameter position of the barrel hole and the central hole of the light blocking sheet are corresponding to each other along the central axis.

According to another aspect of the present disclosure, an electronic device includes the imaging lens assembly according to the foregoing aspect and an image sensor, wherein the image sensor is disposed on an image surface of the imaging lens assembly.

According to another aspect of the present disclosure, a light blocking sheet having a central axis includes a central hole and a plurality of inner extended portions. The central axis passes through the central hole, which is enclosed by a hole inner surface. The hole inner surface has a first corresponding circle and a second corresponding circle, wherein a diameter of the first corresponding circle is greater than a diameter of the second corresponding circle. The inner extended portions are adjacent to and surround the central hole, wherein each of the inner extended portions is extended and tapered from the first corresponding circle towards the second corresponding circle and includes an inner surface, and the inner surface includes an arc section. A middle point of the arc section is approach to the second corresponding circle, two ends of the arc section are extended towards the first corresponding circle, and a center of curvature of the arc section is farther from the central axis of the light blocking sheet than the arc section is from the central axis. When the diameter of the first corresponding circle is φ1, the diameter of the second corresponding circle is φ2, a distance between two ends of the inner surface of each of the inner extended portions is w, and an inverse radius of curvature of the arc section is R, the following conditions are satisfied: φ1>φ2; 0.02<π×(φ1−φ2)/(2×w) <0.9; and 0.015 mm<R<1.02 mm.

According to another aspect of the present disclosure, an optical lens set includes the light blocking sheet according to the foregoing aspect and at least two lens elements. One lens element thereof includes a first connecting structure, wherein the first connecting structure includes a first receiving surface and a first conical surface. Another lens element thereof includes a second connecting structure, wherein the second connecting structure includes a second receiving surface and a second conical surface, the first receiving surface and the second receiving surface are corresponding and connected to each other, the first conical surface and the second conical surface are corresponding and connected to each other, the first connecting structure and the second connecting structure are for aligning the one lens element and the another lens element with the central axis, and an outer diameter of the light blocking sheet is smaller than an outer diameter of the one lens element and an outer diameter of the another lens element. A receiving space is defined by the one lens element and the another lens element, wherein the receiving space is closer to the central axis than both the first conical surface and the second conical surface are to the central axis. The light blocking sheet is received in the receiving space. The outer diameter of the light blocking sheet is smaller than or equal to a minimum diameter of the first conical surface and a minimum diameter of the second conical surface.

According to another aspect of the present disclosure, an imaging lens assembly includes the optical lens set according to the foregoing aspect and a plastic barrel. The optical lens set with the light blocking sheet is disposed along the central axis in the plastic barrel. The plastic barrel includes a barrel hole, wherein a minimum diameter position of the barrel hole and the central hole of the light blocking sheet are corresponding to each other along the central axis.

According to another aspect of the present disclosure, an electronic device includes the imaging lens assembly according to the foregoing aspect and an image sensor, wherein the image sensor is disposed on an image surface of the imaging lens assembly.

According to another aspect of the present disclosure, an imaging lens assembly includes an optical lens set and a plastic barrel. The optical lens set includes the light blocking sheet according to the foregoing aspect and at least two lens elements, wherein the light blocking sheet is disposed between one lens element thereof and another lens element thereof. The optical lens set with the light blocking sheet is disposed along the central axis in the plastic barrel. The plastic barrel includes a barrel hole, wherein a minimum diameter position of the barrel hole and the central hole of the light blocking sheet are corresponding to each other along the central axis.

According to another aspect of the present disclosure, an electronic device includes the imaging lens assembly according to the foregoing aspect and an image sensor, wherein the image sensor is disposed on an image surface of the imaging lens assembly. The plastic barrel of the imaging lens assembly further includes an object-end portion, an image-end portion and a tube portion. The image-end portion is disposed opposite to the object-end portion and includes an outer image-end surface, wherein the outer image-end surface faces an image surface of the imaging lens assembly. The tube portion connects the object-end portion and the image-end portion. The minimum diameter position of the barrel hole is located at the object-end portion. When a distance parallel to the central axis between the minimum diameter position of the barrel hole and the outer image-end surface is T, and a distance parallel to the central axis between the central hole of the light blocking sheet and the minimum diameter position of the barrel hole is t, the following condition is satisfied: 0.01<t/T<0.5.

DETAILED DESCRIPTION

1st Embodiment

Figure 1A:
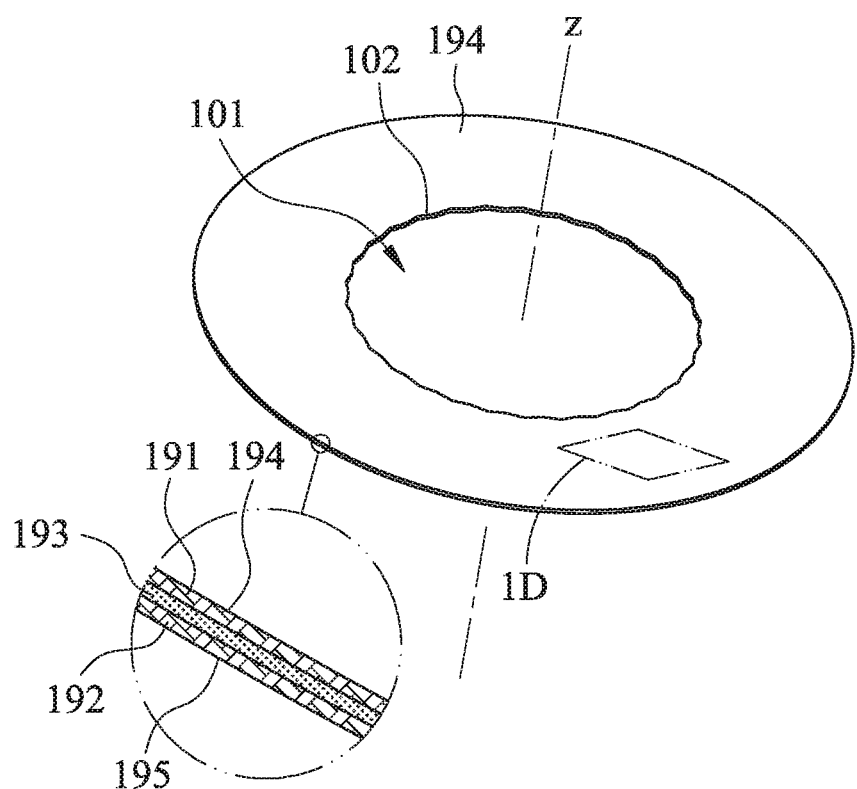
FIG. 1A is a three-dimensional view of a light blocking sheet according to the 1st embodiment of the present disclosure.
Figure 1B:
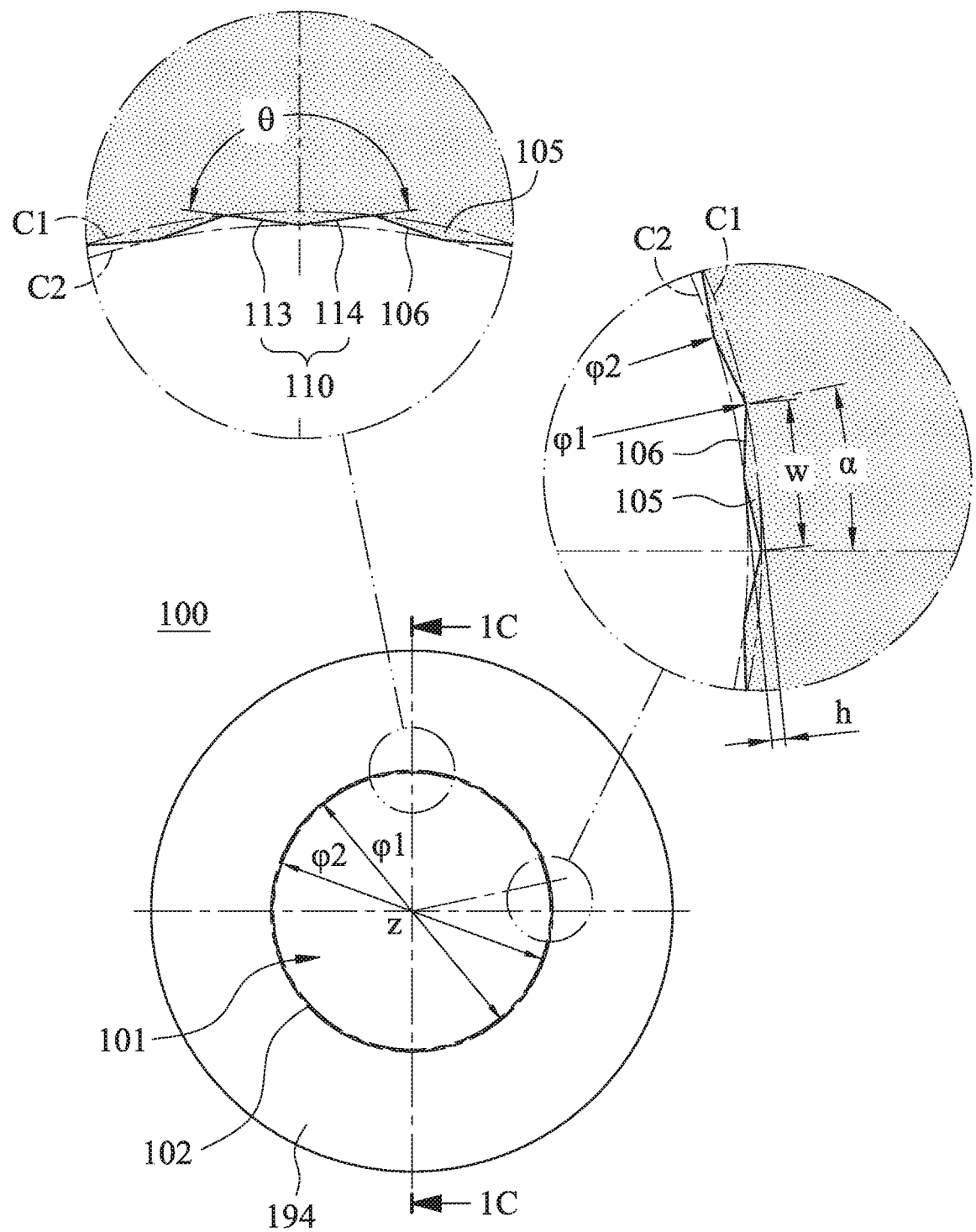
FIG. 1B is a top view of the light blocking sheet according to FIG. 1A.

FIG. 1A is a three-dimensional view of a light blocking sheet 100 according to the 1st embodiment of the present disclosure, and FIG. 1B is a top view of the light blocking sheet 100 according to FIG. 1A. In FIG. 1A and FIG. 1B, the light blocking sheet 100 having a central axis z includes a central hole 101 and a plurality of inner extended portions 105.

The central axis z passes through the central hole 101, which is enclosed by a hole inner surface 102. FIG. 1B can also be taken as a view of a cross-sectional plane of the light blocking sheet 100, wherein a normal direction of the cross-sectional plane is parallel to the central axis z, and all cross-sectional planes of the light blocking sheet 100 having normal directions parallel to the central axis z are the same. In FIG. 1B, the hole inner surface 102 has a first corresponding circle C1 and a second corresponding circle C2, wherein a diameter of the first corresponding circle C1 is greater than a diameter of the second corresponding circle C2. It can be said that the hole inner surface 102 defines the first corresponding circle C1 and the second corresponding circle C2. Specifically, the central hole 101 is non-circular. The hole inner surface 102 faces the central axis z, encloses the central hole 101, and is a continuously and non-circularly annular surface. In FIG. 1B, taking the central axis z as a center of a circle, the first corresponding circle C1 being virtual is formed by connecting a plurality of positions of the hole inner surface 102, and the second corresponding circle C2 being virtual is formed by connecting another plurality of positions of the hole inner surface 102, wherein the diameter of the first corresponding circle C1 is greater than the diameter of the second corresponding circle C2.

The inner extended portions 105 are adjacent to and surround the central hole 101, wherein each of the inner extended portions 105 is extended and tapered from the first corresponding circle C1 towards the second corresponding circle C2 and includes an inner surface 106, and the inner surface 106 includes a line pair 110. Furthermore, each of the inner surfaces 106 has two ends and a position between the two ends, the first corresponding circle C1 being virtual is formed by connecting all of the two ends of the inner surfaces 106, and the second corresponding circle C2 being virtual is formed by connecting all of the positions between the two ends of the inner surfaces 106. In the 1st embodiment, the geometric structures of all the inner extended portions 105 are the same, thus the geometric structures of all the inner surfaces 106 are the same. Each of the inner extended portions 105 is extended and tapered towards the central axis z. All the inner extended portions 105 are connected one by one to surround the central axis z. All the inner surfaces 106 are connected one by one to form an entire of the hole inner surface 102. In other embodiments (not shown in drawings) according to the present disclosure, geometric structures of a plurality of inner extended portions may not be the same. Geometric structures of a plurality of inner surfaces thereof may not be the same. The inner extended portions may not be connected one by one. The inner surfaces may not be connected one by one. That is, there may be a gap between two of the inner extended portions, and all the inner surfaces thereof together may only form part of a hole inner surface.

The line pair 110 of each of the inner surfaces 106 includes two line sections 113 and 114, wherein each of the line sections 113 and 114 is a part of the inner surface 106 and substantially a straight line. One end of the line section 113 and one end of the line section 114 are towards the second corresponding circle C2 and approach to each other, and the other end of the line section 113 and the other end of the line section 114 are towards the first corresponding circle C1 and far away from each other. Furthermore, the specific ways according to the characteristics of this paragraph can be, for example, one end of one line section and one end of the other line section are approach to each other and located on the second corresponding circle C2, one end of one line section and one end of the other line section are approach and connected to each other, and located on the second corresponding circle C2, the other end of one line section and the other end of the other line section are far away from each other and located on the first corresponding circle C1, and so forth.

In the 1st embodiment, the one end of the line section 113 and the one end of the line section 114 are approach and connected to each other, and located on the second corresponding circle C2. The other end of the line section 113 and the other end of the line section 114 are far away from each other and located on the first corresponding circle C1. That is, the first corresponding circle C1 being virtual is formed by connecting all of the other ends of the line sections 113 and all of the other ends of the line sections 114, and the second corresponding circle C2 being virtual is formed by connecting all of the one ends of the line sections 113 and all of the one ends of the line sections 114. Furthermore, each of the inner surfaces 106 is only composed by the line pair 110. The line sections 113 and 114 are symmetrical with respect to a connection between the line sections 113 and 114, that is, the one end of the line section 113 and the one end of the line section 114 are connected to be the connection therebetween, which is also a middle point of the inner surface 106, and the other end of the line section 113 and the other end of the line section 114 are respectively the two ends of the inner surface 106. In other embodiments (not shown in drawings) according to the present disclosure, at least one inner surface may include not only a line pair but also an additional surface. One end of one line section thereof and one end of the other line section thereof are towards the second corresponding circle and approach to each other, while may not be connected to each other and may not be located on the second corresponding circle. The other end of the one line section and the other end of the other line section are towards the first corresponding circle and far away from each other, while may not be located on the first corresponding circle.

In FIG. 1B, when the diameter of the first corresponding circle C1 is $\varphi 1$, the diameter of the second corresponding circle C2 is $\varphi 2$, a distance between the two ends of the inner surface 106 of each of the inner extended portions 105 is w, and an angle between the two line sections 113 and 114 of the line pair 110 is $\theta$, the following conditions are satisfied: $\varphi 1 > \varphi 2$; $0.02 < \pi \times (\varphi 1 - \varphi 2)/(2 \times w) < 0.9$; and 129 degrees $< \theta < 177$ degrees. Comparing with a technique of an inner surface of each inner extended portion including only one line section being overly long, the line pair 110 of the inner surface 106 of the present disclosure includes the two line sections 113 and 114. The line pair 110 is favorable for properly diverging a contracted beam of an intense light spot incident on the hole inner surface 102 of the light blocking sheet 100, so that the light flaws around the image, such as wave-shaped stripes, arc-shaped residual image and so on, which are not within an actual imaged object and caused by the unwanted residual light reflected from the hole inner surface 102 to an image surface, can be reduced. Furthermore, the angle $\theta$ between the two line sections 113 and 114 within the specific range is beneficial to maintain the manufacturing yield rate of the light blocking sheet 100 and enhance the image quality of the imaging lens assembly.

Moreover, a difference between a radius of the first corresponding circle C1 and a radius of the second corresponding circle C2 is h, which can be understood that "$h=(\varphi 1-\varphi 2)/2$" based on the forgoing paragraphs, the distance between the two ends of the inner surface 106 of each of the inner extended portions 105 is w, thus the aforementioned condition "$0.02<\pi \times(\varphi 1-\varphi 2)/(2 \times w)<0.9$" can be also shown as "$0.02<\pi \times h/w<0.9$". The angle $\theta$ is formed by the one end of the line section 113 and the one end of the line section 114, which are approach to each other, thus the two line sections 113 and 114 are approach to each other towards the central axis z. In the 1st embodiment, the distance w is also a distance between the other end of the line section 113 and the other end of the line section 114.

In detail, the light blocking sheet 100 with the inner extended portions 105 can be formed integrally. Therefore, it is favorable for the mass production of the light blocking sheet 100 and avoiding the extra manufacturing procedures.

When a number of the inner extended portions 105 is N, the following condition can be satisfied: $13<N<49$. If a number of the inner extended portions is out of the aforementioned range, the properties of blocking the specific stray light would be below the expectation. When a number of the inner extended portions is within the aforementioned range, the worse properties of blocking the stray light resulted from the quality deviations of the light blocking sheets in mass production can be avoided. It should be noted that the said stray light usually indicates a light other than the imaging light, due to the stray light after being reflected from the surfaces of the optical lens elements could not image on the image surface, while it could not be identified which the imaged object is corresponding to the stray light incident on the image surface. The stray light is generally called the ghost image, the glare or the flare. The stray light does not have positive contribution for the image quality and is also called unwanted light. In FIG. 1B, an angle with respect to the central axis z of the inner surface 106 of each of the inner extended portions 105 is $\alpha$. In the 1st embodiment, geometric structures of all the inner extended portions 105 are the same, the angle with respect to the central axis z of the inner surface 106 of each of the inner extended portions 105 is 12 degrees (i.e. the angle $\alpha$ is 12 degrees), and the number of the inner extended portions 105 is 30 (i.e. the number N is 30).

When the angle between the two line sections 113 and 114 of the line pair 110 is $\theta$, the following condition can be satisfied: 149 degrees $< \theta < 172$ degrees.

When the diameter of the first corresponding circle C1 is $\varphi 1$, the diameter of the second corresponding circle C2 is $\varphi 2$, and the distance between the two ends of the inner surface 106 of each of the inner extended portions 105 is w, preferably, the following condition can be satisfied: $0.03<\pi \times (\varphi 1-\varphi 2)/(2 \times w)<0.6$. Therefore, the inner extended portions 105 satisfying the aforementioned condition have less impact on the imaging from the imaged object under a low light condition, so that a better imaging performance of the imaged object under the low light condition can be provided. More preferably, the following condition can be satisfied: $0.05<\pi \times(\varphi 1-\varphi 2)/(2 \times w)<0.45$.

When the diameter of the first corresponding circle C1 is $\varphi 1$, and the diameter of the second corresponding circle C2 is $\varphi 2$, preferably, the following condition can be satisfied: $0.005 \text{ mm}<(\varphi 1-\varphi 2)<0.19 \text{ mm}$. Therefore, it is favorable for preventing the light blocking sheet 100 from overly blocking light. Overly blocking light does not only affect the specification of the imaging lens assembly, but also influence the imaging performance of night photography. More preferably, the following condition can be satisfied: $0.01 \text{ mm}< (\varphi 1-\varphi 2)<0.07 \text{ mm}$.

Figure 1C:
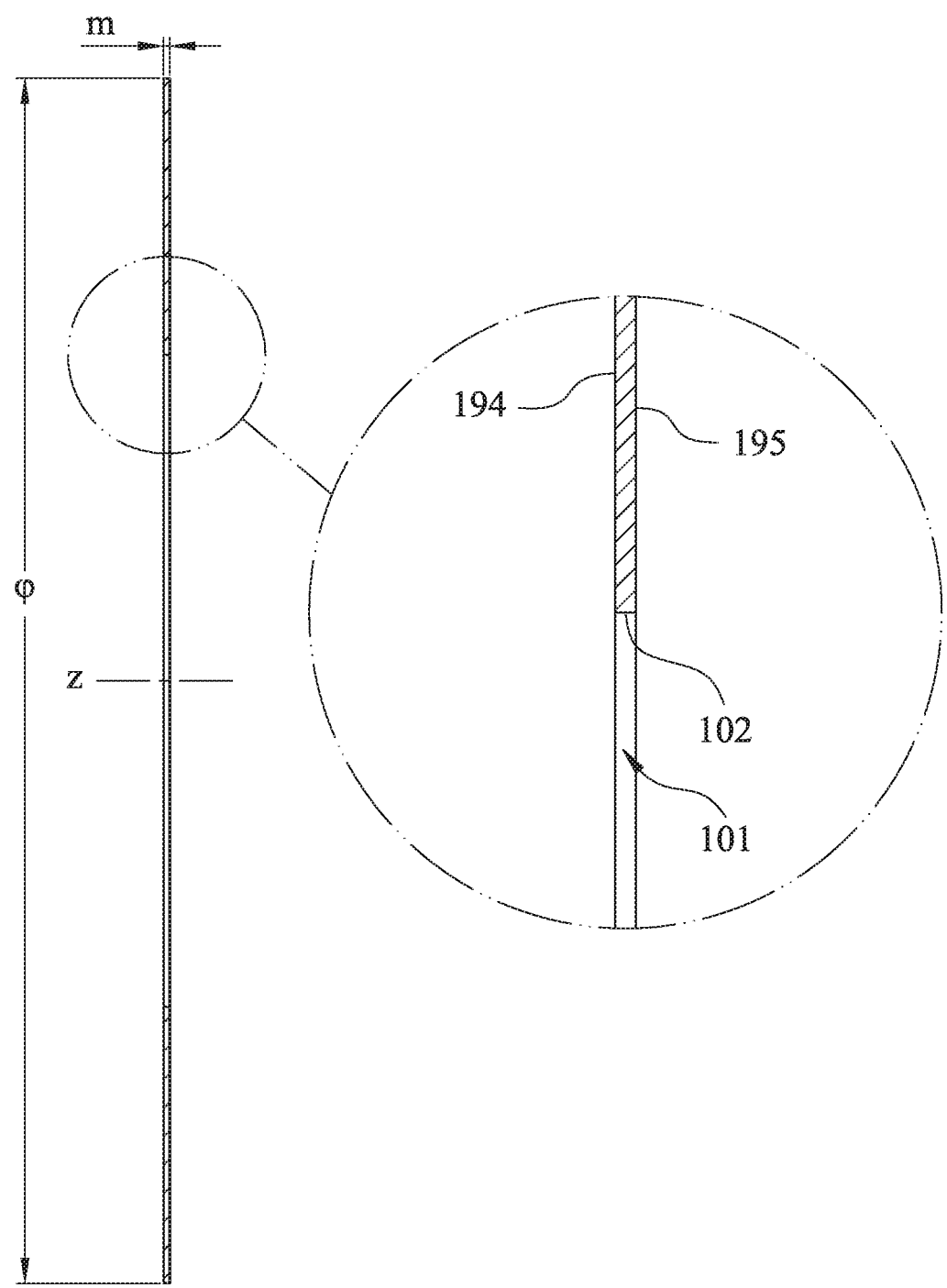
FIG. 1C is a cross-sectional view along line 1C-1C of FIG. 1B.

FIG. 1C is a cross-sectional view along line 1C-1C of FIG. 1B. In FIG. 1C, an outer diameter of the light blocking sheet 100 is $\varphi$, and a thickness of the light blocking sheet 100 is m.

Figure 1D:
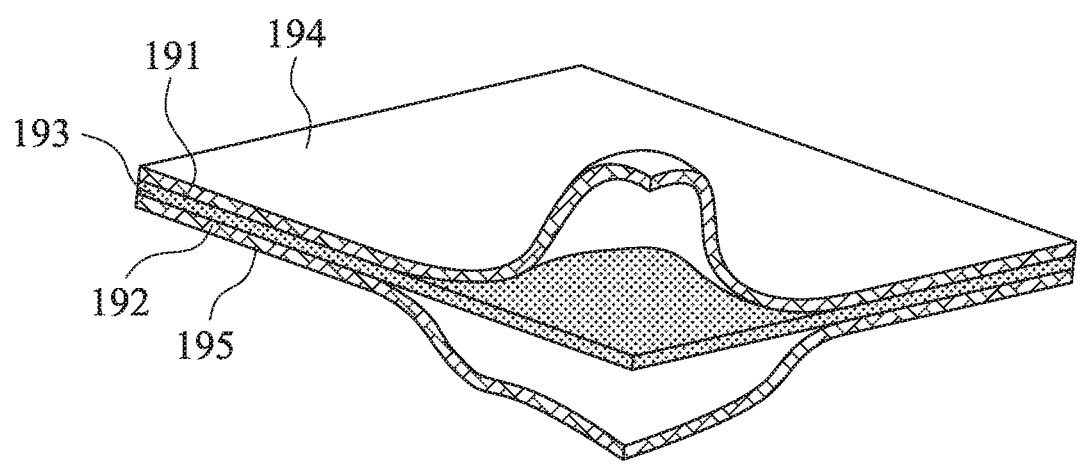
FIG. 1D is a separation schematic view of part 1D in FIG. 1A.

FIG. 1D is a separation schematic view of part 1D in FIG. 1A. In FIG. 1A and FIG. 1D, the light blocking sheet 100 can be a composite light blocking sheet. In the 1st embodiment, the light blocking sheet 100 is the composite light blocking sheet and may specifically further include a first outer layer 191, a second outer layer 192 and an inner substrate layer 193, wherein the first outer layer 191 includes a first outer surface 194, the second outer layer 192 includes a second outer surface 195, the inner substrate layer 193 is disposed between the first outer layer 191 and the second outer layer 192, the inner substrate layer 193 connects the first outer layer 191 and the second outer layer 192, and the first outer surface 194 and the second outer surface 195 are located opposite to each other on the light blocking sheet 100. Therefore, it is favorable for attenuating the stray light.

In FIG. 1D, it further shows the relationship among the first outer layer 191, the second outer layer 192 and the inner substrate layer 193, wherein the first outer layer 191 and the second outer layer 192 are torn by an external force and are distorted due to a non-uniform extension. However, under normal circumstance, the first outer layer 191 is tightly connected with the second outer layer 192 via the inner substrate layer 193 as shown in FIG. 1A. Thus, a composite material used for the light blocking sheet 100 can be provided by a tape type based on the manufacturing method, wherein the composite material can have a uniform thickness by controlling the manufacturing process of the inner substrate layer. Moreover, it is favorable to prevent the composite material from warping and to obtain a flat composite material being a thin film, which is favorable to maintain a thin thickness of the light blocking sheet 100.

The inner substrate layer 193 can be made of a plastic material, and each of the first outer layer 191 and the second outer layer 192 can be made of a black carbon-containing material. Therefore, it is favorable for satisfying the requirements of low reflection and light diminishing appearance of the light blocking sheet 100. Specifically, the plastic material can be black or transparent polycarbonate (PC), polyethylene terephthalate (PET), polymethylmethacrylate (PMMA) or a combination thereof.

The data of the aforementioned parameters of the light blocking sheet 100 according to the 1st embodiment of the present disclosure are listed in the following Table 1, wherein the parameters are also shown as FIG. 1B and FIG. 1C.

TABLE 1

1st Embodiment

| | | | |
|---|---|---|---|
| φ1 (mm) | 1.65 | θ (deg.) | 165 |
| φ2 (mm) | 1.618 | N | 30 |
| φ1 − φ2 (mm) | 0.032 | α (deg.) | 12 |
| h (mm) | 0.016 | φ (mm) | 3.05 |
| w (mm) | 0.172 | m (mm) | 0.016 |
| π × (φ1 − φ2)/(2 × w) | 0.29 | | |

2nd Embodiment

Figure 2A:
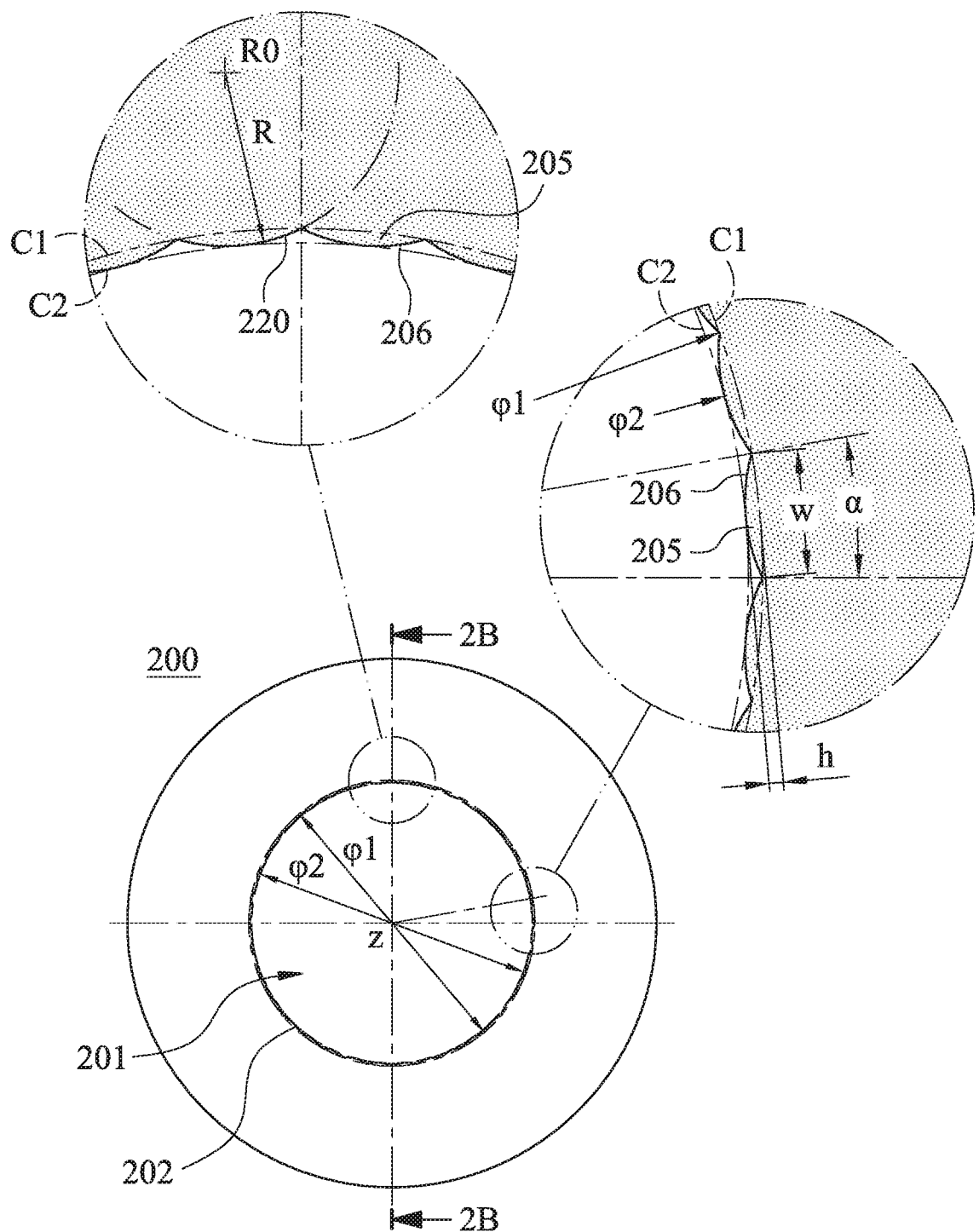
FIG. 2A is a top view of a light blocking sheet according to the 2nd embodiment of the present disclosure.

FIG. 2A is a top view of a light blocking sheet 200 according to the 2nd embodiment of the present disclosure. In FIG. 2A, the light blocking sheet 200 having a central axis z includes a central hole 201 and a plurality of inner extended portions 205.

The central axis z passes through the central hole 201, which is enclosed by a hole inner surface 202. FIG. 2A can also be taken as a view of a cross-sectional plane of the light blocking sheet 200, wherein a normal direction of the cross-sectional plane is parallel to the central axis z, and all cross-sectional planes of the light blocking sheet 200 having normal directions parallel to the central axis z are the same. In FIG. 2A, the hole inner surface 202 has a first corresponding circle C1 and a second corresponding circle C2, wherein a diameter of the first corresponding circle C1 is greater than a diameter of the second corresponding circle C2. Specifically, the central hole 201 is non-circular. The hole inner surface 202 faces the central axis z, encloses the central hole 201, and is a continuously and non-circularly annular surface. In FIG. 2A, taking the central axis z as a center of a circle, the first corresponding circle C1 being virtual is formed by connecting a plurality of positions of the hole inner surface 202, and the second corresponding circle C2 being virtual is formed by connecting another plurality of positions of the hole inner surface 202, wherein the diameter of the first corresponding circle C1 is greater than the diameter of the second corresponding circle C2.

The inner extended portions 205 are adjacent to and surround the central hole 201, wherein each of the inner extended portions 205 is extended and tapered from the first corresponding circle C1 towards the second corresponding circle C2 and includes an inner surface 206, and the inner surface 206 includes an arc section 220. Furthermore, each of the inner surfaces 206 has two ends and a position between the two ends, the first corresponding circle C1 being virtual is formed by connecting all of the two ends of the inner surfaces 206, and the second corresponding circle C2 being virtual is formed by connecting all of the positions between the two ends of the inner surfaces 206. In the 2nd embodiment, the geometric structures of all the inner extended portions 205 are the same, thus the geometric structures of all the inner surfaces 206 are the same. Each of the inner extended portions 205 is extended and tapered towards the central axis z. All the inner extended portions 205 are connected one by one to surround the central axis z. All the inner surfaces 206 are connected one by one to form an entire of the hole inner surface 202. In other embodiments (not shown in drawings) according to the present disclosure, geometric structures of a plurality of inner extended portions may not be the same. Geometric structures of a plurality of inner surfaces thereof may not be the same. The inner extended portions may not be connected one by one. The inner surfaces may not be connected one by one. That is, there may be a gap between two of the inner extended portions, and all the inner surfaces thereof together may only form part of a hole inner surface.

In FIG. 2A, a middle point of the arc section 220 is approach to the second corresponding circle C2, two ends of the arc section 220 are extended towards the first corresponding circle C1, and a center R0 of curvature of the arc section 220 is farther from the central axis z of the light blocking sheet 200 than the arc section 220 is from the central axis z. Furthermore, the specific ways according to the characteristics of this paragraph can be, for example, a middle point of an arc section is located on the second corresponding circle, two ends of the arc section are extended towards and located on the first corresponding circle, and so forth.

In the 2nd embodiment, the middle point of the arc section 220 is located on the second corresponding circle C2, and the two ends of the arc section 220 are extended towards and located on the first corresponding circle C1. The center R0 of curvature of the arc section 220 is farther from the central axis z of the light blocking sheet 200 than the arc section 220 is from the central axis z, that is, the arc section 220 has an inverse radius of curvature. The inverse radius of curvature according to the present disclosure indicates an arc direction of an arc section is opposite to an arc direction of a central axis of a light blocking sheet, that is, a center of curvature of the arc section is farther from the central axis than the arc section is from the central axis. Therefore, a plurality of inner extended portions according to the present disclosure is advantageous to provide a realer image for an imaged object of an intense light spot, which is at least similar to the imaged object of the intense light spot by visually seen when photographing with an imaging lens assembly.

In the 2nd embodiment, the first corresponding circle C1 being virtual is formed by connecting all of the two ends of the arc sections 220, and the second corresponding circle C2 being virtual is formed by connecting all of the middle points of the arc sections 220. Furthermore, each of the inner surfaces 206 is only composed by the arc section 220, and the two ends of the arc section 220 are respectively the two ends of the inner surface 206. In other embodiments (not shown in drawings) according to the present disclosure, at least one inner surface may include not only an arc section but also an additional surface. A middle point of an arc section is approach to the second corresponding circle, while may not be located on the second corresponding circle. Two ends of the arc section are extended towards the first corresponding circle, while may not be located on the first corresponding circle.

In FIG. 2A, when the diameter of the first corresponding circle is $\varphi 1$, the diameter of the second corresponding circle is $\varphi 2$, a distance between two ends of the inner surface 206 of each of the inner extended portions 205 is w, and an inverse radius of curvature of the arc section 220 is R, the following conditions are satisfied: $\varphi 1 > \varphi 2$; $0.02 < \pi \times (\varphi 1 - \varphi 2)/(2 \times w) < 0.9$; and $0.015\ mm < R < 1.02\ mm$. Therefore, the inner surface 206 with the arc section 220 can prevent the inner surface 206 from including an overly long line section, which may simultaneously reflect contracted beams of an intense light spot to an image surface, so as to result in weak unwanted residual light around an image of the intense light spot. Furthermore, the arc section 220 particularly with a shape of the inverse radius of curvature is advantageous to effectively diverge the stray light to further reduce the weak unwanted residual light.

Moreover, a difference between a radius of the first corresponding circle C1 and a radius of the second corresponding circle C2 is h, which can be understood that "$h = (\varphi 1 - \varphi 2)/2$" based on the forgoing paragraphs, the distance between the two ends of the inner surface 206 of each of the inner extended portions 205 is w, thus the condition aforementioned "$0.02 < \pi \times (\varphi 1 - \varphi 2)/(2 \times w) < 0.9$" can be also shown as "$0.02 < \pi \times h/w < 0.9$". In the 2nd embodiment, the distance w is also a distance between the two ends of the arc sections 220.

In detail, the light blocking sheet 200 with the inner extended portions 205 can be formed integrally. Therefore, it is favorable for the mass production of the light blocking sheet 200 and avoiding the extra manufacturing procedures.

When a number of the inner extended portions 205 is N, the following condition can be satisfied: $13 < N < 49$. If a number of the inner extended portions is out of the aforementioned range, the properties of blocking the specific stray light would be below the expectation. When a number of the inner extended portions is within the aforementioned range, the worse properties of blocking the stray light resulted from the quality deviations of the light blocking sheets in mass production can be avoided. In FIG. 2A, an angle with respect to the central axis z of the inner surface 206 of each of the inner extended portions 205 is a. In the 2nd embodiment, geometric structures of all the inner extended portions 205 are the same, the angle with respect to the central axis z of the inner surface 206 of each of the inner extended portions 205 is 10 degrees (i.e. the angle α is 10 degrees), and the number of the inner extended portions 205 is 36 (i.e. the number N is 36).

When the inverse radius of curvature of the arc section 220 is R, preferably, the following condition can be satisfied: $0.015\ mm < R < 0.55\ mm$. Therefore, the light blocking sheet 200 with the specific number of the inner extended portions 205 is advantageous to block the stray light of a larger range. More preferably, the following condition can be satisfied: $0.035\ mm < R < 0.3\ mm$.

When the diameter of the first corresponding circle C1 is $\varphi 1$, the diameter of the second corresponding circle C2 is $\varphi 2$, and the distance between the two ends of the inner surface 206 of each of the inner extended portions 205 is w, preferably, the following condition can be satisfied: $0.03 < \pi \times (\varphi 1 - \varphi 2)/(2 \times w) < 0.6$. Therefore, the inner extended portions 205 satisfying the aforementioned condition have less impact on the imaging from the imaged object under a low light condition, so that a better imaging performance of the imaged object under the low light condition can be provided. More preferably, the following condition can be satisfied: $0.05 < \pi \times (\varphi 1 - \varphi 2)/(2 \times w) < 0.45$.

When the diameter of the first corresponding circle C1 is $\varphi 1$, and the diameter of the second corresponding circle C2 is $\varphi 2$, preferably, the following condition can be satisfied: $0.005\ mm < (\varphi 1 - \varphi 2) < 0.19\ mm$. Therefore, it is favorable for preventing the light blocking sheet 200 from overly blocking light. Overly blocking light does not only affect the specification of the imaging lens assembly, but also influence the imaging performance of night photography. More preferably, the following condition can be satisfied: $0.01\ mm < (\varphi 1 - \varphi 2) < 0.07\ mm$.

The light blocking sheet 200 may be a composite light blocking sheet. Furthermore, the material arrangement of the light blocking sheet 200 may be the same as the material arrangement of the light blocking sheet 100 of the 1st embodiment according to the present disclosure, shown as FIG. 1A and FIG. 1D.

Figure 2B:
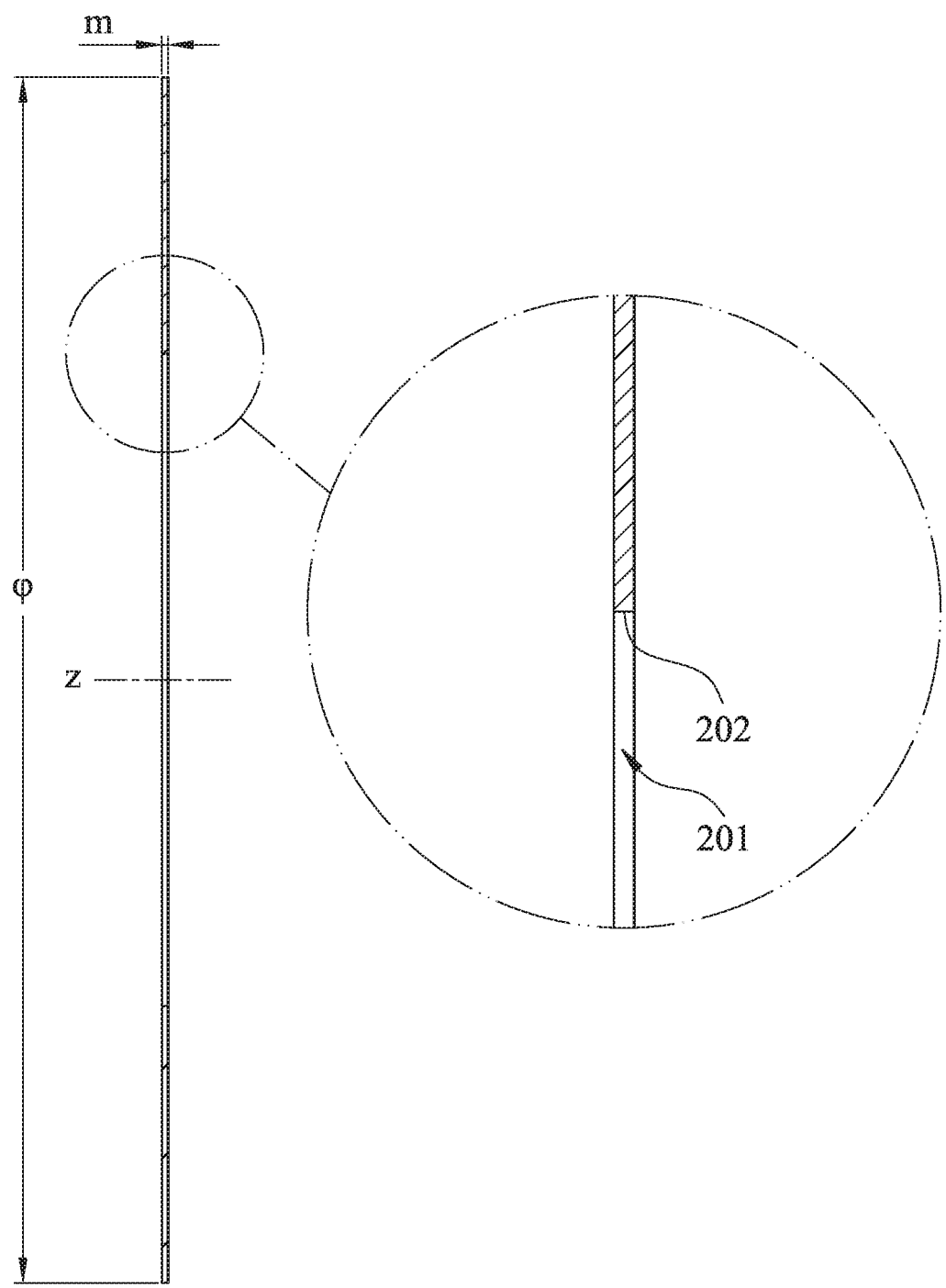
FIG. 2B is a cross-sectional view along line 2B-2B of FIG. 2A.

FIG. 2B is a cross-sectional view along line 2B-2B of FIG. 2A. In FIG. 2B, an outer diameter of the light blocking sheet 200 is $\varphi$, and a thickness of the light blocking sheet 200 is m. The data of the aforementioned parameters of the light blocking sheet 200 according to the 2nd embodiment of the present disclosure are listed in the following Table 2, wherein the parameters are also shown as FIG. 2A and FIG. 2B.

TABLE 2

2nd Embodiment

| $\varphi 1$ (mm) | 1.65 | R (mm) | 0.2 |
|---|---|---|---|
| $\varphi 2$ (mm) | 1.617 | N | 36 |
| $\varphi 1 - \varphi 2$ (mm) | 0.033 | α (deg.) | 10 |
| h (mm) | 0.0165 | $\varphi$ (mm) | 3.05 |
| w (mm) | 0.144 | m (mm) | 0.016 |
| $\pi \times (\varphi 1 - \varphi 2)/(2 \times w)$ | 0.36 | | |

3rd Embodiment

Figure 3A:
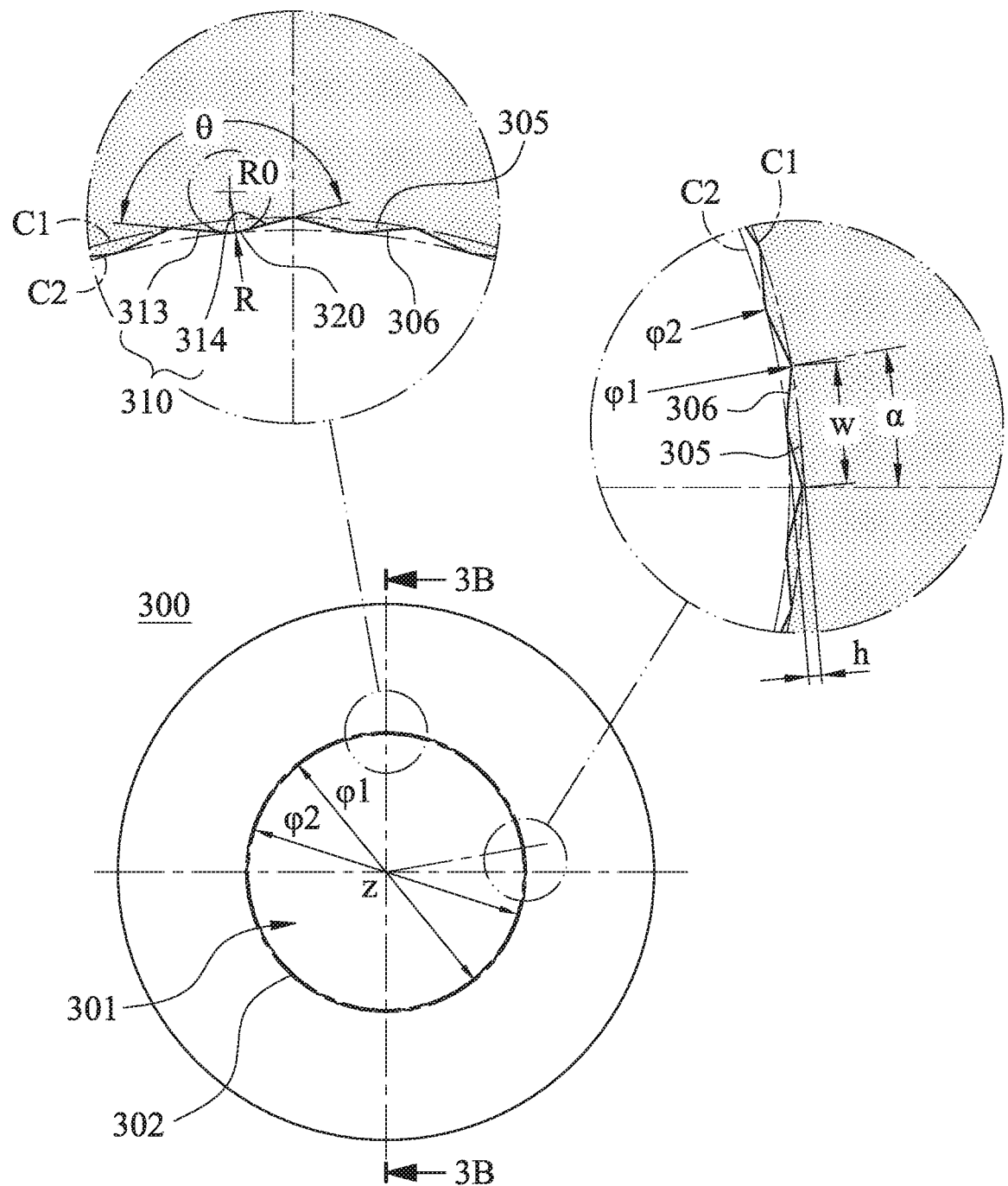
FIG. 3A is a top view of a light blocking sheet according to the 3rd embodiment of the present disclosure.

FIG. 3A is a top view of a light blocking sheet 300 according to the 3rd embodiment of the present disclosure. In FIG. 3A, the light blocking sheet 300 having a central axis z includes a central hole 301 and a plurality of inner extended portions 305.

The central axis z passes through the central hole 301, which is enclosed by a hole inner surface 302. FIG. 3A can also be taken as a view of a cross-sectional plane of the light blocking sheet 300, wherein a normal direction of the cross-sectional plane is parallel to the central axis z, and all cross-sectional planes of the light blocking sheet 300 having normal directions parallel to the central axis z are the same. In FIG. 3A, the hole inner surface 302 has a first corresponding circle C1 and a second corresponding circle C2, wherein a diameter of the first corresponding circle C1 is greater than a diameter of the second corresponding circle C2.

The inner extended portions 305 are adjacent to and surround the central hole 301, wherein each of the inner extended portions 305 is extended and tapered from the first corresponding circle C1 towards the second corresponding circle C2 and includes an inner surface 306, and the inner surface 306 includes an line pair 310 and an arc section 320. Furthermore, each of the inner surfaces 306 has two ends and a position between the two ends, the first corresponding circle C1 being virtual is formed by connecting all of the two ends of the inner surfaces 306, and the second corresponding circle C2 being virtual is formed by connecting all of the positions between the two ends of the inner surfaces 306. In the 3rd embodiment, the geometric structures of all the inner extended portions 305 are the same, thus the geometric structures of all the inner surfaces 306 are the same. Each of the inner extended portions 305 is extended and tapered towards the central axis z. All the inner extended portions 305 are connected one by one to surround the central axis z. All the inner surfaces 306 are connected one by one to form an entire of the hole inner surface 302.

The line pair 310 of each of the inner surfaces 306 includes two line sections 313 and 314, wherein each of the line sections 313 and 314 is a part of the inner surface 306 and substantially a straight line. One end of the line section 313 and one end of the line section 314 are towards the second corresponding circle C2 and approach to each other, and the other end of the line section 313 and the other end of the line section 314 are towards the first corresponding circle C1 and far away from each other.

In FIG. 3A, a middle point of the arc section 320 is approach to the second corresponding circle C2, and two ends of the arc section 320 are extended towards the first corresponding circle C1. A center R0 of curvature of the arc section 320 is farther from the central axis z of the light blocking sheet 300 than the arc section 320 is from the central axis z, that is, the arc section 320 has an inverse radius of curvature.

In the 3rd embodiment, the middle point of the arc section 320 is approach to and further located on the second corresponding circle C2. The two ends of the arc section 320 are extended towards the first corresponding circle C1, and respectively connected to the one end of the line section 313 and the one end of the line section 314. The one end of the line section 313 and the one end of the line section 314 are towards the second corresponding circle C2, approach to each other, and respectively connected to the two ends of the arc section 320. The other end of the line section 313 and the other end of the line section 314 are towards and further located on the first corresponding circle C1, and far away from each other.

In the 3rd embodiment, the first corresponding circle C1 being virtual is formed by connecting all of the other ends of the line sections 313 and all of the other ends of the line sections 314, and the second corresponding circle C2 being virtual is formed by connecting all of the middle points of the arc sections 320. Furthermore, each of the inner surfaces 306 is composed of the line section 313, the arc section 320 and the line section 314. The other end of the line section 313 and the other end of the line section 314 are respectively the two ends of the inner surface 306.

In the 3rd embodiment, a distance between the two ends of the inner surface 306 of each of the inner extended portions 305 is w, wherein the distance w is also a distance between the other end of the line section 313 and the other end of the line section 314. Moreover, an angle between the two line sections 313 and 314 is θ, wherein the one end of the line section 313 and the one end of the line section 314 are not connected or overlapped, and thus the angle is formed between the two line sections 313 and 314 being shifted or extended. The light blocking sheet 300 with the inner extended portions 305 is formed integrally. The light blocking sheet 300 may be a composite light blocking sheet. Furthermore, the material arrangement of the light blocking sheet 300 may be the same as the material arrangement of the light blocking sheet 100 of the 1st embodiment according to the present disclosure, shown as FIG. 1A and FIG. 1D.

Figure 3B:
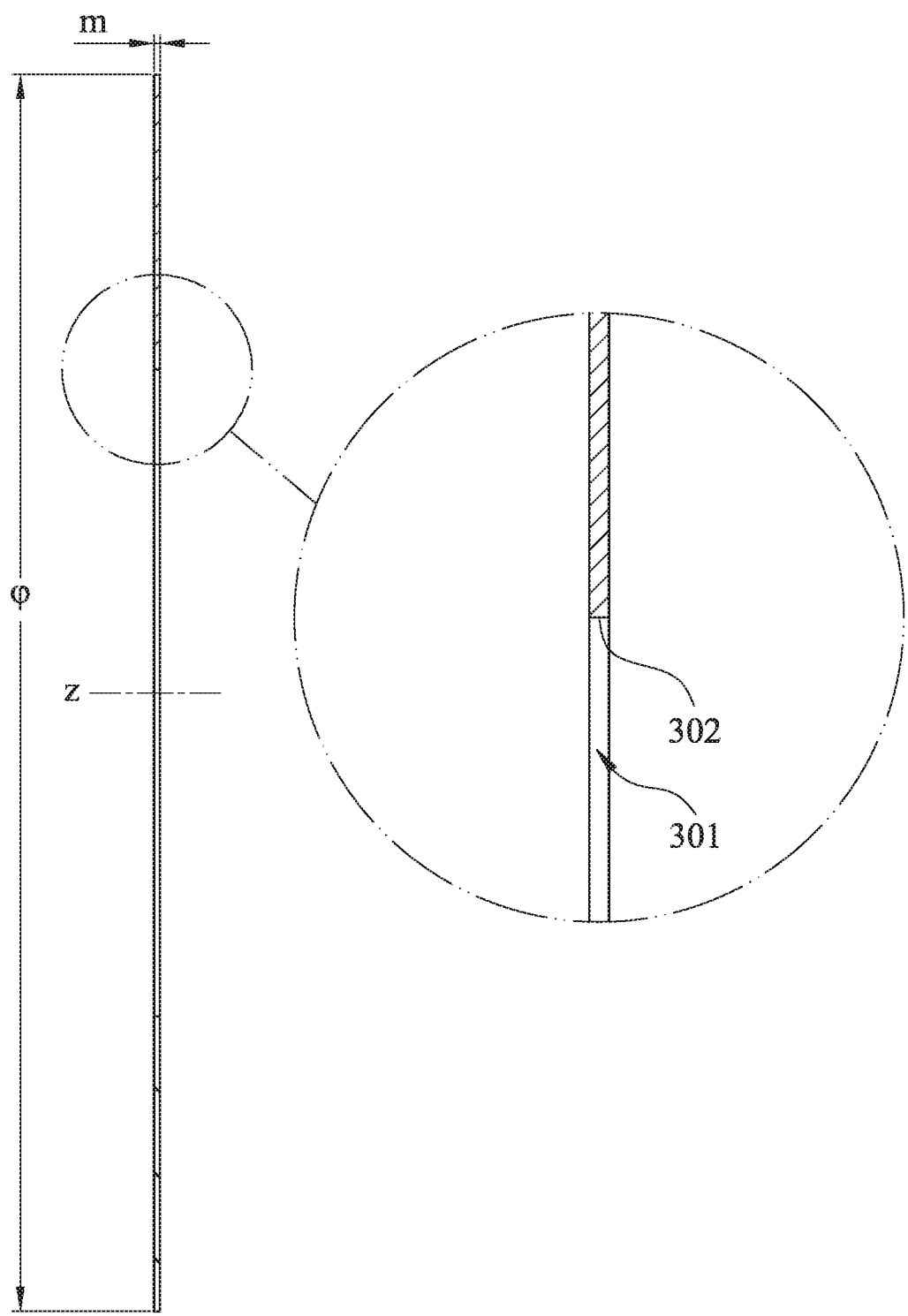
FIG. 3B is a cross-sectional view along line 3B-3B of FIG. 3A.

FIG. 3B is a cross-sectional view along line 3B-3B of FIG. 3A. In FIG. 3B, an outer diameter of the light blocking sheet 300 is φ, and a thickness of the light blocking sheet 300 is m. The data of the parameters φ1, φ2, φ1−φ2, h, w, π×(φ1−φ2)/(2×w), θ, R, N, α, φ and m of the light blocking sheet 300 according to the 3rd embodiment of the present disclosure are listed in the following Table 3, wherein the parameters are also shown as FIG. 3A and FIG. 3B. The definitions of these parameters shown in Table 3 are the same as those stated in the light blocking sheet 100 of the 1st embodiment and the light blocking sheet 200 of the 2nd embodiment with corresponding values for the light blocking sheet 300.

TABLE 3

| 3rd Embodiment | | | |
|---|---|---|---|
| φ1 (mm) | 1.7 | θ (deg.) | 160 |
| φ2 (mm) | 1.669 | R (mm) | 0.05 |
| φ1 − φ2 (mm) | 0.031 | N | 36 |
| h (mm) | 0.0155 | α (deg.) | 10 |
| w (mm) | 0.148 | φ (mm) | 3.25 |
| π × (φ1 − φ2)/(2 × w) | 0.329 | m (mm) | 0.016 |

4th Embodiment

Figure 4A:
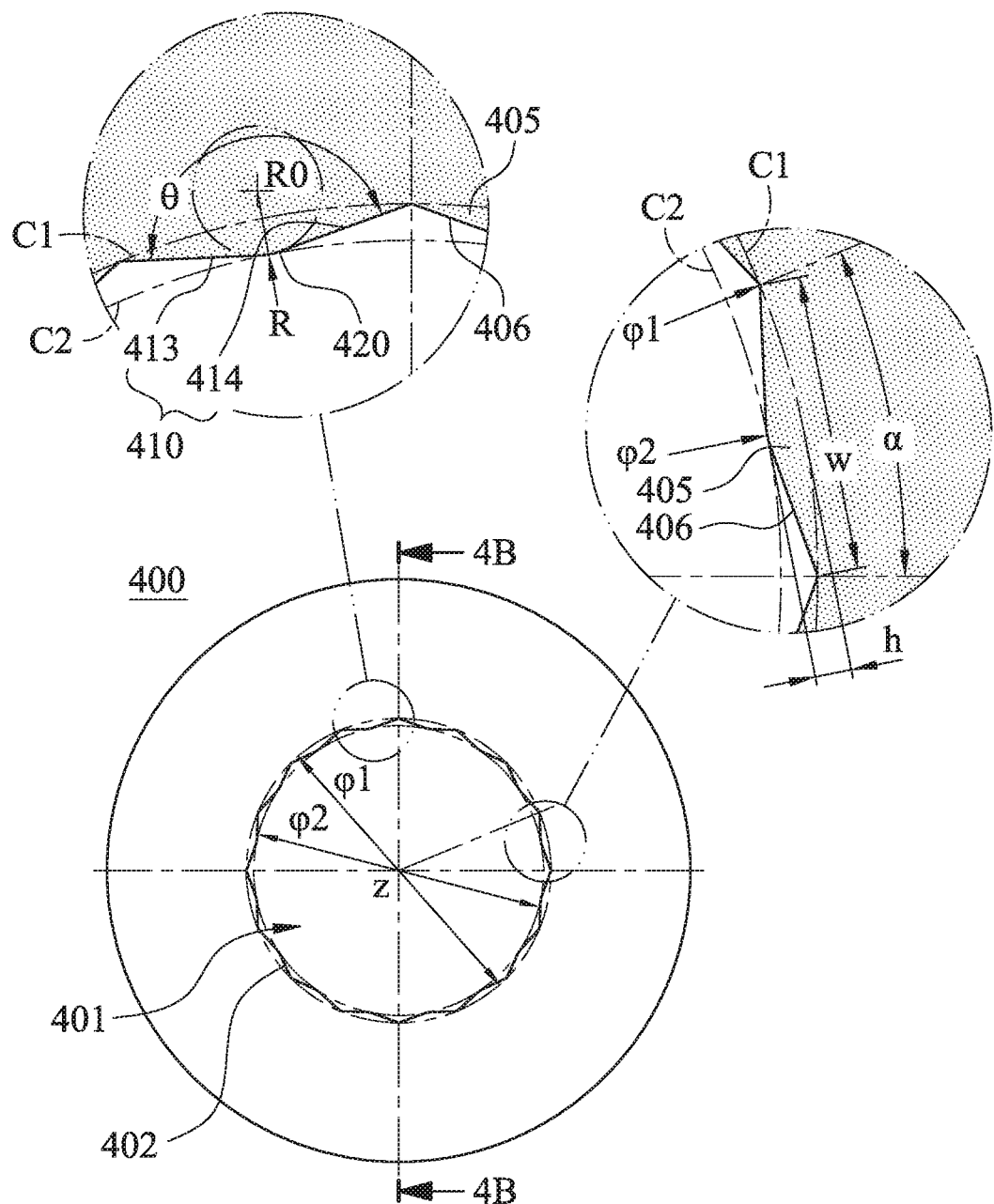
FIG. 4A is a top view of a light blocking sheet according to the 4th embodiment of the present disclosure.

FIG. 4A is a top view of a light blocking sheet 400 according to the 4th embodiment of the present disclosure. In FIG. 4A, the light blocking sheet 400 having a central axis z includes a central hole 401 and a plurality of inner extended portions 405.

The central axis z passes through the central hole 401, which is enclosed by a hole inner surface 402. FIG. 4A can also be taken as a view of a cross-sectional plane of the light blocking sheet 400, wherein a normal direction of the cross-sectional plane is parallel to the central axis z, and all cross-sectional planes of the light blocking sheet 400 having normal directions parallel to the central axis z are the same. In FIG. 4A, the hole inner surface 402 has a first corresponding circle C1 and a second corresponding circle C2, wherein a diameter of the first corresponding circle C1 is greater than a diameter of the second corresponding circle C2.

The inner extended portions 405 are adjacent to and surround the central hole 401, wherein each of the inner extended portions 405 is extended and tapered from the first corresponding circle C1 towards the second corresponding circle C2 and includes an inner surface 406, and the inner surface 406 includes an line pair 410 and an arc section 420. Furthermore, each of the inner surfaces 406 has two ends and a position between the two ends, the first corresponding circle C1 being virtual is formed by connecting all of the two ends of the inner surfaces 406, and the second corresponding circle C2 being virtual is formed by connecting all of the positions between the two ends of the inner surfaces 406. In the 4th embodiment, the geometric structures of all the inner extended portions 405 are the same, thus the geometric structures of all the inner surfaces 406 are the same. Each of the inner extended portions 405 is extended and tapered towards the central axis z. All the inner extended portions 405 are connected one by one to surround the central axis z. All the inner surfaces 406 are connected one by one to form an entire of the hole inner surface 402.

The line pair 410 of each of the inner surfaces 406 includes two line sections 413 and 414, wherein each of the line sections 413 and 414 is a part of the inner surface 406 and substantially a straight line. One end of the line section 413 and one end of the line section 414 are towards the second corresponding circle C2 and approach to each other, and the other end of the line section 413 and the other end of the line section 414 are towards the first corresponding circle C1 and far away from each other.

In FIG. 4A, a middle point of the arc section 420 is approach to the second corresponding circle C2, and two ends of the arc section 420 are extended towards the first corresponding circle C1. A center R0 of curvature of the arc section 420 is farther from the central axis z of the light blocking sheet 400 than the arc section 420 is from the central axis z, that is, the arc section 420 has an inverse radius of curvature.

In the 4th embodiment, the middle point of the arc section 420 is approach to and further located on the second corresponding circle C2. The two ends of the arc section 420 are extended towards the first corresponding circle C1, and respectively connected to the one end of the line section 413 and the one end of the line section 414. The one end of the line section 413 and the one end of the line section 414 are towards the second corresponding circle C2, approach to each other, and respectively connected to the two ends of the arc section 420. The other end of the line section 413 and the other end of the line section 414 are towards and further located on the first corresponding circle C1, and far away from each other.

In the 4th embodiment, the first corresponding circle C1 being virtual is formed by connecting all of the other ends of the line sections 413 and all of the other ends of the line sections 414, and the second corresponding circle C2 being virtual is formed by connecting all of the middle points of the arc sections 420. Furthermore, each of the inner surfaces 406 is composed of the line section 413, the arc section 420 and the line section 414. The other end of the line section 413 and the other end of the line section 414 are respectively the two ends of the inner surface 406.

In the 4th embodiment, a distance between the two ends of the inner surface 406 of each of the inner extended portions 405 is w, wherein the distance w is also a distance between the other end of the line section 413 and the other end of the line section 414. The light blocking sheet 400 with the inner extended portions 405 is formed integrally. The light blocking sheet 400 may be a composite light blocking sheet. Furthermore, the material arrangement of the light blocking sheet 400 may be the same as the material arrangement of the light blocking sheet 100 of the 1st embodiment according to the present disclosure, shown as FIG. 1A and FIG. 1D.

Figure 4B:
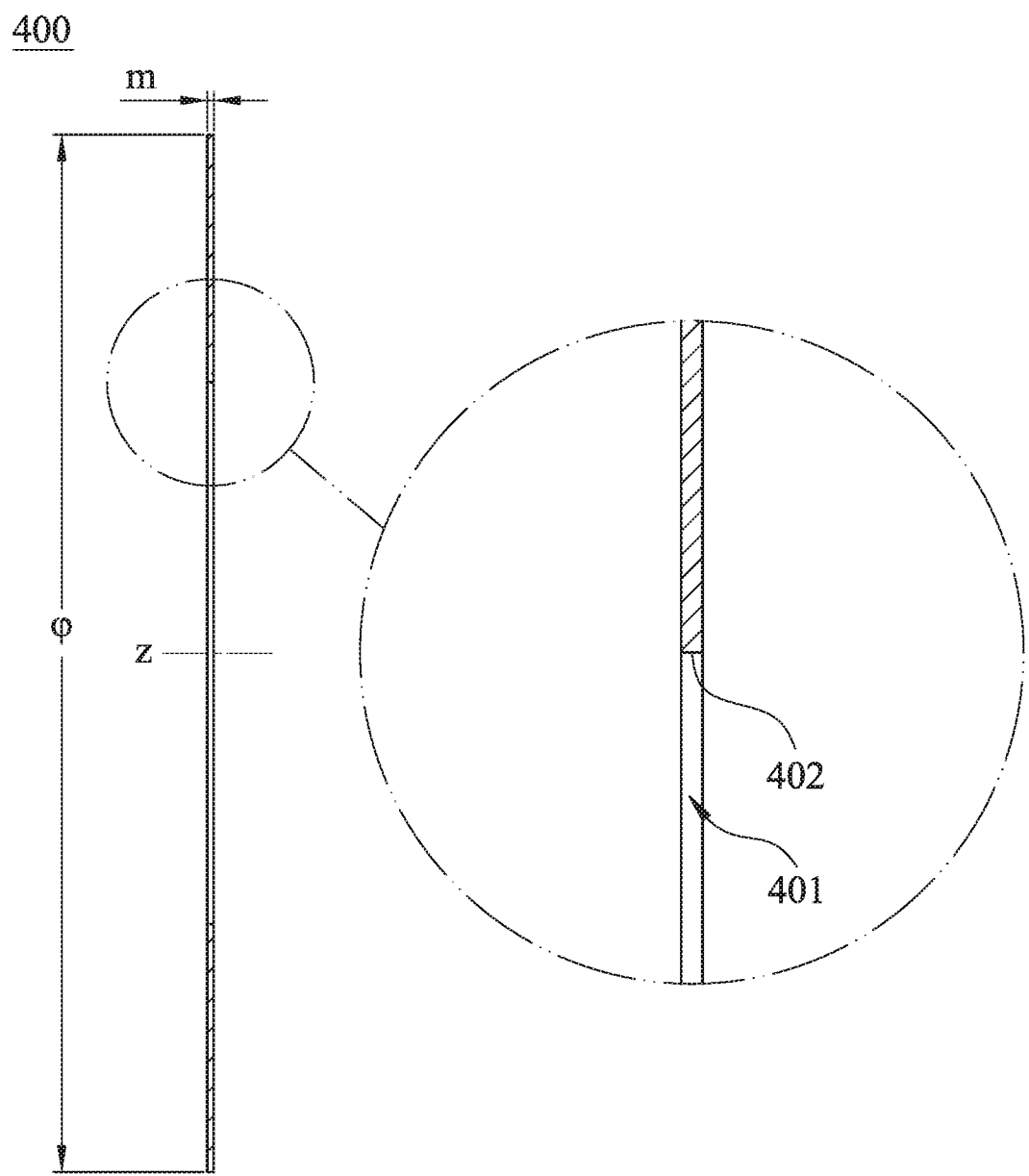
FIG. 4B is a cross-sectional view along line 4B-4B of FIG. 4A.

FIG. 4B is a cross-sectional view along line 4B-4B of FIG. 4A. In FIG. 4B, an outer diameter of the light blocking sheet 400 is $\varphi$, and a thickness of the light blocking sheet 400 is m. The data of the parameters $\varphi 1$, $\varphi 2$, $\varphi 1-\varphi 2$, h, w, $\pi \times (\varphi 1-\varphi 2)/(2 \times w)$, $\theta$, R, N, $\alpha$, $\varphi$ and m of the light blocking sheet 400 according to the 4th embodiment of the present disclosure are listed in the following Table 4, wherein the parameters are also shown as FIG. 4A and FIG. 4B. The definitions of these parameters shown in Table 4 are the same as those stated in the light blocking sheet 100 of the 1st embodiment and the light blocking sheet 200 of the 2nd embodiment with corresponding values for the light blocking sheet 400.

TABLE 4

| 4th Embodiment | | | |
|---|---|---|---|
| $\varphi 1$ (mm) | 1.88 | $\theta$ (deg.) | 162.5 |
| $\varphi 2$ (mm) | 1.789 | R (mm) | 0.08 |
| $\varphi 1 - \varphi 2$ (mm) | 0.091 | N | 16 |
| h (mm) | 0.0455 | $\alpha$ (deg.) | 22.5 |
| w (mm) | 0.367 | $\varphi$ (mm) | 3.6 |
| $\pi \times (\varphi 1 - \varphi 2)/(2 \times w)$ | 0.388 | m (mm) | 0.023 |

5th Embodiment

Figure 5A:
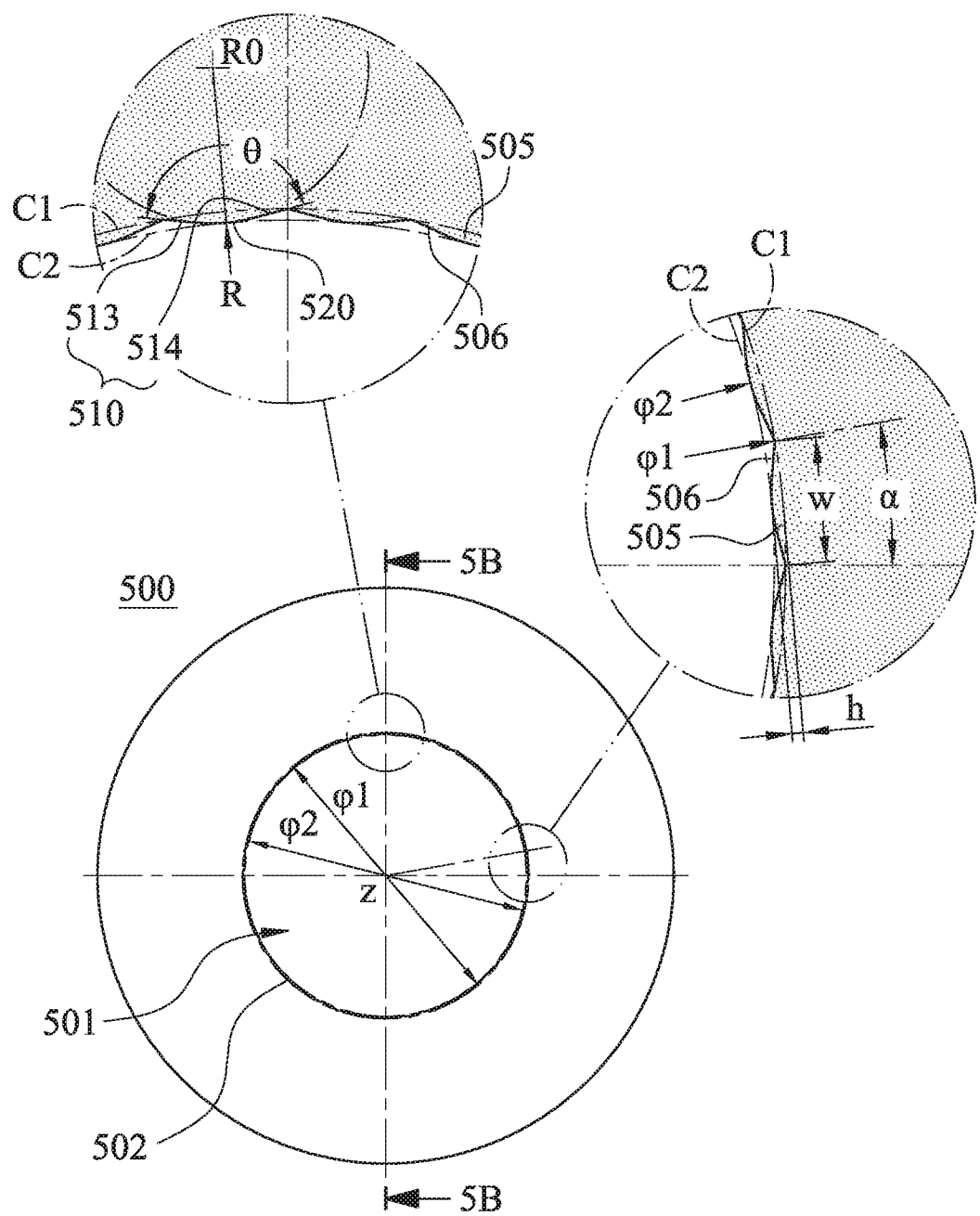
FIG. 5A is a top view of a light blocking sheet according to the 5th embodiment of the present disclosure.

FIG. 5A is a top view of a light blocking sheet 500 according to the 5th embodiment of the present disclosure. In FIG. 5A, the light blocking sheet 500 having a central axis z includes a central hole 501 and a plurality of inner extended portions 505.

The central axis z passes through the central hole 501, which is enclosed by a hole inner surface 502. FIG. 5A can also be taken as a view of a cross-sectional plane of the light blocking sheet 500, wherein a normal direction of the cross-sectional plane is parallel to the central axis z, and all cross-sectional planes of the light blocking sheet 500 having normal directions parallel to the central axis z are the same. In FIG. 5A, the hole inner surface 502 has a first corresponding circle C1 and a second corresponding circle C2, wherein a diameter of the first corresponding circle C1 is greater than a diameter of the second corresponding circle C2.

The inner extended portions 505 are adjacent to and surround the central hole 501, wherein each of the inner extended portions 505 is extended and tapered from the first corresponding circle C1 towards the second corresponding circle C2 and includes an inner surface 506, and the inner surface 506 includes an line pair 510 and an arc section 520. Furthermore, each of the inner surfaces 506 has two ends and a position between the two ends, the first corresponding circle C1 being virtual is formed by connecting all of the two ends of the inner surfaces 506, and the second corresponding circle C2 being virtual is formed by connecting all of the positions between the two ends of the inner surfaces 506. In the 5th embodiment, the geometric structures of all the inner extended portions 505 are the same, thus the geometric structures of all the inner surfaces 506 are the same. Each of the inner extended portions 505 is extended and tapered towards the central axis z. All the inner extended portions 505 are connected one by one to surround the central axis z. All the inner surfaces 506 are connected one by one to form an entire of the hole inner surface 502.

The line pair 510 of each of the inner surfaces 506 includes two line sections 513 and 514, wherein each of the line sections 513 and 514 is a part of the inner surface 506 and substantially a straight line. One end of the line section 513 and one end of the line section 514 are towards the second corresponding circle C2 and approach to each other, and the other end of the line section 513 and the other end of the line section 514 are towards the first corresponding circle C1 and far away from each other.

In FIG. 5A, a middle point of the arc section 520 is approach to the second corresponding circle C2, and two ends of the arc section 520 are extended towards the first corresponding circle C1. A center R0 of curvature of the arc section 520 is farther from the central axis z of the light blocking sheet 500 than the arc section 520 is from the central axis z, that is, the arc section 520 has an inverse radius of curvature.

In the 5th embodiment, the middle point of the arc section 520 is approach to and further located on the second corresponding circle C2. The two ends of the arc section 520 are extended towards the first corresponding circle C1, and respectively connected to the one end of the line section 513 and the one end of the line section 514. The one end of the line section 513 and the one end of the line section 514 are towards the second corresponding circle C2, approach to each other, and respectively connected to the two ends of the arc section 520. The other end of the line section 513 and the other end of the line section 514 are towards and further located on the first corresponding circle C1, and far away from each other.

In the 5th embodiment, the first corresponding circle C1 being virtual is formed by connecting all of the other ends of the line sections 513 and all of the other ends of the line sections 514, and the second corresponding circle C2 being virtual is formed by connecting all of the middle points of the arc sections 520. Furthermore, each of the inner surfaces 506 is composed of the line section 513, the arc section 520 and the line section 514. The other end of the line section 513 and the other end of the line section 514 are respectively the two ends of the inner surface 506.

In the 5th embodiment, a distance between the two ends of the inner surface 506 of each of the inner extended portions 505 is w, wherein the distance w is also a distance between the other end of the line section 513 and the other end of the line section 514. The light blocking sheet 500 with the inner extended portions 505 is formed integrally. The light blocking sheet 500 may be a composite light blocking sheet. Furthermore, the material arrangement of the light blocking sheet 500 may be the same as the material arrangement of the light blocking sheet 100 of the 1st embodiment according to the present disclosure, shown as FIG. 1A and FIG. 1D.

Figure 5B:
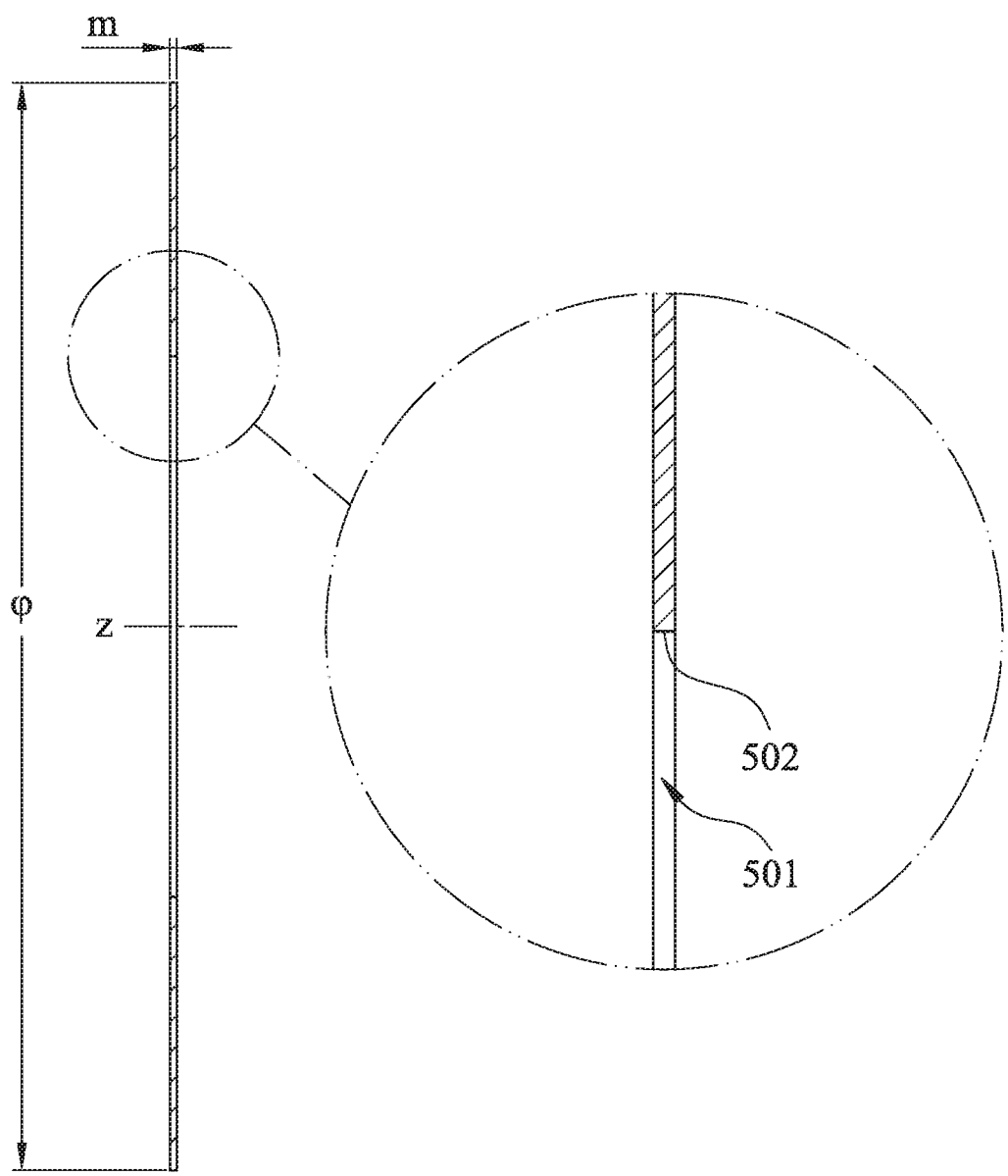
FIG. 5B is a cross-sectional view along line 5B-5B of FIG. 5A.

FIG. 5B is a cross-sectional view along line 5B-5B of FIG. 5A. In FIG. 5B, an outer diameter of the light blocking sheet 500 is φ, and a thickness of the light blocking sheet 500 is m. The data of the parameters φ1, φ2, φ1−φ2, h, w, π×(φ1−φ2)/(2×w), θ, R, N, α, φ and m of the light blocking sheet 500 according to the 5th embodiment of the present disclosure are listed in the following Table 5, wherein the parameters are also shown as FIG. 5A and FIG. 5B. The definitions of these parameters shown in Table 5 are the same as those stated in the light blocking sheet 100 of the 1st embodiment and the light blocking sheet 200 of the 2nd embodiment with corresponding values for the light blocking sheet 500.

TABLE 5

| 5th Embodiment | | | |
|---|---|---|---|
| φ1 (mm) | 1.84 | θ (deg.) | 160 |
| φ2 (mm) | 1.811 | R (mm) | 0.2 |
| φ1 − φ2 (mm) | 0.029 | N | 36 |
| h (mm) | 0.0145 | α (deg.) | 10.0 |
| w (mm) | 0.16 | φ (mm) | 3.7 |
| π × (φ1 − φ2)/(2 × w) | 0.287 | m (mm) | 0.023 |

6th Embodiment

Figure 6A:
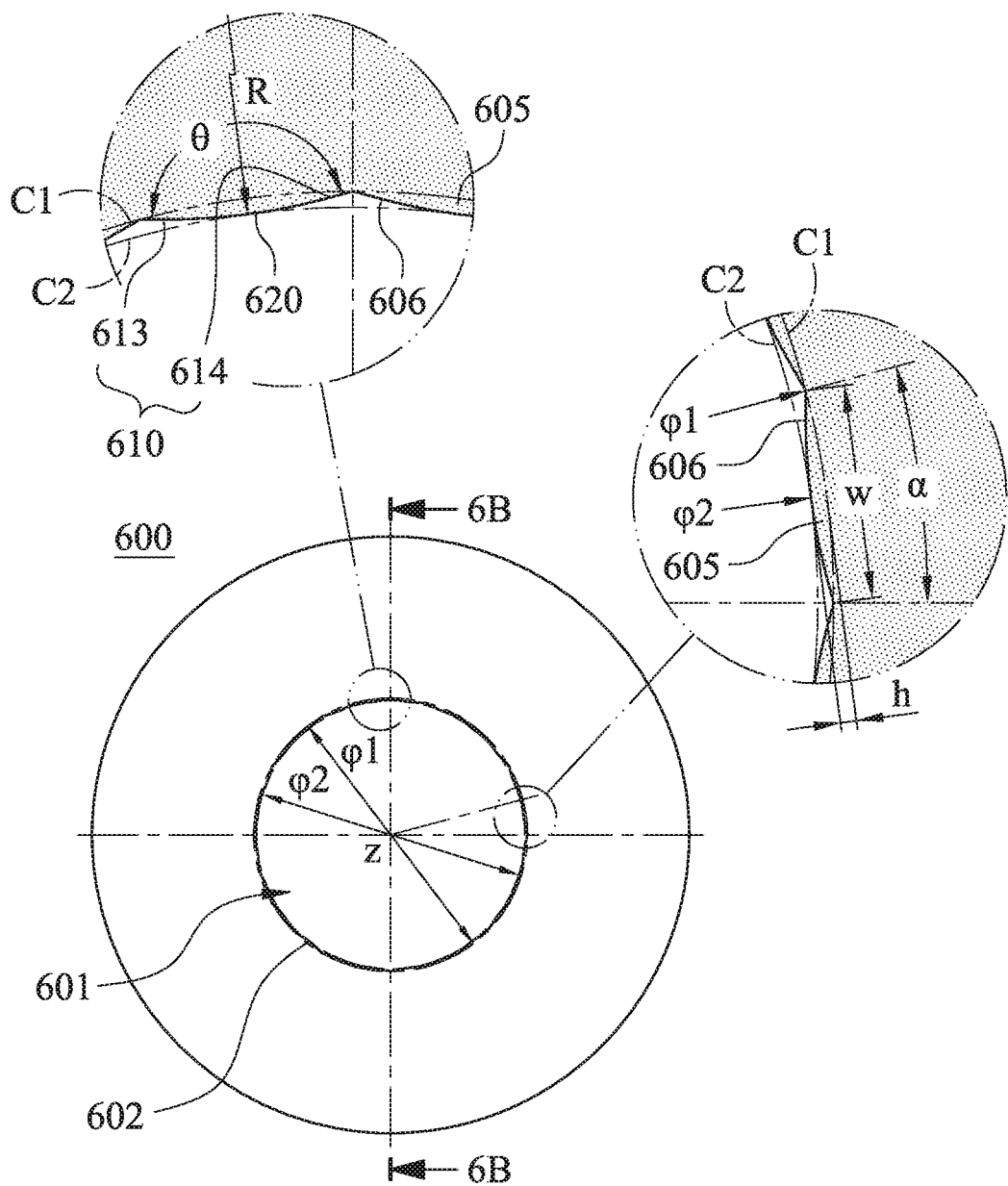
FIG. 6A is a top view of a light blocking sheet according to the 6th embodiment of the present disclosure.

FIG. 6A is a top view of a light blocking sheet 600 according to the 6th embodiment of the present disclosure. In FIG. 6A, the light blocking sheet 600 having a central axis z includes a central hole 601 and a plurality of inner extended portions 605.

The central axis z passes through the central hole 601, which is enclosed by a hole inner surface 602. FIG. 6A can also be taken as a view of a cross-sectional plane of the light blocking sheet 600, wherein a normal direction of the cross-sectional plane is parallel to the central axis z, and all cross-sectional planes of the light blocking sheet 600 having normal directions parallel to the central axis z are the same. In FIG. 6A, the hole inner surface 602 has a first corresponding circle C1 and a second corresponding circle C2, wherein a diameter of the first corresponding circle C1 is greater than a diameter of the second corresponding circle C2.

The inner extended portions 605 are adjacent to and surround the central hole 601, wherein each of the inner extended portions 605 is extended and tapered from the first corresponding circle C1 towards the second corresponding circle C2 and includes an inner surface 606, and the inner surface 606 includes an line pair 610 and an arc section 620. Furthermore, each of the inner surfaces 606 has two ends and a position between the two ends, the first corresponding circle C1 being virtual is formed by connecting all of the two ends of the inner surfaces 606, and the second corresponding circle C2 being virtual is formed by connecting all of the positions between the two ends of the inner surfaces 606. In the 6th embodiment, the geometric structures of all the inner extended portions 605 are the same, thus the geometric structures of all the inner surfaces 606 are the same. Each of the inner extended portions 605 is extended and tapered towards the central axis z. All the inner extended portions 605 are connected one by one to surround the central axis z. All the inner surfaces 606 are connected one by one to form an entire of the hole inner surface 602.

The line pair 610 of each of the inner surfaces 606 includes two line sections 613 and 614, wherein each of the line sections 613 and 614 is a part of the inner surface 606 and substantially a straight line. One end of the line section 613 and one end of the line section 614 are towards the second corresponding circle C2 and approach to each other, and the other end of the line section 613 and the other end of the line section 614 are towards the first corresponding circle C1 and far away from each other.

In FIG. 6A, a middle point of the arc section 620 is approach to the second corresponding circle C2, and two ends of the arc section 620 are extended towards the first corresponding circle C1. A center (not shown in drawings) of curvature of the arc section 620 is farther from the central axis z of the light blocking sheet 600 than the arc section 620 is from the central axis z, that is, the arc section 620 has an inverse radius of curvature.

In the 6th embodiment, the middle point of the arc section 620 is approach to and further located on the second corresponding circle C2. The two ends of the arc section 620 are extended towards the first corresponding circle C1, and respectively connected to the one end of the line section 613 and the one end of the line section 614. The one end of the line section 613 and the one end of the line section 614 are towards the second corresponding circle C2, approach to each other, and respectively connected to the two ends of the arc section 620. The other end of the line section 613 and the other end of the line section 614 are towards and further located on the first corresponding circle C1, and far away from each other.

In the 6th embodiment, the first corresponding circle C1 being virtual is formed by connecting all of the other ends of the line sections 613 and all of the other ends of the line sections 614, and the second corresponding circle C2 being virtual is formed by connecting all of the middle points of the arc sections 620. Furthermore, each of the inner surfaces 606 is composed of the line section 613, the arc section 620 and the line section 614. The other end of the line section 613 and the other end of the line section 614 are respectively the two ends of the inner surface 606.

In the 6th embodiment, a distance between the two ends of the inner surface 606 of each of the inner extended portions 605 is w, wherein the distance w is also a distance between the other end of the line section 613 and the other end of the line section 614. The light blocking sheet 600 with the inner extended portions 605 is formed integrally. The light blocking sheet 600 may be a composite light blocking sheet. Furthermore, the material arrangement of the light blocking sheet 600 may be the same as the material arrangement of the light blocking sheet 100 of the 1st embodiment according to the present disclosure, shown as FIG. 1A and FIG. 1D.

Figure 6B:
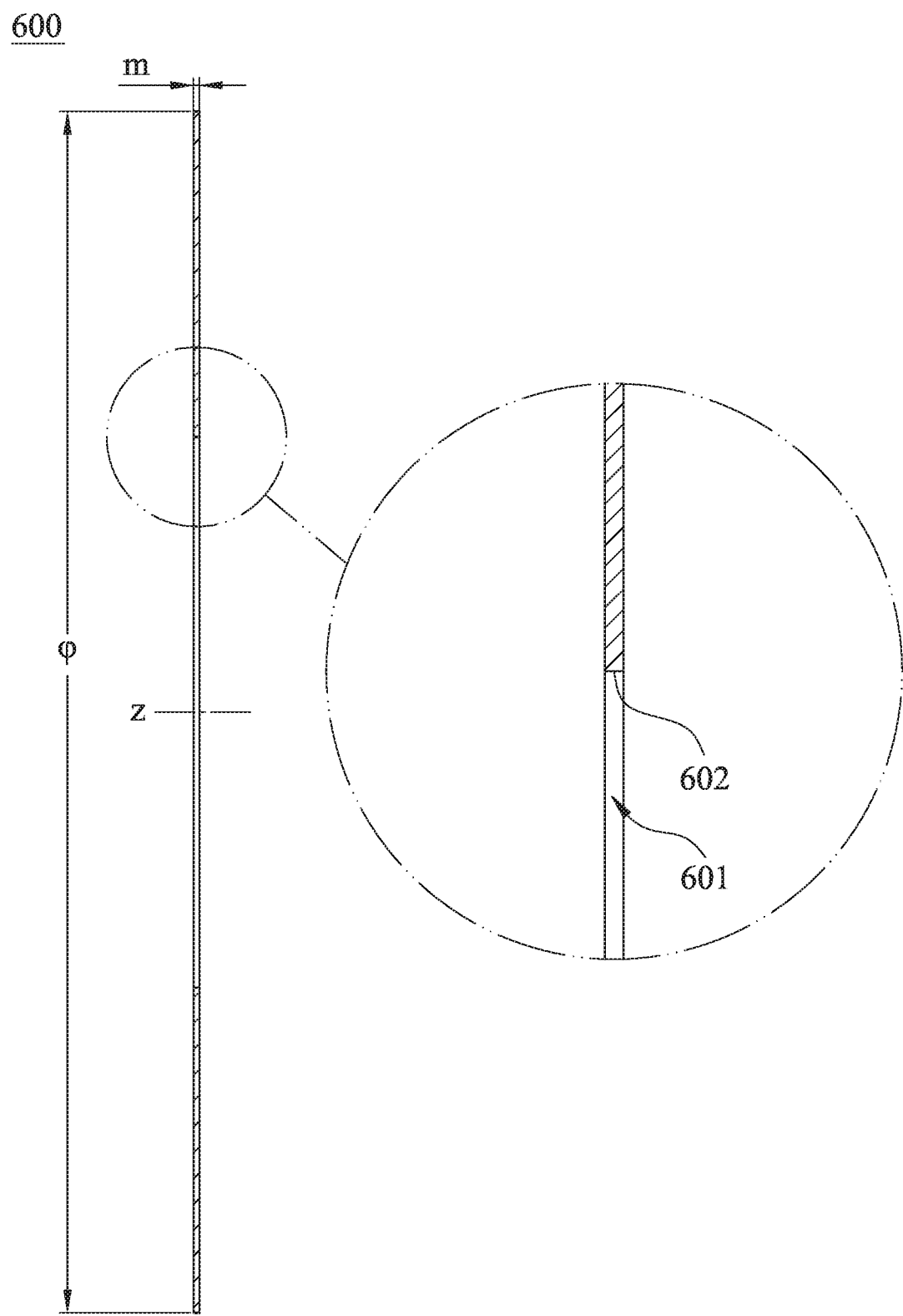
FIG. 6B is a cross-sectional view along line 6B-6B of FIG. 6A.

FIG. 6B is a cross-sectional view along line 6B-6B of FIG. 6A. In FIG. 6B, an outer diameter of the light blocking sheet 600 is $\varphi$, and a thickness of the light blocking sheet 600 is m. The data of the parameters $\varphi1$, $\varphi2$, $\varphi1-\varphi2$, h, w, $\pi \times (\varphi1-\varphi2)/(2 \times w)$, $\theta$, R, N, $\alpha$, $\varphi$ and m of the light blocking sheet 600 according to the 6th embodiment of the present disclosure are listed in the following Table 6, wherein the parameters are also shown as FIG. 6A and FIG. 6B. The definitions of these parameters shown in Table 6 are the same as those stated in the light blocking sheet 100 of the 1st embodiment and the light blocking sheet 200 of the 2nd embodiment with corresponding values for the light blocking sheet 600.

TABLE 6

6th Embodiment

| | | | |
|---|---|---|---|
| $\varphi1$ (mm) | 2.2 | $\theta$ (deg.) | 165 |
| $\varphi2$ (mm) | 2.157 | R (mm) | 0.8 |
| $\varphi1 - \varphi2$ (mm) | 0.043 | N | 24 |
| h (mm) | 0.0215 | $\alpha$ (deg.) | 15 |
| w (mm) | 0.287 | $\varphi$ (mm) | 4.8 |
| $\pi \times (\varphi1 - \varphi2)/(2 \times w)$ | 0.234 | m (mm) | 0.023 |

7th Embodiment

Figure 7A:
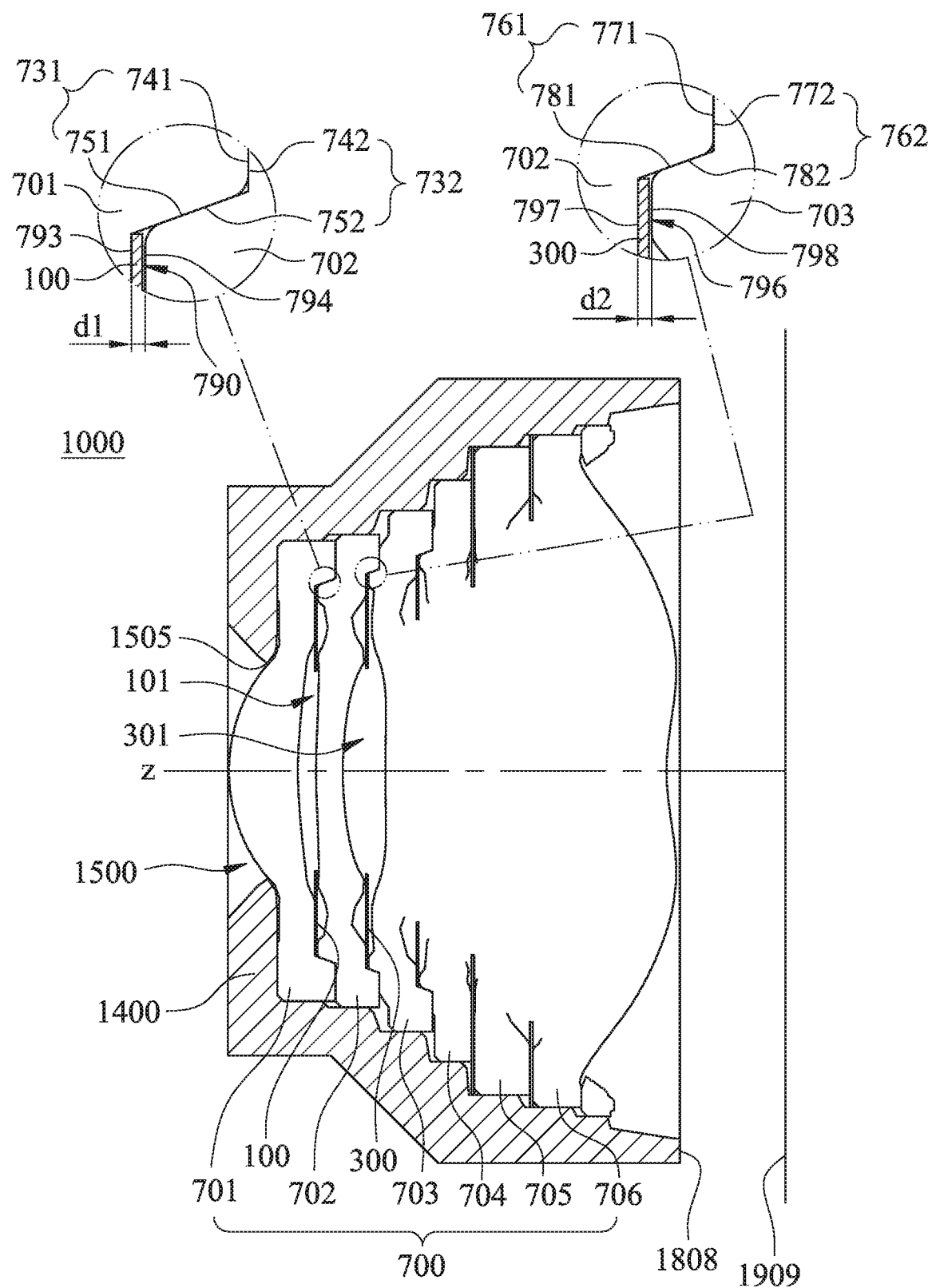
FIG. 7A is a schematic view of an imaging lens assembly according to the 7th embodiment of the present disclosure.

FIG. 7A is a schematic view of an imaging lens assembly 1000 according to the 7th embodiment of the present disclosure (some details about lens elements are omitted). In FIG. 7A, the imaging lens assembly 1000 includes an optical lens set 700 and a plastic barrel 1400.

The optical lens set 700 includes the light blocking sheet 100 of the 1st embodiment according to the present disclosure and at least two lens elements (at least lens elements 701 and 702), wherein the light blocking sheet 100 is disposed between one lens element (the lens element 701) and another lens element (the lens element 702). The other details of the light blocking sheet 100 have been described in the foregoing paragraphs of the 1st embodiment and will not be described again herein.

The optical lens set 700 with the light blocking sheet 100 is disposed along the central axis z (i.e. an optical axis of the imaging lens assembly 1000) in the plastic barrel 1400. The plastic barrel 1400 includes a barrel hole 1500, wherein a minimum diameter position 1505 of the barrel hole 1500 and the central hole 101 of the light blocking sheet 100 are corresponding to each other along the central axis z. That is, the minimum diameter position 1505 and the central hole 101 are arranged along the central axis z and parallel to each other. Therefore, it is favorable for enhancing the image quality of the imaging lens assembly 1000.

Figure 7B:
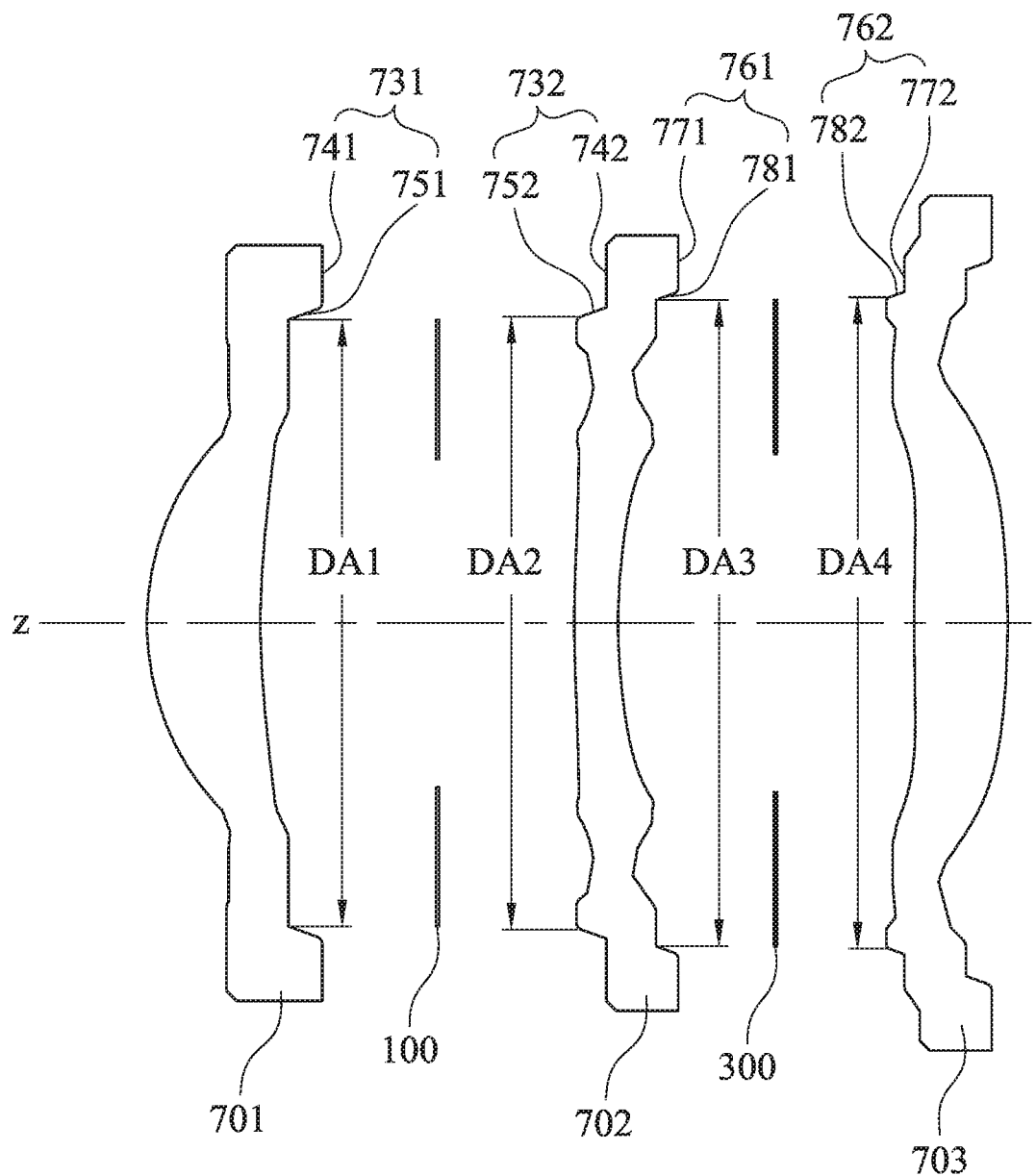
FIG. 7B is an exploded view of the light blocking sheets and the lens elements according to FIG. 7A.

FIG. 7B is an exploded view of the light blocking sheets 100, 300, lens elements 701, 702 and 703 according to FIG. 7A. In FIG. 7A and FIG. 7B, the lens element 701 of the optical lens set 700 can include a first connecting structure 731, wherein the first connecting structure 731 includes a first receiving surface 741 and a first conical surface 751. The lens element 702 of the optical lens set 700 can include a second connecting structure 732, wherein the second connecting structure 732 includes a second receiving surface 742 and a second conical surface 752, the first receiving surface 741 and the second receiving surface 742 are corresponding and connected to each other, the first conical surface 751 and the second conical surface 752 are corresponding and connected to each other, the first connecting structure 731 and the second connecting structure 732 are for aligning the lens elements 701 and 702 with the central axis z, and the outer diameter of the light blocking sheet 100 is smaller than an outer diameter of the lens element 701 and an outer diameter of the lens element 702. In the 7th embodiment, each of the first receiving surface 741 and the second receiving surface 742 is an annular surface with a normal direction parallel to the central axis z, and each of the first conical surface 751 and the second conical surface 752 is a conically annular surface with respect to the central axis z, wherein the first receiving surface 741 is farther from the central axis z than the first conical surface 751 is from the central axis z, and the second receiving surface 742 is farther from the central axis z than the second conical surface 752 is from the central axis z. In other embodiments (not shown in drawings) according to the present disclosure, the first receiving surface may be closer to the central axis z than the first conical surface is to the central axis, and the second receiving surface may be closer to the central axis than the second conical surface is to the central axis z.

A receiving space 790 can be defined by the lens elements 701 and 702, wherein the receiving space 790 is closer to the central axis z than both the first conical surface 751 and the second conical surface 752 are to the central axis z. The light blocking sheet 100 is received in the receiving space 790, and the outer diameter of the light blocking sheet 100 is smaller than or equal to a minimum diameter of the first conical surface 751 and a minimum diameter of the second conical surface 752. It is distinguished from the conventional stacking method for the lens elements and the light blocking sheets. In detail, the first connecting structure 731 and the second connecting structure 732 provide the lens elements 701 and 702 the alignment with the central axis z.

The lens elements 701 and 702 provide an optical mechanism (i.e. receiving surfaces 793 and 794) for disposing the light blocking sheet 100, so that the receiving space 790 and the light blocking position could be well controlled, and extra influences on a specific light blocking position resulted from the assembling tolerances could be avoided. In the 7th embodiment, the first conical surface 751 has different diameter values along the central axis z, and the second conical surface 752 has different diameter values along the central axis z. The minimum diameter of the first conical surface 751 is DA1, the minimum diameter of the second conical surface 752 is DA2, and a width parallel to the central axis z of the receiving space 790 is d1. It is shown in Table 1 and Table 7 that the outer diameter (φ) of the light blocking sheet 100 is equal to the minimum diameter (DA1) of the first conical surface 751, and the outer diameter (φ) of the light blocking sheet 100 is smaller than the minimum diameter (DA2) of the second conical surface 752.

Furthermore, the lens element 701 further includes the receiving surface 793, which is closer to the central axis z than the first conical surface 751 is to the central axis z. The lens element 702 further includes the receiving surface 794, which is closer to the central axis z than the second conical surface 752 is to the central axis z. The receiving surfaces 793 and 794 are corresponding and not connected to each other for defining the receiving space 790 aforementioned, that is, the receiving space 790 is formed between the receiving surfaces 793 and 794. The light blocking sheet 100 is received in the receiving space 790.

In addition, the receiving space 790 includes an air gap (its reference numeral is omitted), wherein the air gap is located between the light blocking sheet 100 and the receiving surface 793 or between the light blocking sheet 100 and the receiving surface 794. It can be said that the light blocking sheet 100 is received by one of the receiving surfaces 793 and 794 at a moment, and the light blocking sheet 100 can be slightly shaken in the receiving space 790 instead of being simultaneously and closely abutted with the receiving surfaces 793 and 794. Therefore, the air gap is favorable for ensuring that the light blocking sheet 100 cannot be pressed by the receiving surfaces 793 and 794 so as to prevent the light blocking sheet 100 from being affected after assembling of the imaging lens assembly 1000. In addition, the optical mechanism provided by the first connecting structure 731, the second connecting structure 732, the receiving surfaces 793 and 794 is favorable for aligning the light blocking sheet 100 and the lens elements 701, 702 both being adjacent thereto with the optical axis, so as to improve the coaxiality of the optical elements of the optical lens set 700, and thereby achieve the light blocking properties being more accurate.

In FIG. 7A, the imaging lens assembly 1000 includes the optical lens set 700 and an image surface 1909 in order from an object side to an image side. The optical lens set 700 includes lens elements 701, 702, 703, 704, 705, and 706 in order from the object side to the image side, wherein the optical lens set 700 has a total of six lens elements (701, 702, 703, 704, 705, and 706), which are disposed along the optical axis of the imaging lens assembly 1000 in the plastic barrel 1400. Furthermore, the optical lens set 700 further includes other optical elements (optical elements may be lens elements, light blocking sheets, spacers, retainers and so on), such as the light blocking sheet 100 disposed between the lens elements 701 and 702, and the light blocking sheet 300 of the 3rd embodiment according to the present disclosure disposed between the lens elements 702 and 703. The minimum diameter position 1505 of the barrel hole 1500, the central hole 101 of the light blocking sheet 100 and the central hole 301 of the light blocking sheet 300 are corresponding to each other along the central axis z. That is, the minimum diameter position 1505, the central holes 101 and 301 are arranged along the central axis z and parallel to each other. The other details of the light blocking sheet 300 have been described in the foregoing paragraphs of the 3rd embodiment and will not be described again herein. In other embodiments (not shown in drawings) according to the present disclosure, the optical lens set can have a total of four, five, seven or more lens elements.

In FIG. 7A and FIG. 7B, the lens element 702 of the optical lens set 700 can include a first connecting structure 761, wherein the first connecting structure 761 includes a first receiving surface 771 and a first conical surface 781. The lens element 703 of the optical lens set 700 can include a second connecting structure 762, wherein the second connecting structure 762 includes a second receiving surface 772 and a second conical surface 782, the first receiving surface 771 and the second receiving surface 772 are corresponding and connected to each other, the first conical surface 781 and the second conical surface 782 are corresponding and connected to each other, the first connecting structure 761 and the second connecting structure 762 are for aligning the lens elements 702 and 703 with the central axis z, and the outer diameter of the light blocking sheet 300 is smaller than an outer diameter of the lens element 702 and an outer diameter of the lens element 703. In the 7th embodiment, each of the first receiving surface 771 and the second receiving surface 772 is an annular surface with a normal direction parallel to the central axis z, and each of the first conical surface 781 and the second conical surface 782 is a conically annular surface with respect to the central axis z, wherein the first receiving surface 771 is farther from the central axis z than the first conical surface 781 is from the central axis z, and the second receiving surface 772 is farther from the central axis z than the second conical surface 782 is from the central axis z.

A receiving space 796 can be defined by the lens elements 702 and 703, wherein the receiving space 796 is closer to the central axis z than both the first conical surface 781 and the second conical surface 782 are to the central axis z. The light blocking sheet 300 is received in the receiving space 796, and the outer diameter of the light blocking sheet 300 is smaller than or equal to a minimum diameter of the first conical surface 781 and a minimum diameter of the second conical surface 782. In the 7th embodiment, the minimum diameter of the first conical surface 781 is DA3, the minimum diameter of the second conical surface 782 is DA4, and a width parallel to the central axis z of the receiving space 796 is d2. It is shown in Table 3 and Table 7 that the outer diameter (φ) of the light blocking sheet 300 is equal to the minimum diameter (DA3) of the first conical surface 781, and the outer diameter (φ) of the light blocking sheet 300 is smaller than the minimum diameter (DA4) of the second conical surface 782.

Furthermore, the lens element 702 further includes a receiving surface 797, which is closer to the central axis z than the first conical surface 781 is to the central axis z. The lens element 703 further includes a receiving surface 798, which is closer to the central axis z than the second conical surface 782 is to the central axis z. The receiving surfaces 797 and 798 are corresponding and not connected to each other for defining the receiving space 796 aforementioned, that is, the receiving space 796 is formed between the receiving surfaces 797 and 798. The light blocking sheet 300 is received in the receiving space 796.

In addition, the receiving space 796 includes an air gap (its reference numeral is omitted), wherein the air gap is located between the light blocking sheet 300 and the receiving surface 797 or between the light blocking sheet 300 and the receiving surface 798. It can be said that the light blocking sheet 300 is received by one of the receiving surfaces 797 and 798 at a moment, and the light blocking sheet 300 can be slightly shaken in the receiving space 796 instead of being simultaneously and closely abutted with the receiving surfaces 797 and 798.

The first conical surface 751 and the second conical surface 752 are for aligning the light blocking sheet 100 with the lens elements 701 and 702, i.e. with the central axis z. The first conical surface 781 and the second conical surface 782 are for aligning the light blocking sheet 300 with the lens elements 702 and 703, i.e. with the central axis z. Therefore, it is favorable for increasing the alignment accuracy and the assembling efficiency of the imaging lens assembly 1000.

The central hole 101 of the light blocking sheet 100 can be an aperture stop of the imaging lens assembly 1000. Therefore, it is favorable for controlling the light receiving amount of the imaging lens assembly 1000 and avoiding the light reflection of a hole inner surface being overly smooth of a conventional light blocking sheet. Furthermore, according to the real shooting experiences and trying numerous assembling with various optical elements, it is verified that improving the structures near the aperture stop or the hole inner surface of the light blocking sheet acting as the aperture stop is advantageous to reduce the unwanted residual light around the imaged object and enhance the image quality.

Figure 7C:
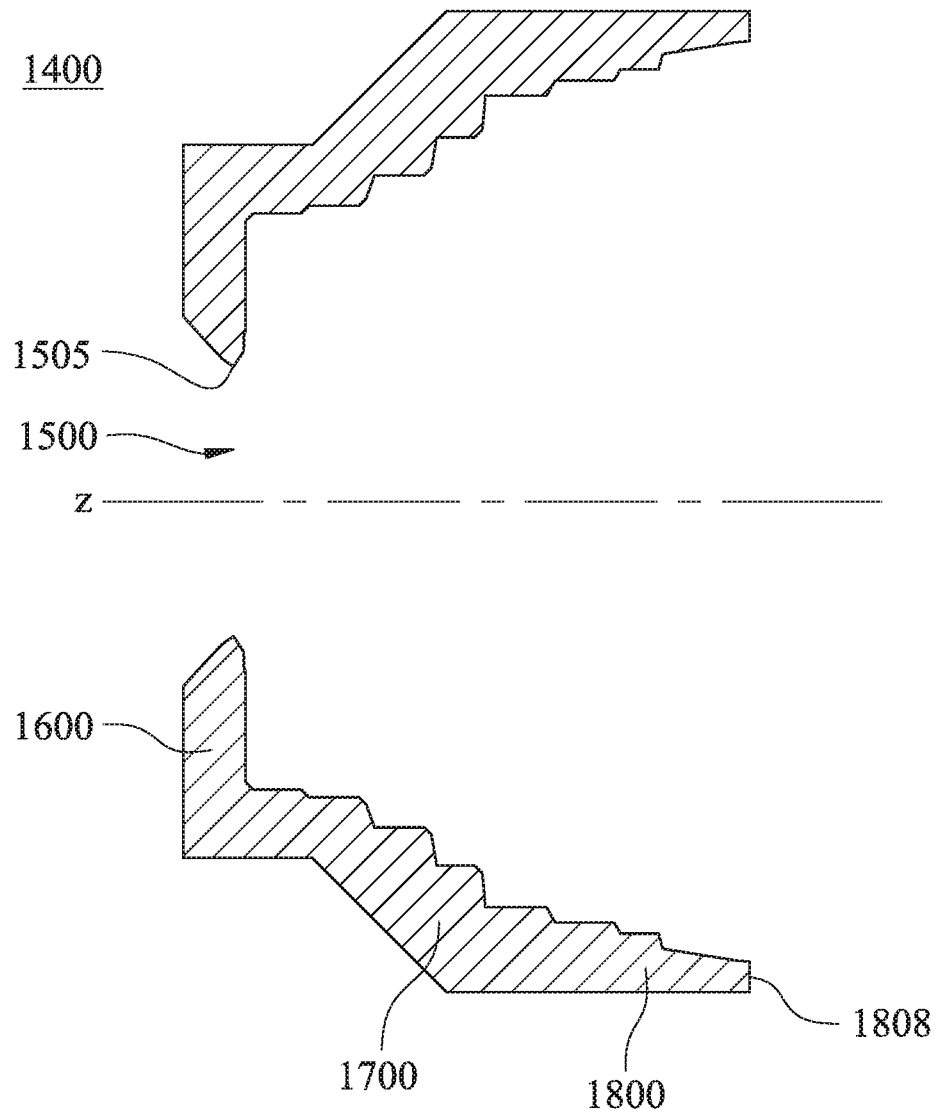
FIG. 7C is a schematic view of the plastic barrel according to FIG. 7A.
Figure 7D:
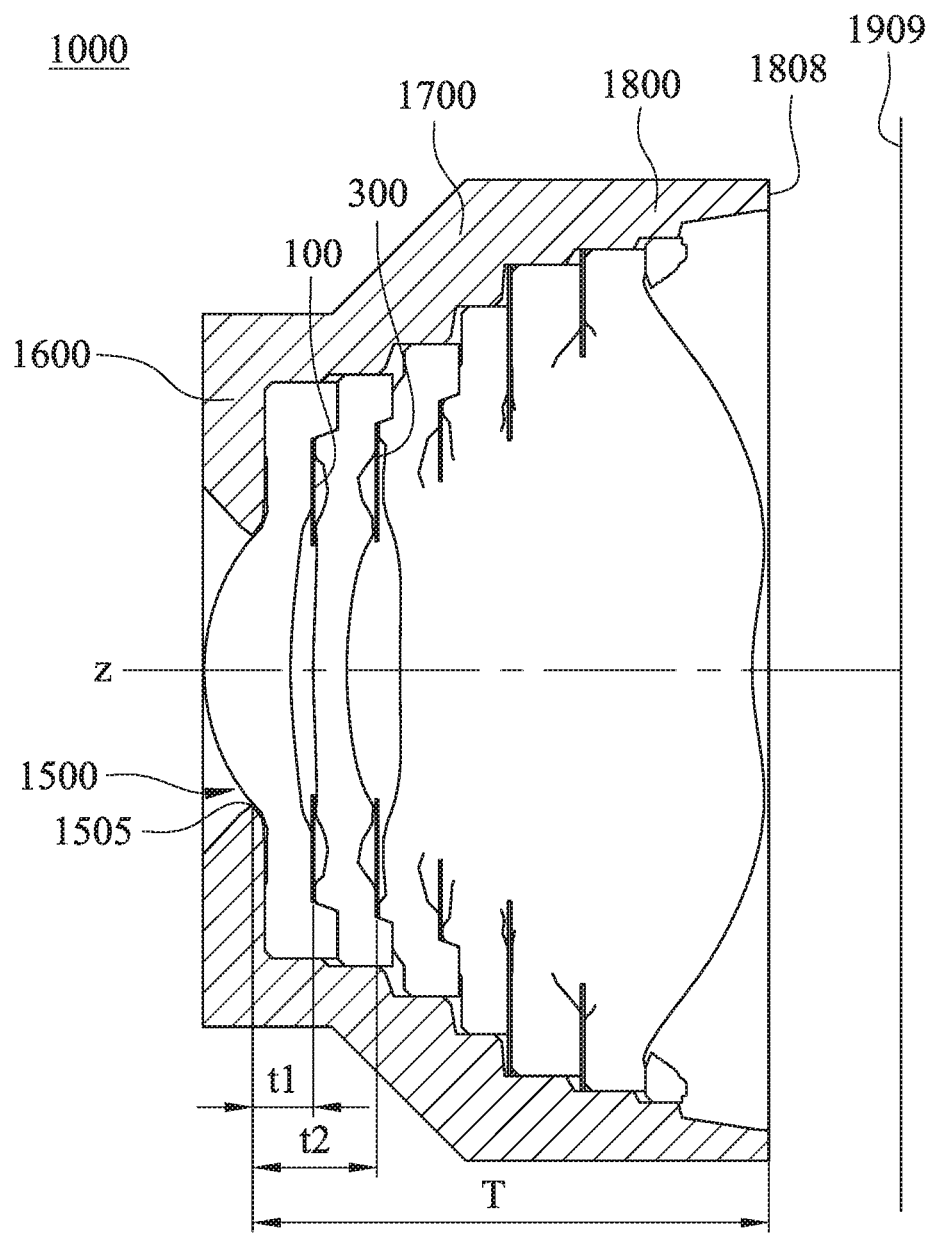
FIG. 7D is a schematic view of the parameters T, t1 and t2 according to FIG. 7A.

FIG. 7C is a schematic view of the plastic barrel 1400 according to FIG. 7A, and FIG. 7D is a schematic view of the parameters T, t1 and t2 according to FIG. 7A. In FIG. 7C and FIG. 7D, the plastic barrel 1400 can further include an object-end portion 1600, an image-end portion 1800 and a tube portion 1700. The image-end portion 1800 is disposed opposite to the object-end portion 1600 and includes an outer image-end surface 1808, wherein the outer image-end surface 1808 faces the image surface 1909 of the imaging lens assembly 1000. The tube portion 1700 connects the object-end portion 1600 and the image-end portion 1800. The minimum diameter position 1505 of the barrel hole 1500 can be located at the object-end portion 1600. When a distance parallel to the central axis z between the minimum diameter position 1505 of the barrel hole 1500 and the outer image-end surface 1808 is T, and a distance parallel to the central axis z between the central hole of the light blocking sheet (i.e. one of the central hole 101 of the light blocking sheet 100 and the central hole 301 of the light blocking sheet 300) and the minimum diameter position 1505 of the barrel hole 1500 is t, the following condition can be satisfied: 0.01<t/T<0.5. Therefore, adjusting the position of the light blocking sheet (i.e. the value of the parameter t) is favorable for reducing the influences on the image resulted from the intense light spot, and the light blocking sheet satisfying the condition of this paragraph is advantageous to provide better light blocking properties. In general, a light blocking sheet closer to the object side would provide better light blocking properties.

Moreover, a position of a central hole of a light blocking sheet in the parameter t according to the present disclosure is defined by a middle point of the light blocking sheet along the central axis z, while the light blocking sheet is connected to a lens element being disposed on an object side of the light blocking sheet. In FIG. 7D, a distance parallel to the central axis z between the central hole 101 of the light blocking sheet 100 and the minimum diameter position 1505 of the barrel hole 1500 is t1, a distance parallel to the central axis z between the central hole 301 of the light blocking sheet 300 and the minimum diameter position 1505 of the barrel hole 1500 is t2, and the parameters t1 and t2 are agreed with the definition of the parameter t according to the foregoing paragraph and claims of the present disclosure.

In FIG. 7A and FIG. 7C, the object-end portion 1600 is extended from a part of the plastic barrel 1400 for disposing the lens element 701 closest to the imaged object towards the imaged object (the part of the plastic barrel 1400 for disposing the lens element 701 excluded from the object-end portion 1600). The image-end portion 1800 is extended from a part of the plastic barrel 1400 for disposing the lens element 706 closest to the image surface 1909 towards the image surface 1909 (the part of the plastic barrel 1400 for disposing the lens element 706 excluded from the image-end portion 1800). The tube portion 1700 is between the object-end portion 1400 and the image-end portion 1800 of the plastic barrel 1400.

The data of the aforementioned parameters of the imaging lens assembly 1000 according to the 7th embodiment of the present disclosure are listed in the following Table 7, wherein the parameters are also shown as FIG. 7A, FIG. 7B and FIG. 7D.

TABLE 7

| 7th Embodiment | | | |
|---|---|---|---|
| DA1 (mm) | 3.05 | T (mm) | 3.4 |
| DA2 (mm) | 3.081 | t1 (mm) | 0.398 |
| DA3 (mm) | 3.25 | t2 (mm) | 0.818 |
| DA4 (mm) | 3.277 | t1/T | 0.117 |
| d1 (mm) | 0.02 | t2/T | 0.241 |
| d2 (mm) | 0.02 | | |

8th Embodiment

Figure 8A:
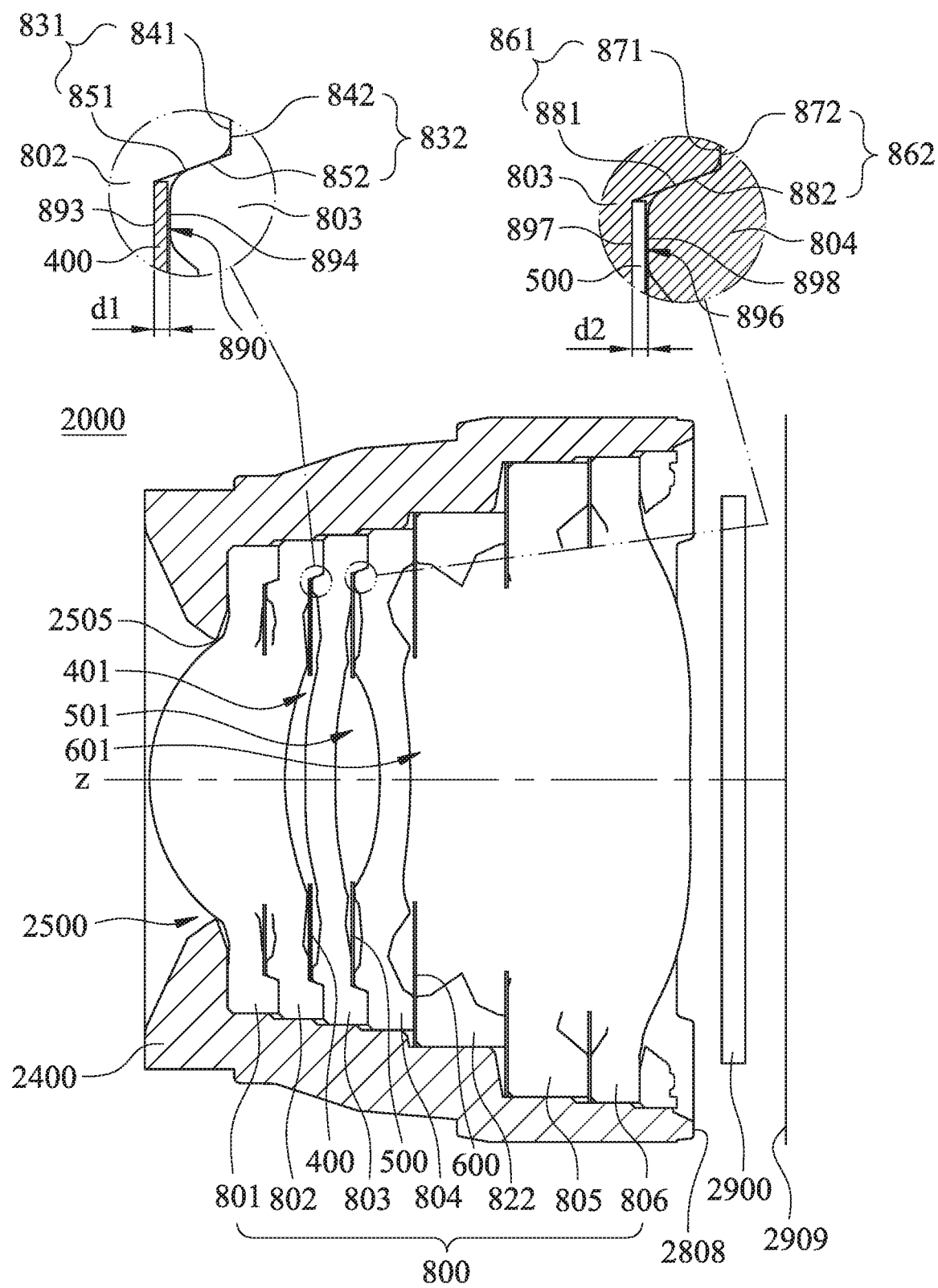
FIG. 8A is a schematic view of an imaging lens assembly according to the 8th embodiment of the present disclosure.

FIG. 8A is a schematic view of an imaging lens assembly 2000 according to the 8th embodiment of the present disclosure (some details about lens elements are omitted). In FIG. 8A, the imaging lens assembly 2000 includes an optical lens set 800 and a plastic barrel 2400.

The optical lens set 800 includes the light blocking sheet 400 of the 4th embodiment according to the present disclosure and at least two lens elements (at least lens elements 802 and 803), wherein the light blocking sheet 400 is to disposed between one lens element (the lens element 802) and another lens element (the lens element 803). The other details of the light blocking sheet 400 have been described in the foregoing paragraphs of the 4th embodiment and will not be described again herein.

The optical lens set 800 with the light blocking sheet 400 is disposed along the central axis z (i.e. an optical axis of the imaging lens assembly 2000) in the plastic barrel 2400. The plastic barrel 2400 includes a barrel hole 2500, wherein a minimum diameter position 2505 of the barrel hole 2500 and the central hole 401 of the light blocking sheet 400 are corresponding to each other along the central axis z.

Figure 8B:
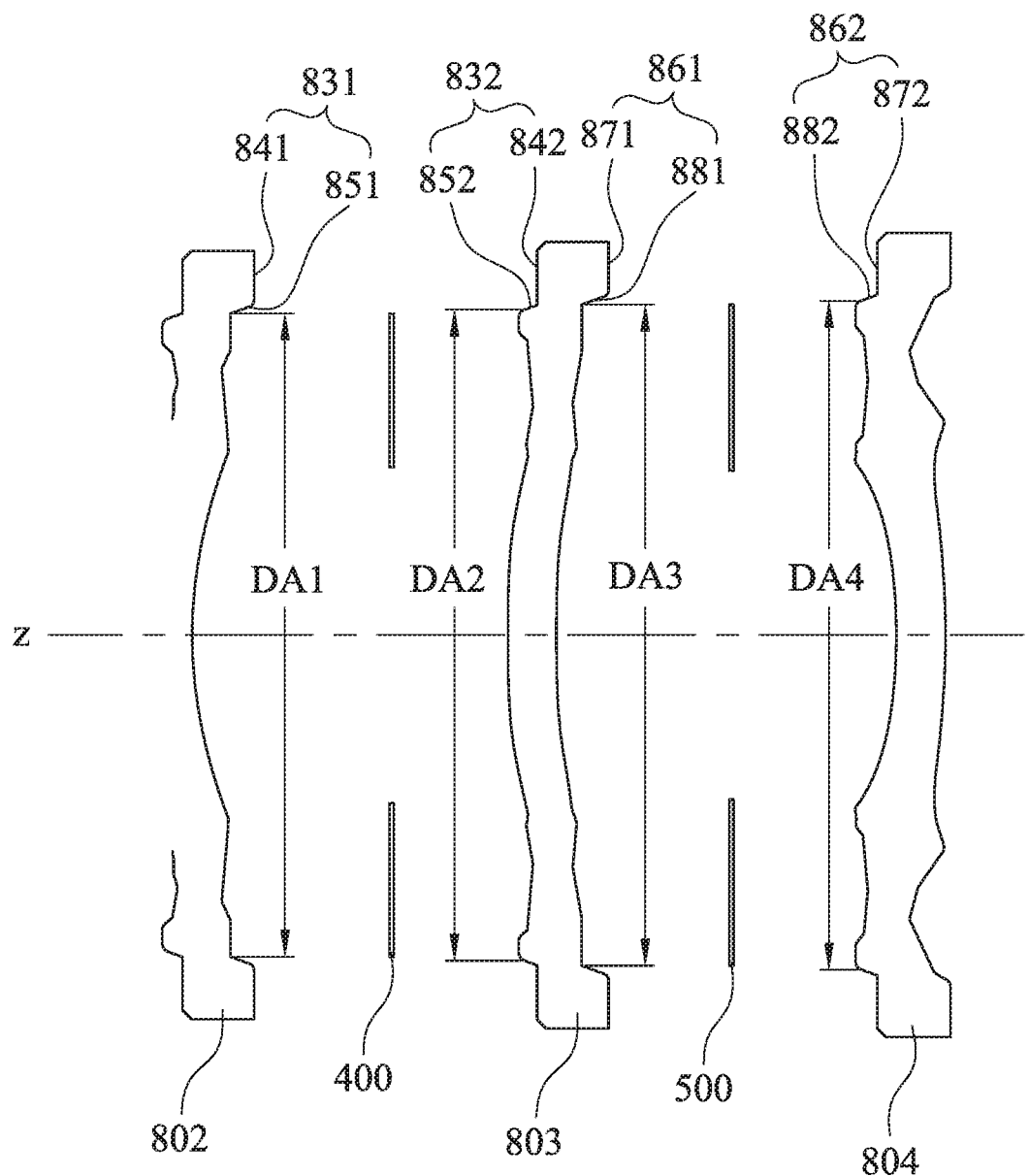
FIG. 8B is an exploded view of the light blocking sheets and the lens elements according to FIG. 8A.

FIG. 8B is an exploded view of the light blocking sheets 400, 500, lens elements 802, 803 and 804 according to FIG. 8A. In FIG. 8A and FIG. 8B, the lens element 802 of the optical lens set 800 includes a first connecting structure 831, wherein the first connecting structure 831 includes a first receiving surface 841 and a first conical surface 851. The lens element 803 of the optical lens set 800 includes a second connecting structure 832, wherein the second connecting structure 832 includes a second receiving surface 842 and a second conical surface 852, the first receiving surface 841 and the second receiving surface 842 are corresponding and connected to each other, the first conical surface 851 and the second conical surface 852 are corresponding and connected to each other, the first connecting structure 831 and the second connecting structure 832 are for aligning the lens elements 802 and 803 with the central axis z, and the outer diameter of the light blocking sheet 400 is smaller than an outer diameter of the lens element 802 and an outer diameter of the lens element 803. In the 8th embodiment, each of the first receiving surface 841 and the second receiving surface 842 is an annular surface with a normal direction parallel to the central axis z, and each of the first conical surface 851 and the second conical surface 852 is a conically annular surface with respect to the central axis z, wherein the first receiving surface 841 is farther from the central axis z than the first conical surface 851 is from the central axis z, and the second receiving surface 842 is farther from the central axis z than the second conical surface 852 is from the central axis z.

A receiving space 890 is defined by the lens elements 802 and 803, wherein the receiving space 890 is closer to the central axis z than both the first conical surface 851 and the second conical surface 852 are to the central axis z, and the light blocking sheet 400 is received in the receiving space 890. In the 8th embodiment, a minimum diameter of the first conical surface 851 is DA1, a minimum diameter of the second conical surface 852 is DA2, and a width parallel to the central axis z of the receiving space 890 is d1. It is shown in Table 4 and Table 8 that the outer diameter (φ) of the light blocking sheet 400 is equal to the minimum diameter (DA1) of the first conical surface 851, and the outer diameter (φ) of the light blocking sheet 400 is smaller than the minimum diameter (DA2) of the second conical surface 852.

Furthermore, the lens element 802 further includes a receiving surface 893, which is closer to the central axis z than the first conical surface 851 is to the central axis z. The lens element 803 further includes a receiving surface 894, which is closer to the central axis z than the second conical surface 852 is to the central axis z. The receiving surfaces 893 and 894 are corresponding and not connected to each other for defining the receiving space 890 aforementioned, that is, the receiving space 890 is formed between the receiving surfaces 893 and 894. The light blocking sheet 400 is received in the receiving space 890.

In addition, the receiving space 890 includes an air gap (its reference numeral is omitted), wherein the air gap is located between the light blocking sheet 400 and the receiving surface 893 or between the light blocking sheet 400 and the receiving surface 894.

In FIG. 8A, the imaging lens assembly 2000 includes the optical lens set 800, a glass panel 2900 and an image surface 2909 in order from an object side to an image side, wherein the glass panel 2900 can be a cover glass, a filter or both above, and will not affect the focal length of the optical lens set 800. The optical lens set 800 includes lens elements 801, 802, 803, 804, 805, and 806 in order from the object side to the image side, wherein the optical lens set 800 has a total of six lens elements (801, 802, 803, 804, 805, and 806), which are disposed along the optical axis of the imaging lens assembly 2000 in the plastic barrel 2400. Furthermore, the optical lens set 800 further includes other optical elements, such as the light blocking sheet 400 disposed between the lens elements 802 and 803, the light blocking sheet 500 of the 5th embodiment according to the present disclosure disposed between the lens elements 803 and 804, and the light blocking sheet 600 of the 6th embodiment according to the present disclosure disposed between the lens elements 804 and a spacer 822. The minimum diameter position 2505 of the barrel hole 2500, the central hole 401 of the light blocking sheet 400, the central hole 501 of the light blocking sheet 500 and the central hole 601 of the light blocking sheet 600 are corresponding to each other along the central axis z. The other details of the light blocking sheet 500 described in the foregoing paragraphs of the 5th embodiment and the other details of the light blocking sheet 600 described in the foregoing paragraphs of the 6th embodiment will not be described again herein.

In FIG. 8A and FIG. 8B, the lens element 803 of the optical lens set 800 includes a first connecting structure 861, wherein the first connecting structure 861 includes a first receiving surface 871 and a first conical surface 881. The lens element 804 of the optical lens set 800 includes a second connecting structure 862, wherein the second connecting structure 862 includes a second receiving surface 872 and a second conical surface 882, the first receiving surface 871 and the second receiving surface 872 are corresponding and connected to each other, the first conical surface 881 and the second conical surface 882 are corresponding and connected to each other, the first connecting structure 861 and the second connecting structure 862 are for aligning the lens elements 803 and 804 with the central axis z, and the outer diameter of the light blocking sheet 500 is smaller than an outer diameter of the lens element 803 and an outer diameter of the lens element 804. In the 8th embodiment, each of the first receiving surface 871 and the second receiving surface 872 is an annular surface with a normal direction parallel to the central axis z, and each of the first conical surface 881 and the second conical surface 882 is a conically annular surface with respect to the central axis z, wherein the first receiving surface 871 is farther from the central axis z than the first conical surface 881 is from the central axis z, and the second receiving surface 872 is farther from the central axis z than the second conical surface 882 is from the central axis z.

A receiving space 896 is defined by the lens elements 803 and 804, wherein the receiving space 896 is closer to the central axis z than both the first conical surface 881 and the second conical surface 882 are to the central axis z, and the light blocking sheet 500 is received in the receiving space 896. In the 8th embodiment, a minimum diameter of the first conical surface 881 is DA3, a minimum diameter of the second conical surface 882 is DA4, and a width parallel to the central axis z of the receiving space 896 is d2. It is shown in Table 5 and Table 8 that the outer diameter (φ) of the light blocking sheet 500 is equal to the minimum diameter (DA3) of the first conical surface 881, and the outer diameter (φ) of the light blocking sheet 500 is smaller than the minimum diameter (DA4) of the second conical surface 882.

Furthermore, the lens element 803 further includes a receiving surface 897, which is closer to the central axis z than the first conical surface 881 is to the central axis z. The lens element 804 further includes a receiving surface 898, which is closer to the central axis z than the second conical surface 882 is to the central axis z. The receiving surfaces 897 and 898 are corresponding and not connected to each other for defining the receiving space 896 aforementioned, that is, the receiving space 896 is formed between the receiving surfaces 897 and 898. The light blocking sheet 500 is received in the receiving space 896.

In addition, the receiving space 896 includes an air gap (its reference numeral is omitted), wherein the air gap is located between the light blocking sheet 500 and the receiving surface 897 or between the light blocking sheet 500 and the receiving surface 898.

The first conical surface 851 and the second conical surface 852 are for aligning the light blocking sheet 400 with the lens elements 802 and 803, i.e. with the central axis z. The first conical surface 881 and the second conical surface 882 are for aligning the light blocking sheet 500 with the lens elements 803 and 804, i.e. with the central axis z.

The minimum diameter position 2505 of the barrel hole 2500 is an aperture stop of the imaging lens assembly 2000. Therefore, it is favorable for omitting an extra optical element so as to decrease the cost of the imaging lens assembly 2000.

Figure 8C:
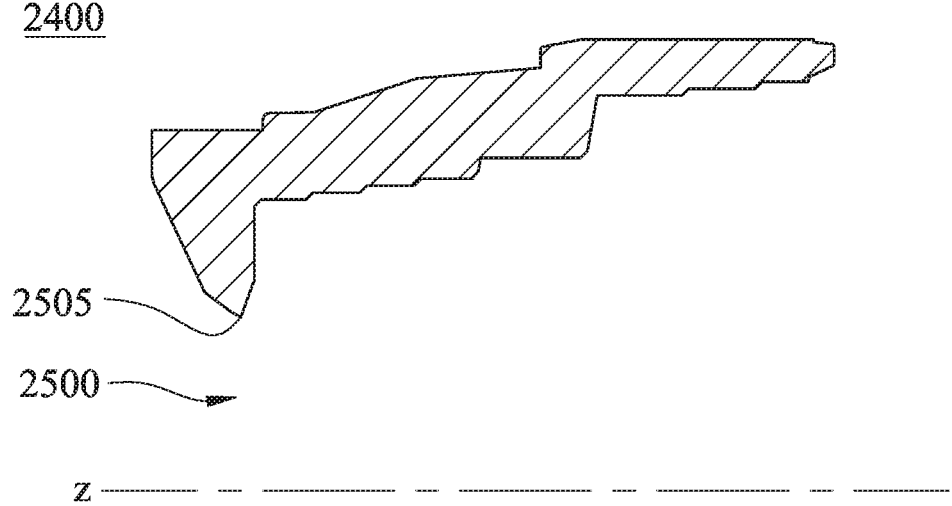
FIG. 8C is a schematic view of the plastic barrel according to FIG. 8A.
Figure 8C:
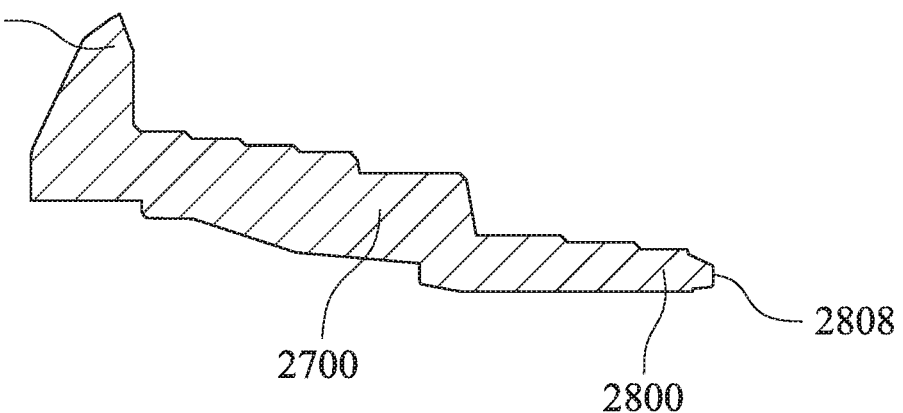
Figure 8D:
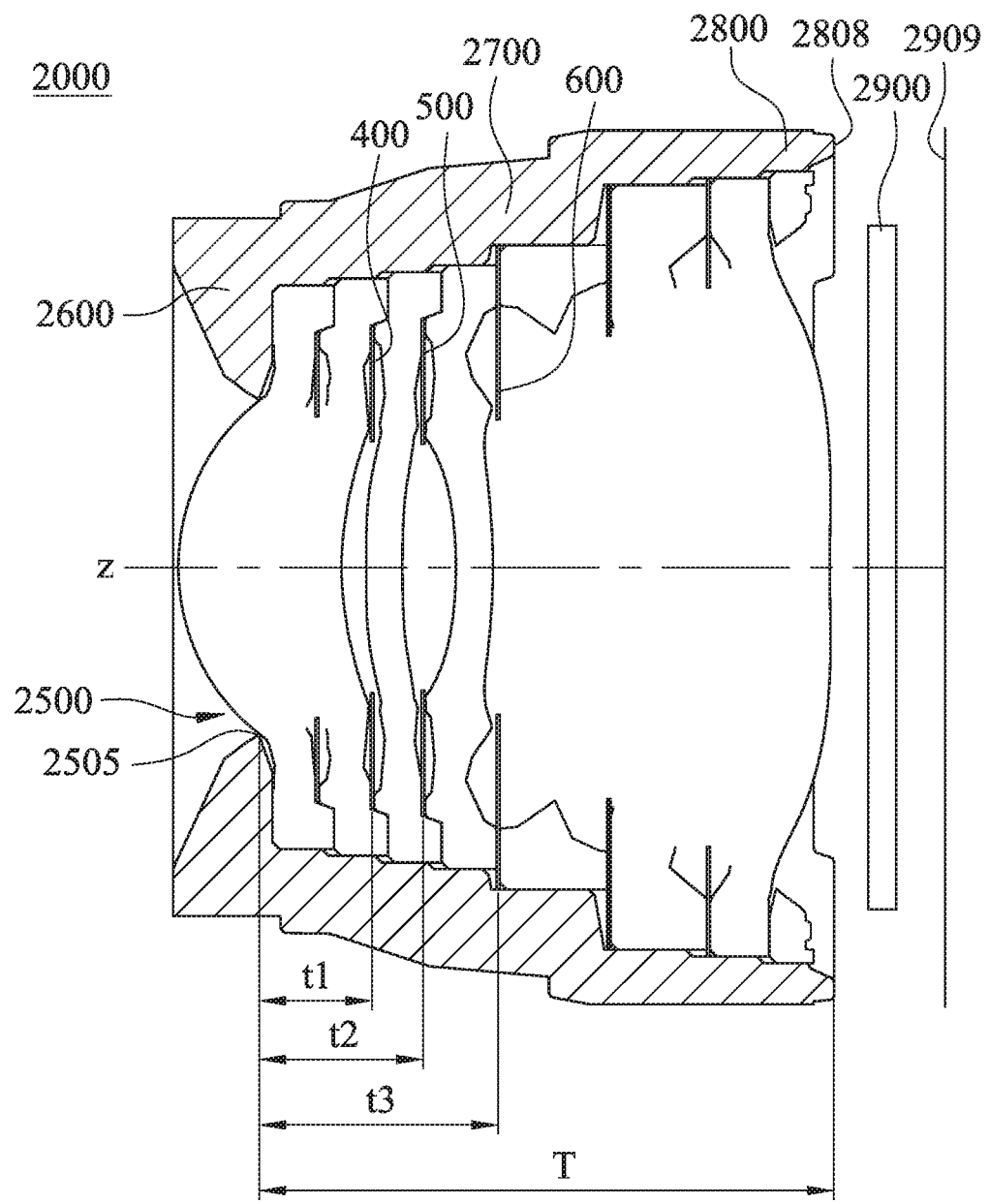
FIG. 8D is a schematic view of the parameters T, t1, t2 and t3 according to FIG. 8A.

FIG. 8C is a schematic view of the plastic barrel 2400 according to FIG. 8A, and FIG. 8D is a schematic view of the parameters T, t1, t2 and t3 according to FIG. 8A. In FIG. 8C and FIG. 8D, the plastic barrel 2400 further includes an object-end portion 2600, an image-end portion 2800 and a tube portion 2700. The image-end portion 2800 is disposed opposite to the object-end portion 2600 and includes an outer image-end surface 2808, wherein the outer image-end surface 2808 faces the image surface 2909 of the imaging lens assembly 2000. The tube portion 2700 connects the object-end portion 2600 and the image-end portion 2800. The minimum diameter position 2505 of the barrel hole 2500 is located at the object-end portion 2600.

In FIG. 8D, a distance parallel to the central axis z between the central hole 401 of the light blocking sheet 400 and the minimum diameter position 2505 of the barrel hole 2500 is t1, a distance parallel to the central axis z between the central hole 501 of the light blocking sheet 500 and the minimum diameter position 2505 of the barrel hole 2500 is t2, a distance parallel to the central axis z between the central hole 601 of the light blocking sheet 600 and the minimum diameter position 2505 of the barrel hole 2500 is t3, and the parameters t1, t2 and t3 are agreed with the definition of the parameter t according to the recitations of the 7th embodiment and claims of the present disclosure.

The data of the aforementioned parameters of the imaging lens assembly 2000 according to the 8th embodiment of the present disclosure are listed in the following Table 8, wherein the parameters are also shown as FIG. 8A, FIG. 8B and FIG. 8D.

TABLE 8

| 8th Embodiment | | | |
|---|---|---|---|
| DA1 (mm) | 3.6 | t1 (mm) | 0.841 |
| DA2 (mm) | 3.644 | t2 (mm) | 1.222 |
| DA3 (mm) | 3.7 | t3 (mm) | 1.782 |
| DA4 (mm) | 3.744 | t1/T | 0.197 |
| d1 (mm) | 0.027 | t2/T | 0.286 |
| d2 (mm) | 0.027 | t3/T | 0.416 |
| T (mm) | 4.28 | | |

9th Embodiment

Figure 9A:
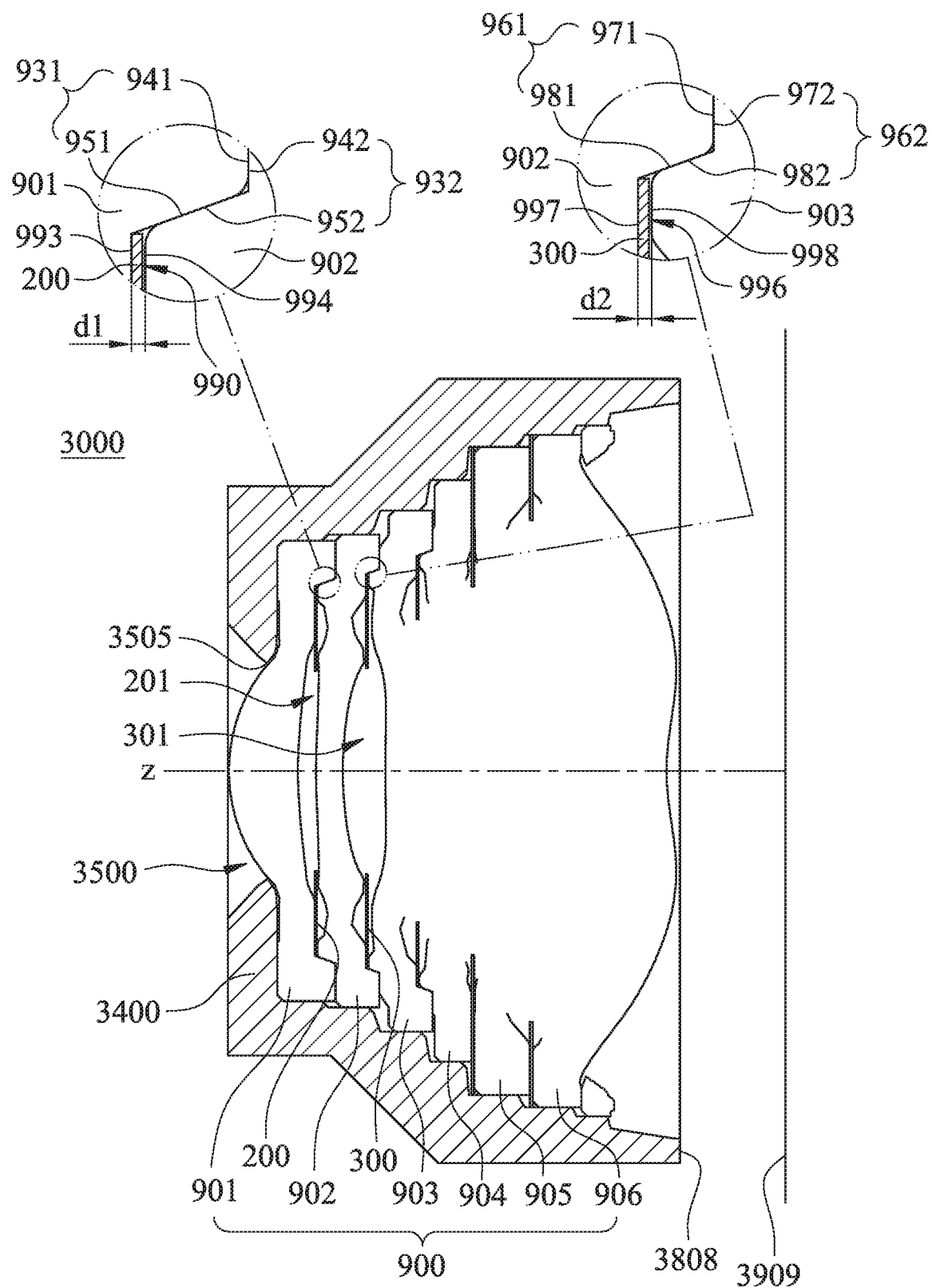
FIG. 9A is a schematic view of an imaging lens assembly according to the 9th embodiment of the present disclosure.

FIG. 9A is a schematic view of an imaging lens assembly 3000 according to the 9th embodiment of the present disclosure (some details about lens elements are omitted). In FIG. 9A, the imaging lens assembly 3000 includes an optical lens set 900 and a plastic barrel 3400.

The optical lens set 900 includes the light blocking sheet 200 of the 2nd embodiment according to the present disclosure and at least two lens elements (at least lens elements 901 and 902), wherein the light blocking sheet 200 is to disposed between one lens element (the lens element 901) and another lens element (the lens element 902). The other details of the light blocking sheet 200 have been described in the foregoing paragraphs of the 2nd embodiment and will not be described again herein.

The optical lens set 900 with the light blocking sheet 200 is disposed along the central axis z (i.e. an optical axis of the imaging lens assembly 3000) in the plastic barrel 3400. The plastic barrel 3400 includes a barrel hole 3500, wherein a minimum diameter position 3505 of the barrel hole 3500 and the central hole 201 of the light blocking sheet 200 are corresponding to each other along the central axis z.

Figure 9B:
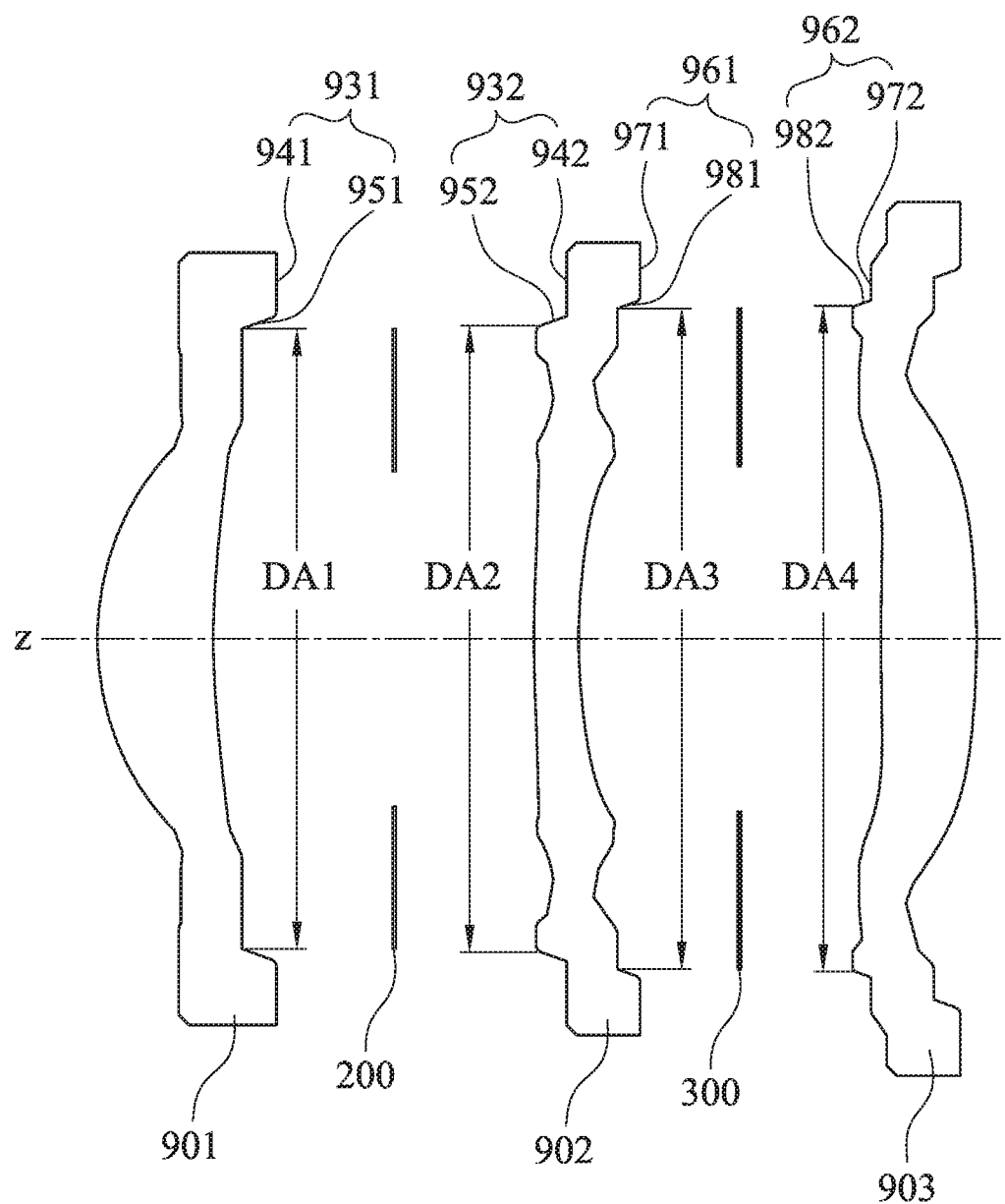
FIG. 9B is an exploded view of the light blocking sheets and the lens elements according to FIG. 9A.

FIG. 9B is an exploded view of the light blocking sheets 200, 300, lens elements 901, 902 and 903 according to FIG. 9A. In FIG. 9A and FIG. 9B, the lens element 901 of the optical lens set 900 includes a first connecting structure 931, wherein the first connecting structure 931 includes a first receiving surface 941 and a first conical surface 951. The lens element 902 of the optical lens set 900 includes a second connecting structure 932, wherein the second connecting structure 932 includes a second receiving surface 942 and a second conical surface 952, the first receiving surface 941 and the second receiving surface 942 are corresponding and connected to each other, the first conical surface 951 and the second conical surface 952 are corresponding and connected to each other, the first connecting structure 931 and the second connecting structure 932 are for aligning the lens elements 901 and 902 with the central axis z, and the outer diameter of the light blocking sheet 200 is to smaller than an outer diameter of the lens element 901 and an outer diameter of the lens element 902. In the 9th embodiment, each of the first receiving surface 941 and the second receiving surface 942 is an annular surface with a normal direction parallel to the central axis z, and each of the first conical surface 951 and the second conical surface 952 is a conically annular surface with respect to the central axis z, wherein the first receiving surface 941 is farther from the central axis z than the first conical surface 951 is from the central axis z, and the second receiving surface 942 is farther from the central axis z than the second conical surface 952 is from the central axis z.

A receiving space 990 is defined by the lens elements 901 and 902, wherein the receiving space 990 is closer to the central axis z than both the first conical surface 951 and the second conical surface 952 are to the central axis z, and the light blocking sheet 200 is received in the receiving space 990. In the 9th embodiment, a minimum diameter of the first conical surface 951 is DA1, a minimum diameter of the second conical surface 952 is DA2, and a width parallel to the central axis z of the receiving space 990 is d1. It is shown in Table 2 and Table 9 that the outer diameter (φ) of the light blocking sheet 200 is equal to the minimum diameter (DA1) of the first conical surface 951, and the outer diameter (φ) of the light blocking sheet 200 is smaller than the minimum diameter (DA2) of the second conical surface 952.

Furthermore, the lens element 901 further includes a receiving surface 993, which is closer to the central axis z than the first conical surface 951 is to the central axis z. The lens element 902 further includes a receiving surface 994, which is closer to the central axis z than the second conical surface 952 is to the central axis z. The receiving surfaces 993 and 994 are corresponding to and not connected to each other for defining the receiving space 990 aforementioned, that is, the receiving space 990 is formed between the receiving surfaces 993 and 994. The light blocking sheet 200 is received in the receiving space 990.

In addition, the receiving space 990 includes an air gap (its reference numeral is omitted), wherein the air gap is located between the light blocking sheet 200 and the receiving surface 993 or between the light blocking sheet 200 and the receiving surface 994.

In FIG. 9A, the imaging lens assembly 3000 includes the optical lens set 900 and an image surface 3909 in order from an object side to an image side. The optical lens set 900 includes lens elements 901, 902, 903, 904, 905, and 906 in order from the object side to the image side, wherein the optical lens set 900 has a total of six lens elements (901, 902, 903, 904, 905, and 906), which are disposed along the optical axis of the imaging lens assembly 3000 in the plastic barrel 3400. Furthermore, the optical lens set 900 further includes other optical elements, such as the light blocking sheet 200 disposed between the lens elements 901 and 902, and the light blocking sheet 300 of the 3rd embodiment according to the present disclosure disposed between the lens elements 902 and 903. The minimum diameter position 3505 of the barrel hole 3500, the central hole 201 of the light blocking sheet 200 and the central hole 301 of the light blocking sheet 300 are corresponding to each other along the central axis z. The other details of the light blocking sheet 300 have been described in the foregoing paragraphs of the 3rd embodiment and will not be described again herein.

In FIG. 9A and FIG. 9B, the lens element 902 of the optical lens set 900 includes a first connecting structure 961, wherein the first connecting structure 961 includes a first receiving surface 971 and a first conical surface 981. The lens element 903 of the optical lens set 900 includes a second connecting structure 962, wherein the second connecting structure 962 includes a second receiving surface 972 and a second conical surface 982, the first receiving surface 971 and the second receiving surface 972 are corresponding and connected to each other, the first conical surface 981 and the second conical surface 982 are corresponding and connected to each other, the first connecting structure 961 and the second connecting structure 962 are for aligning the lens elements 902 and 903 with the central axis z, and the outer diameter of the light blocking sheet 300 is smaller than an outer diameter of the lens element 902 and an outer diameter of the lens element 903. In the 9th embodiment, each of the first receiving surface 971 and the second receiving surface 972 is an annular surface with a normal direction parallel to the central axis z, and each of the first conical surface 981 and the second conical surface 982 is a conically annular surface with respect to the central axis z, wherein the first receiving surface 971 is farther from the central axis z than the first conical surface 981 is from the central axis z, and the second receiving surface 972 is farther from the central axis z than the second conical surface 982 is from the central axis z.

A receiving space 996 is defined by the lens elements 902 and 903, wherein the receiving space 996 is closer to the central axis z than both the first conical surface 981 and the second conical surface 982 are to the central axis z, and the light blocking sheet 300 is received in the receiving space 996. In the 9th embodiment, a minimum diameter of the first conical surface 981 is DA3, a minimum diameter of the second conical surface 982 is DA4, and a width parallel to the central axis z of the receiving space 996 is d2. It is shown in Table 3 and Table 9 that the outer diameter ($\varphi$) of the light blocking sheet 300 is equal to the minimum diameter (DA3) of the first conical surface 981, and the outer diameter ($\varphi$) of the light blocking sheet 300 is smaller than the minimum diameter (DA4) of the second conical surface 982.

Furthermore, the lens element 902 further includes a receiving surface 997, which is closer to the central axis z than the first conical surface 981 is to the central axis z. The lens element 903 further includes a receiving surface 998, which is closer to the central axis z than the second conical surface 982 is to the central axis z. The receiving surfaces 997 and 998 are corresponding and not connected to each other for defining the receiving space 996 aforementioned, that is, the receiving space 996 is formed between the receiving surfaces 997 and 998. The light blocking sheet 300 is received in the receiving space 996.

In addition, the receiving space 996 includes an air gap (its reference numeral is omitted), wherein the air gap is located between the light blocking sheet 300 and the receiving surface 997 or between the light blocking sheet 300 and the receiving surface 998.

The first conical surface 951 and the second conical surface 952 are for aligning the light blocking sheet 200 with the lens elements 901 and 902, i.e. with the central axis z. The first conical surface 981 and the second conical surface 982 are for aligning the light blocking sheet 300 with the lens elements 902 and 903, i.e. with the central axis z. The central hole 201 of the light blocking sheet 200 is an aperture stop of the imaging lens assembly 3000.

Figure 9C:
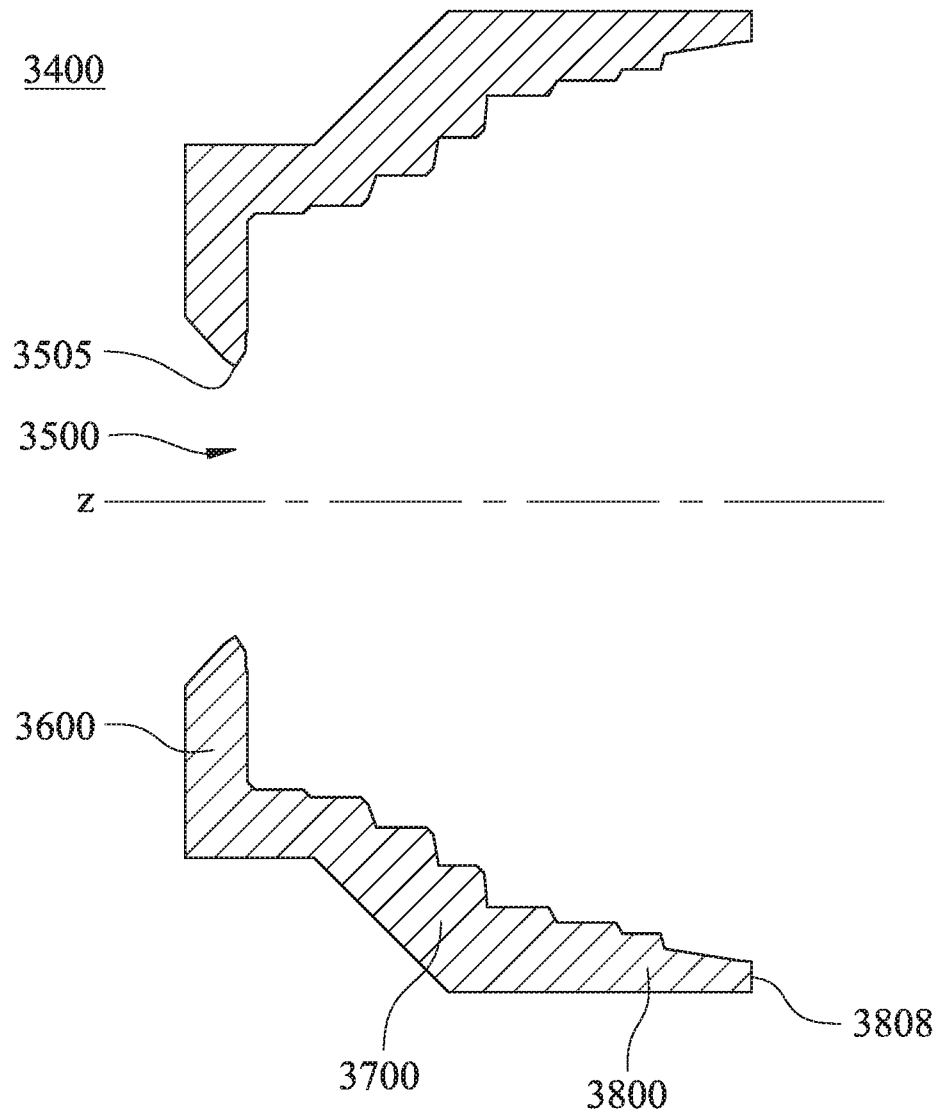
FIG. 9C is a schematic view of the plastic barrel according to FIG. 9A.
Figure 9D:
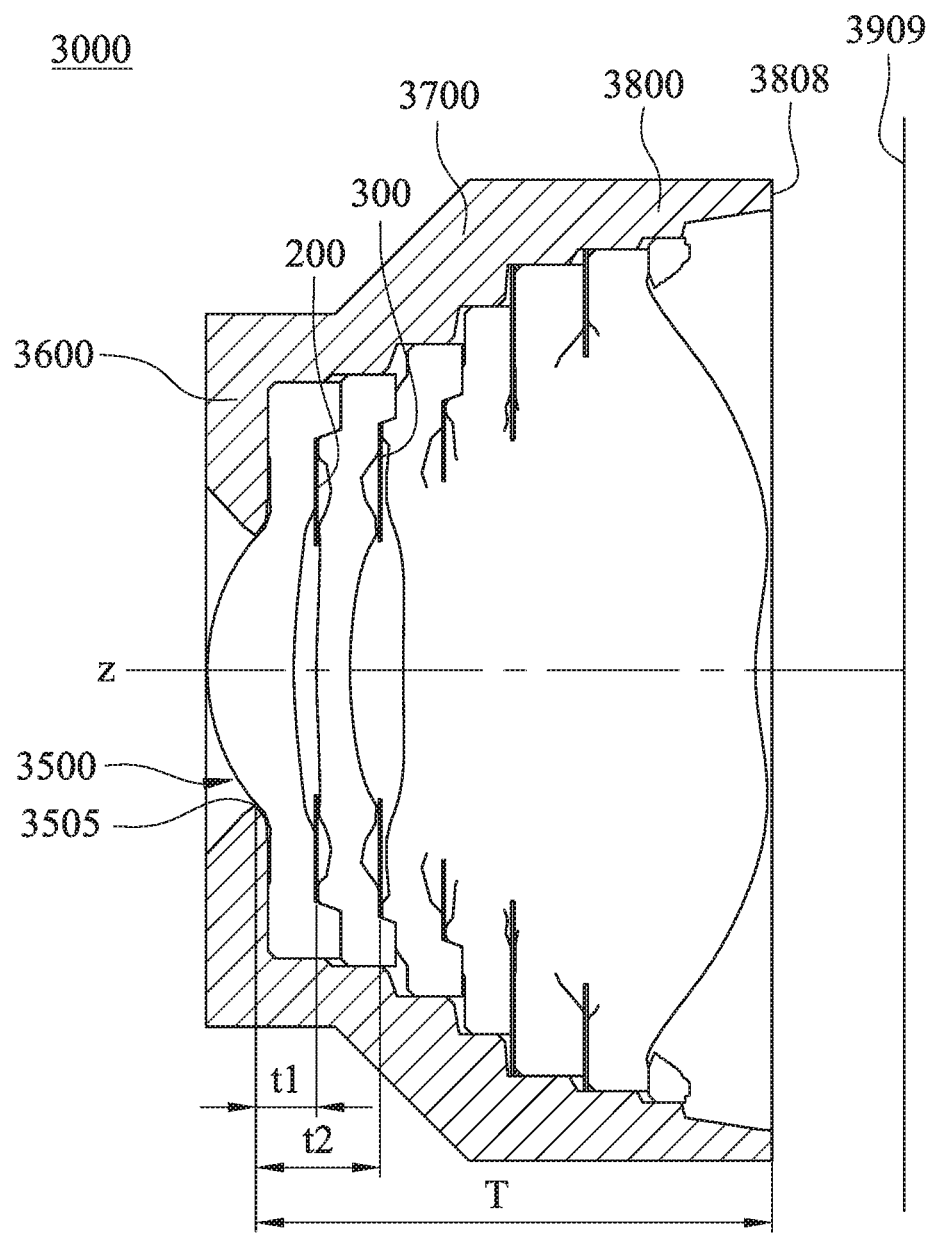
FIG. 9D is a schematic view of the parameters T, t1 and t2 according to FIG. 9A.

FIG. 9C is a schematic view of the plastic barrel 3400 according to FIG. 9A, and FIG. 9D is a schematic view of the parameters T, t1 and t2 according to FIG. 9A. In FIG. 9C and FIG. 9D, the plastic barrel 3400 further includes an object-end portion 3600, an image-end portion 3800 and a tube portion 3700. The image-end portion 3800 is disposed opposite to the object-end portion 3600 and includes an outer image-end surface 3808, wherein the outer image-end surface 3808 faces the image surface 3909 of the imaging lens assembly 3000. The tube portion 3700 connects the object-end portion 3600 and the image-end portion 3800. The minimum diameter position 3505 of the barrel hole 3500 is located at the object-end portion 3600.

In FIG. 9D, a distance parallel to the central axis z between the central hole 201 of the light blocking sheet 200 and the minimum diameter position 3505 of the barrel hole 3500 is t1, a distance parallel to the central axis z between the central hole 301 of the light blocking sheet 300 and the minimum diameter position 3505 of the barrel hole 3500 is t2, and the parameters t1 and t2 are agreed with the definition of the parameter t according to the recitations of the 7th embodiment and claims of the present disclosure.

The data of the aforementioned parameters of the imaging lens assembly 3000 according to the 9th embodiment of the present disclosure are listed in the following Table 9, wherein the parameters are also shown as FIG. 9A, FIG. 9B and FIG. 9D.

TABLE 9

| 9th Embodiment | | | |
|---|---|---|---|
| DA1 (mm) | 3.05 | T (mm) | 3.4 |
| DA2 (mm) | 3.081 | t1 (mm) | 0.398 |
| DA3 (mm) | 3.25 | t2 (mm) | 0.818 |
| DA4 (mm) | 3.277 | t1/T | 0.117 |
| d1 (mm) | 0.02 | t2/T | 0.241 |
| d2 (mm) | 0.02 | | |

10th Embodiment

Figure 10A:
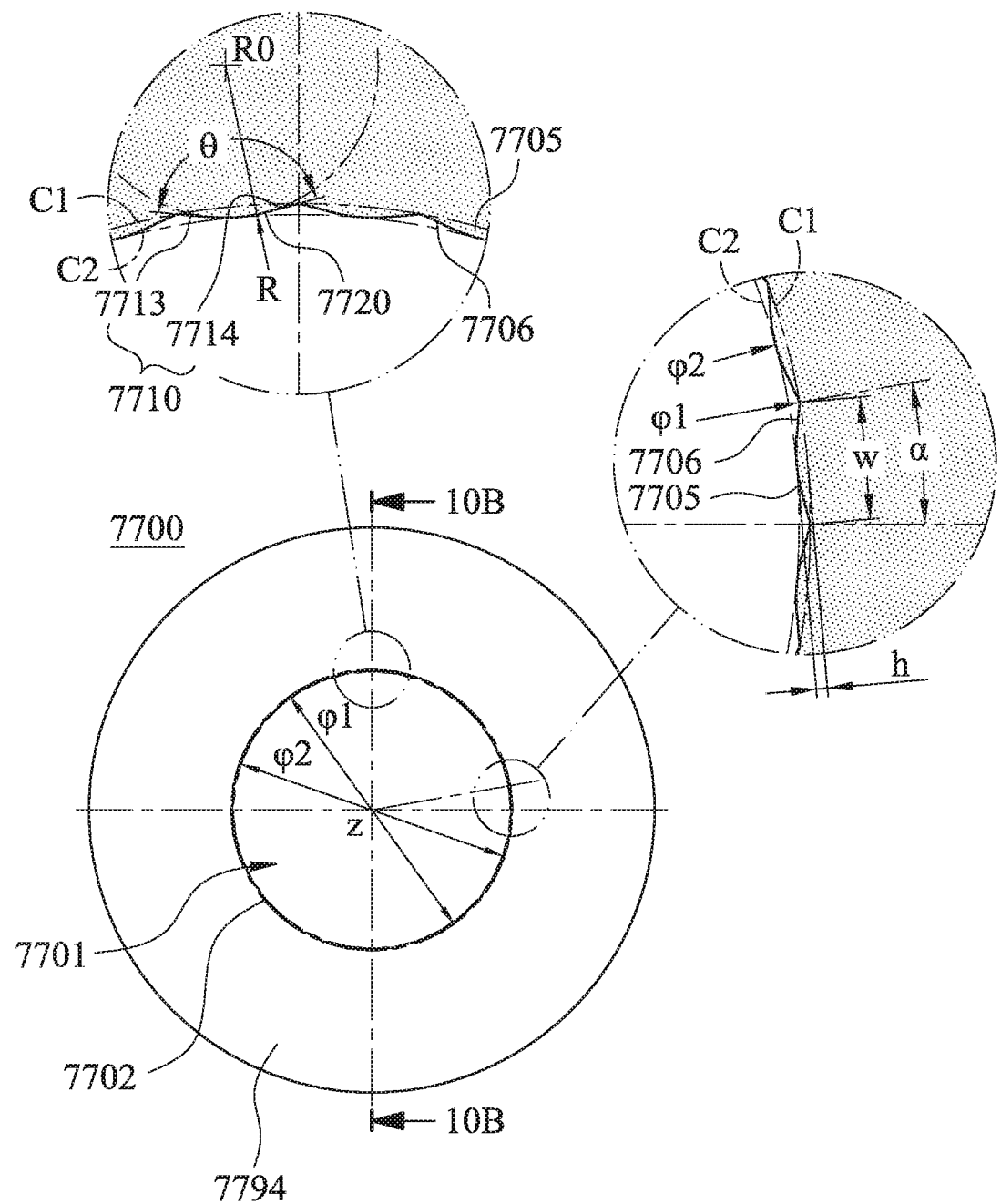
FIG. 10A is a top view of a light blocking sheet according to the 10th embodiment of the present disclosure.

FIG. 10A is a top view of a light blocking sheet 7700 according to the 10th embodiment of the present disclosure, wherein the light blocking sheet 7700 in FIG. 10A is viewed from a first outer surface 7794 thereof. In FIG. 10A, the light blocking sheet 7700 having a central axis z includes a central hole 7701 and a plurality of inner extended portions 7705. The central axis z passes through the central hole 7701, which is enclosed by a hole inner surface 7702.

Figure 10B:
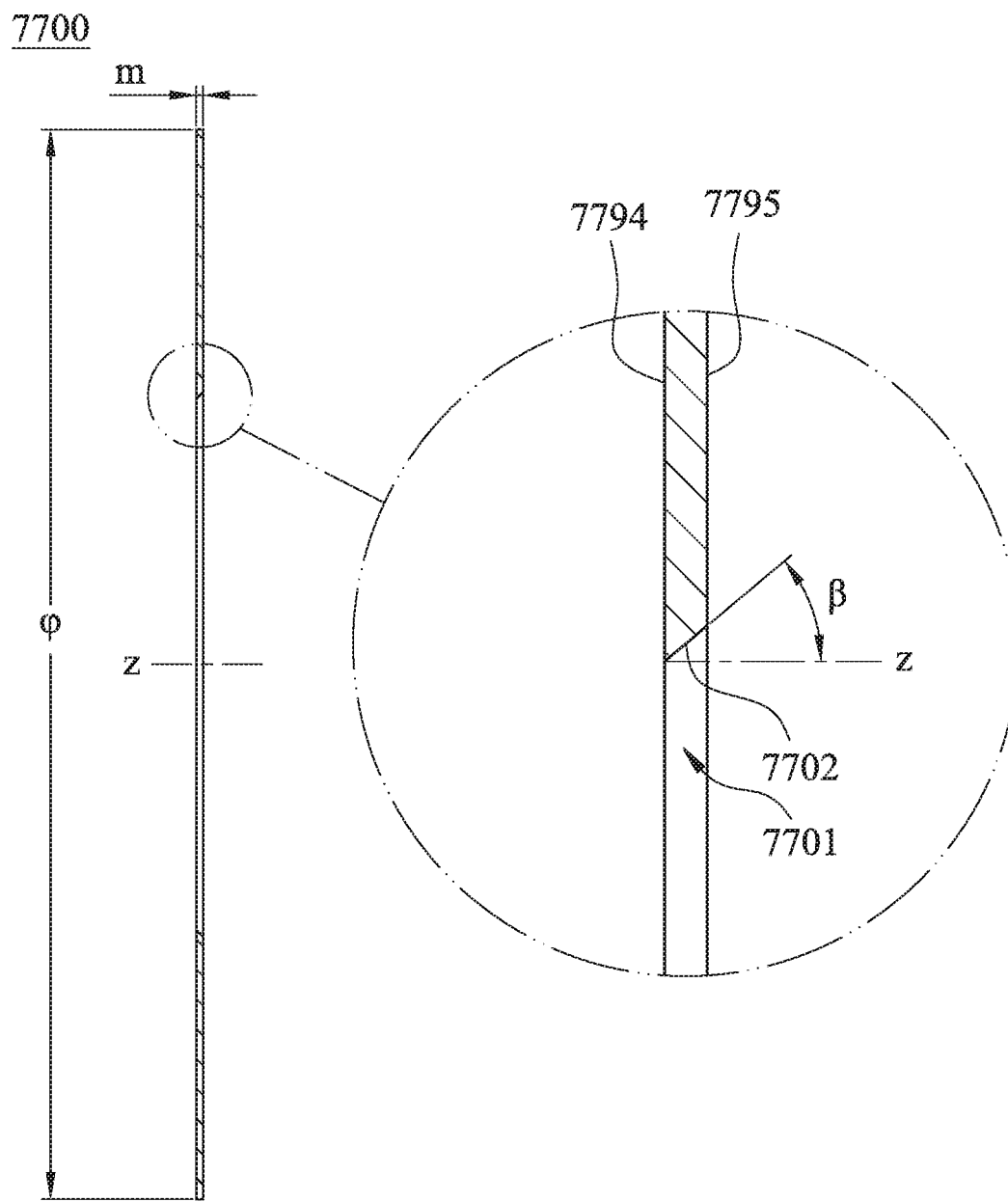
FIG. 10B is a cross-sectional view along line 10B-10B of FIG. 10A.
Figure 10C:
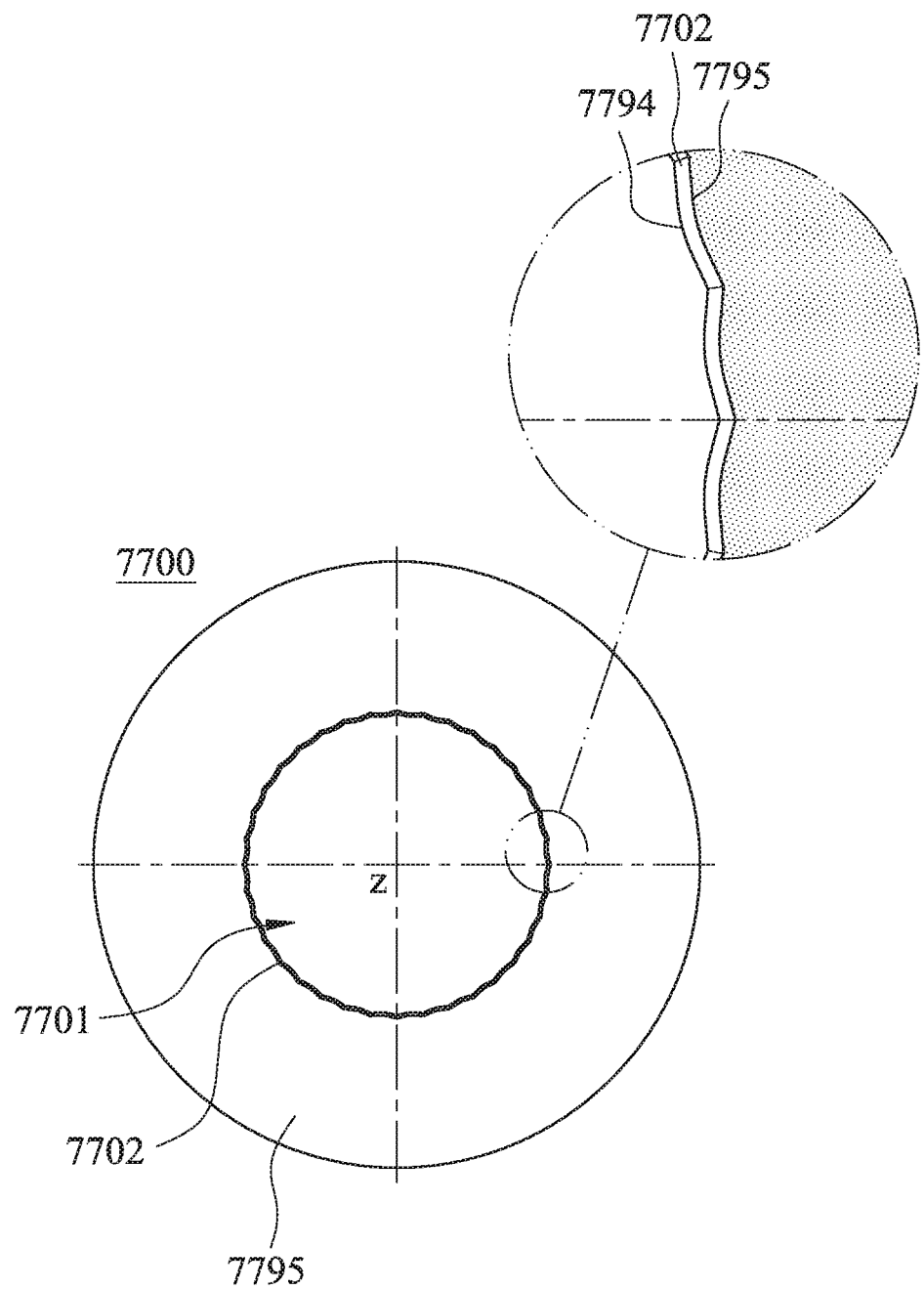
FIG. 10C is a bottom view of the light blocking sheet according to FIG. 10A.
Figure 10D:
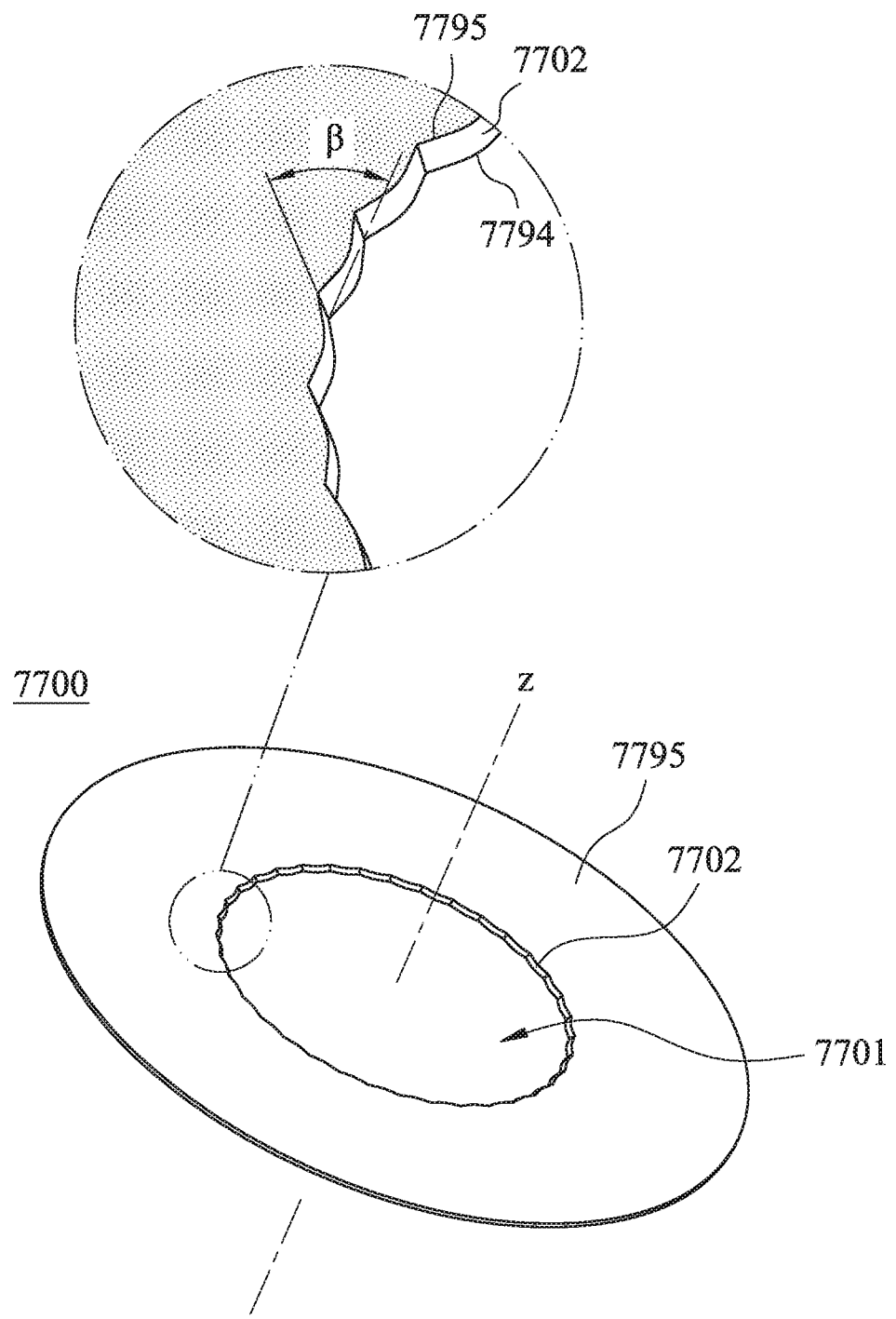
FIG. 10D is a three-dimensional view of the light blocking sheet according to FIG. 10A.

FIG. 10B is a cross-sectional view along line 10B-10B of FIG. 10A, FIG. 10C is a bottom view of the light blocking sheet 7700 according to FIG. 10A, and FIG. 10D is a three-dimensional view of the light blocking sheet 7700 according to FIG. 10A, wherein the light blocking sheet 7700 in FIG. 10C is viewed from a second outer surface 7795 thereof. An angle between the hole inner surface 7702 and the central axis z is $\beta$, which is shown in FIG. 10B, and the parameter $\beta$ shown in FIG. 10D is just for further understanding the present disclosure. Furthermore, in all cross-sectional planes passing through the central axis z of the light blocking sheet 7700 in FIG. 10A, which are represented by FIG. 10B only, the parameter $\beta$ in every of the cross-sectional planes is with the same value. Specifically, in FIG. 10B to FIG. 10D, the central hole 7701 is gradually and uniformly larger and larger from the first outer surface 7794 to the second outer surface 7795, and thereby the hole inner surface 7702 is gradually and uniformly far away from the central axis, from the first outer surface 7794 to the second outer surface 7795. Therefore, it is favorable for enhancing the image quality of an imaged object of an intense light spot. In addition, values of the parameter $\beta$ of the light blocking sheets 100, 200, 300, 400, 500 and 600 respectively according to the 1st-6th embodiments of the present disclosure are all zero degrees.

Accordingly, the recitations about the inner extended portions 7705 in FIG. 10A (viewed from the first outer surface 7794) in the following paragraphs are also applied to FIG. 10C (viewed from the second outer surface 7795), as well as every of the cross-sectional planes (not shown in drawings) of the light blocking sheet 7700 having normal directions parallel to the central axis z. It could be understood that the differences among FIG. 10A, FIG. 10C and all the cross-sectional planes mentioned in this paragraph are only in the dimension of the inner extended portions 7705.

In FIG. 10A, the hole inner surface 7702 has a first corresponding circle C1 and a second corresponding circle C2, wherein a diameter of the first corresponding circle C1 is greater than a diameter of the second corresponding circle C2.

The inner extended portions 7705 are adjacent to and surround the central hole 7701, wherein each of the inner extended portions 7705 is extended and tapered from the first corresponding circle C1 towards the second corresponding circle C2 and includes an inner surface 7706, and the inner surface 7706 includes an line pair 7710 and an arc section 7720. Furthermore, each of the inner surfaces 7706 has two ends and a position between the two ends, the first corresponding circle C1 being virtual is formed by connecting all of the two ends of the inner surfaces 7706, and the second corresponding circle C2 being virtual is formed by connecting all of the positions between the two ends of the inner surfaces 7706. In the 10th embodiment, the geometric structures of all the inner extended portions 7705 are the same, thus the geometric structures of all the inner surfaces 7706 are the same. Each of the inner extended portions 7705 is extended and tapered towards the central axis z. All the inner extended portions 7705 are connected one by one to surround the central axis z. All the inner surfaces 7706 are connected one by one to form an entire of the hole inner surface 7702.

The line pair 7710 of each of the inner surfaces 7706 includes two line sections 7713 and 7714, wherein each of the line sections 7713 and 7714 is a part of the inner surface 7706 and substantially a straight line. One end of the line section 7713 and one end of the line section 7714 are towards the second corresponding circle C2 and approach to each other, and the other end of the line section 7713 and the other end of the line section 7714 are towards the first corresponding circle C1 and far away from each other.

A middle point of the arc section 7720 is approach to the second corresponding circle C2, and two ends of the arc section 7720 are extended towards the first corresponding circle C1. A center R0 of curvature of the arc section 7720 is farther from the central axis z of the light blocking sheet 7700 than the arc section 7720 is from the central axis z, that is, the arc section 7720 has an inverse radius of curvature.

In the 10th embodiment, the middle point of the arc section 7720 is approach to and further located on the second corresponding circle C2. The two ends of the arc section 7720 are extended towards the first corresponding circle C1, and respectively connected to the one end of the line section 7713 and the one end of the line section 7714. The one end of the line section 7713 and the one end of the line section 7714 are towards the second corresponding circle C2, approach to each other, and respectively connected to the two ends of the arc section 7720. The other end of the line section 7713 and the other end of the line section 7714 are towards and further located on the first corresponding circle C1, and far away from each other.

In the 10th embodiment, the first corresponding circle C1 being virtual is formed by connecting all of the other ends of the line sections 7713 and all of the other ends of the line sections 7714, and the second corresponding circle C2 being virtual is formed by connecting all of the middle points of the arc sections 7720. Furthermore, each of the inner surfaces 7706 is composed of the line section 7713, the arc section 7720 and the line section 7714. The other end of the line section 7713 and the other end of the line section 7714 are respectively the two ends of the inner surface 7706.

In the 10th embodiment, a distance between the two ends of the inner surface 7706 of each of the inner extended portions 7705 is w, wherein the distance w is also a distance between the other end of the line section 7713 and the other end of the line section 7714.

Furthermore, in FIG. 10A to FIG. 10D, because the central hole 7701 is gradually and uniformly larger and larger from the first outer surface 7794 to the second outer surface 7795, it could be understood that the values of the parameters $\varphi1$, $\varphi2$, w, and $\pi \times (\varphi1-\varphi2)/(2 \times w)$ all slightly change from the first outer surface 7794 to the second outer surface 7795. That is, the values of the parameters $\varphi1$, $\varphi2$ and w are all gradually slightly greater and greater from the first outer surface 7794 to the second outer surface 7795, and the value of the parameter $\pi \times (\varphi-\varphi2)/(2 \times w)$ is gradually slightly smaller and smaller from the first outer surface 7794 to the second outer surface 7795.

The light blocking sheet 7700 with the inner extended portions 7705 is formed integrally. The light blocking sheet 7700 may be a composite light blocking sheet. Furthermore, the material arrangement of the light blocking sheet 7700 may be the same as the material arrangement of the light blocking sheet 100 of the 1st embodiment according to the present disclosure, shown as FIG. 1A and FIG. 1D.

The data of the parameters $\varphi1$, $\varphi2$, $\varphi1-\varphi2$, h, w, $\pi \times (\varphi1-\varphi2)/(2 \times w)$, $\theta$, R, N, $\alpha$, $\varphi$, m and $\beta$ of the light blocking sheet 7700 according to the 10th embodiment of the present disclosure are listed in the following Table 10, wherein the parameters are also shown as FIG. 10A and FIG. 10B. The definitions of these parameters shown in Table 10 are the same as those stated in the light blocking sheet 100 of the 1st embodiment and the light blocking sheet 200 of the 2nd embodiment with corresponding values for the light blocking sheet 7700.

TABLE 10

| 10th Embodiment | | | |
|---|---|---|---|
| φ1 (mm) | 1.840~1.879 | R (mm) | 0.2 |
| φ2 (mm) | 1.811~1.850 | N | 36 |
| φ1 − φ2 (mm) | 0.029 | α (deg.) | 10.0 |
| h (mm) | 0.0145 | φ (mm) | 3.7 |
| w (mm) | 0.160~0.164 | m (mm) | 0.023 |
| π × (φ1 − φ2)/(2 × w) | 0.280~0.287 | β (deg.) | 40 |
| θ (deg.) | 160 | | |

11th Embodiment

Figure 11A:
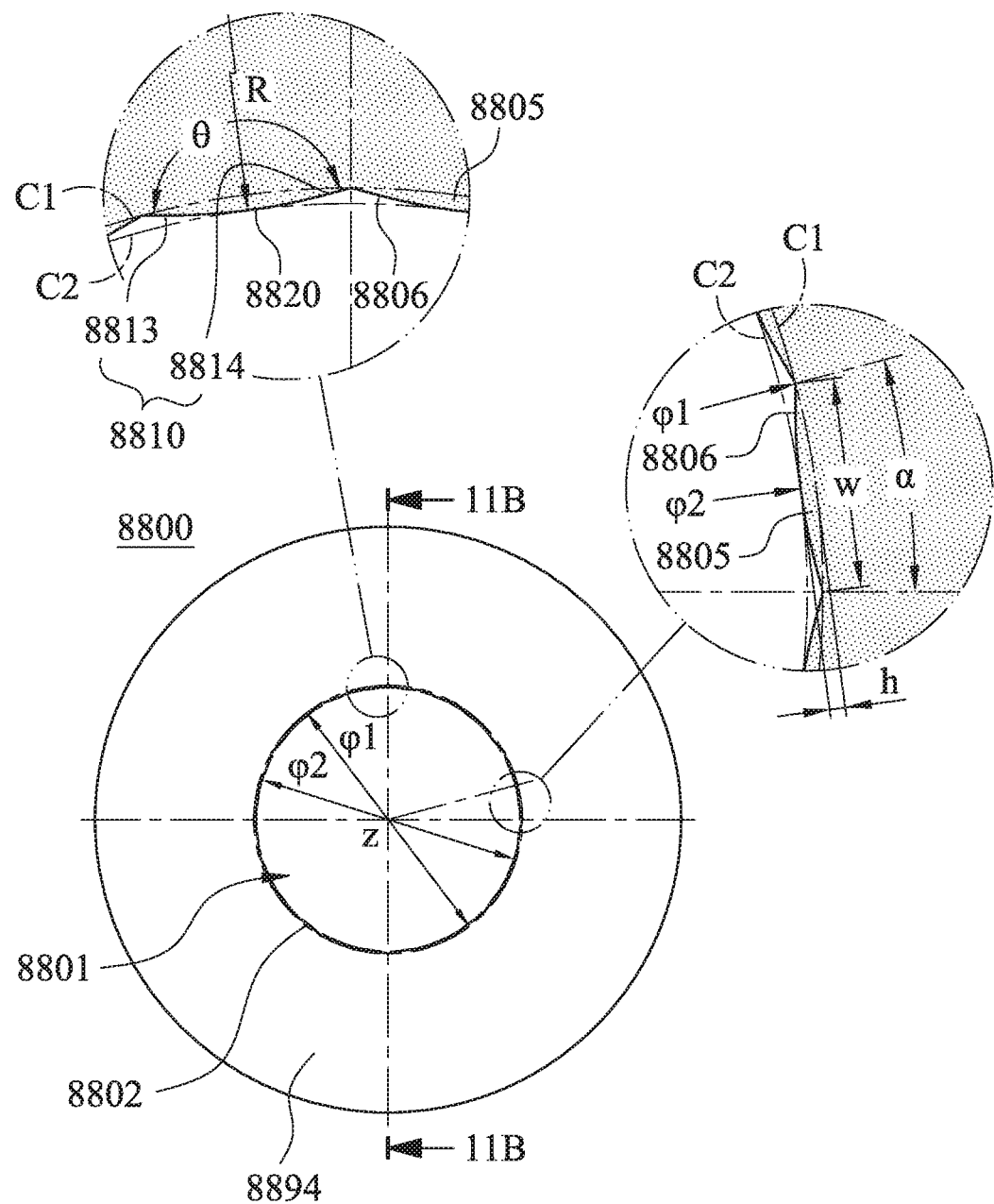
FIG. 11A is a top view of a light blocking sheet according to the 11th embodiment of the present disclosure.

FIG. 11A is a top view of a light blocking sheet 8800 according to the 11th embodiment of the present disclosure, wherein the light blocking sheet 8800 in FIG. 11A is viewed from a first outer surface 8894 thereof. In FIG. 11A, the light blocking sheet 8800 having a central axis z includes a central hole 8801 and a plurality of inner extended portions 8805. The central axis z passes through the central hole 8801, which is enclosed by a hole inner surface 8802.

Figure 11B:
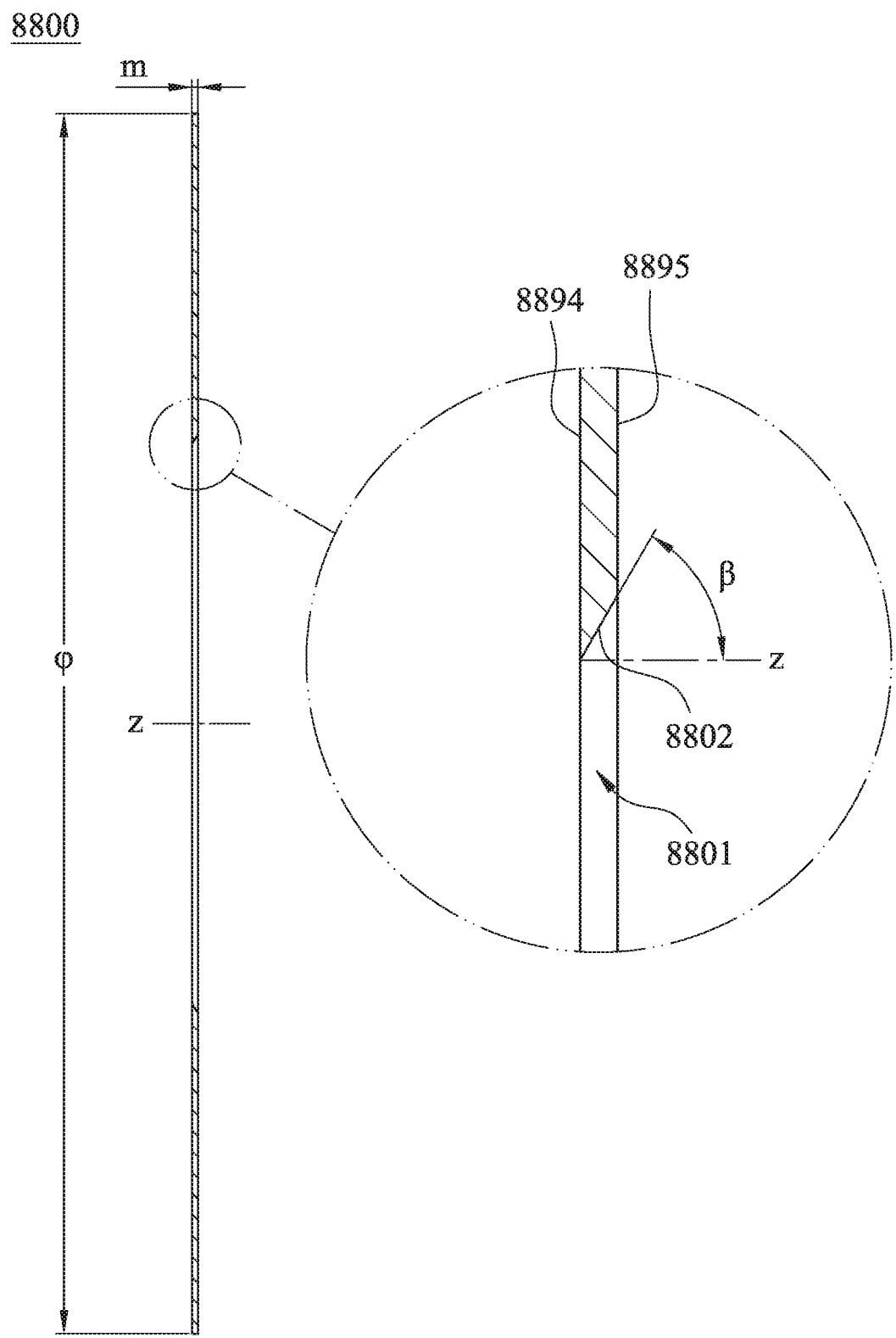
FIG. 11B is a cross-sectional view along line 11B-11B of FIG. 11A.
Figure 11C:
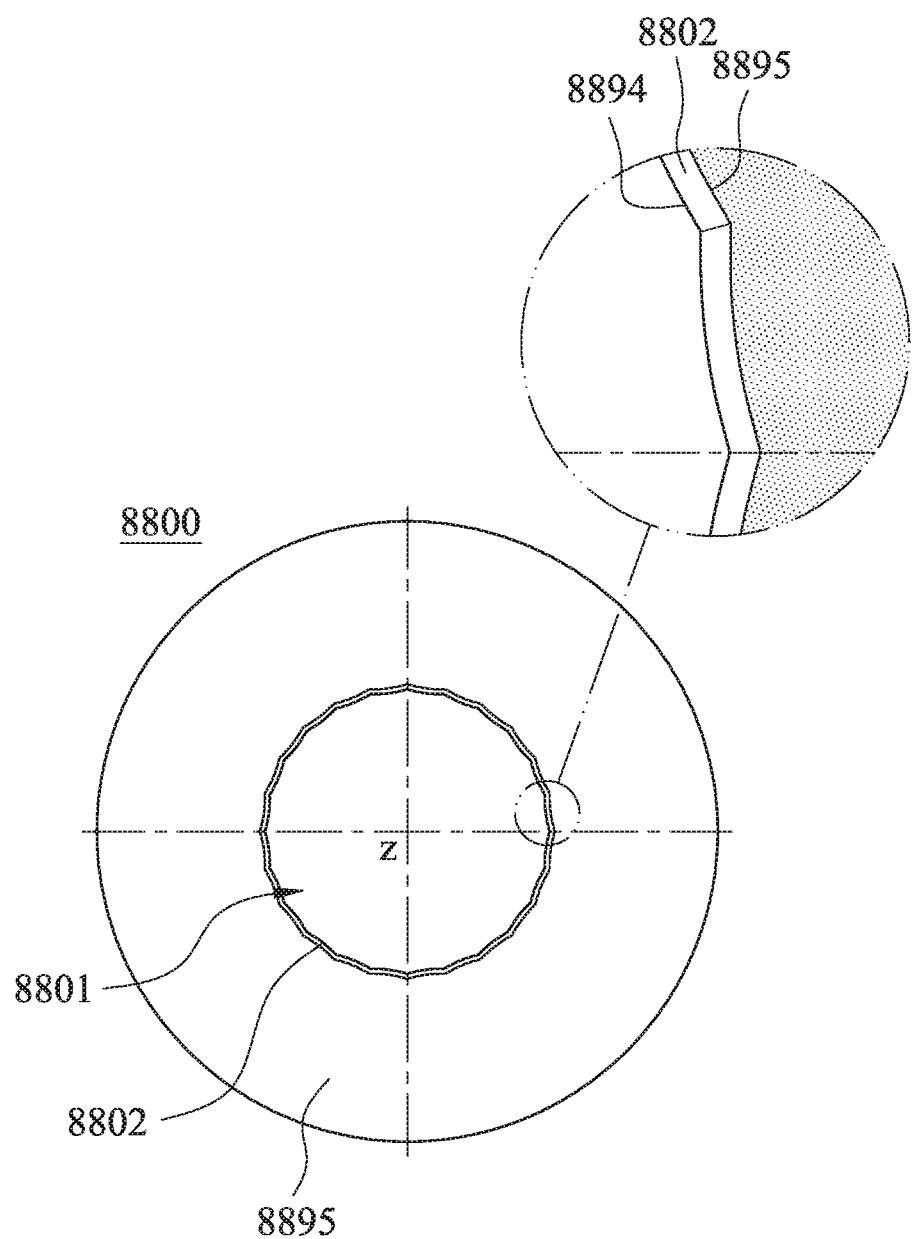
FIG. 11C is a bottom view of the light blocking sheet according to FIG. 11A.
Figure 11D:
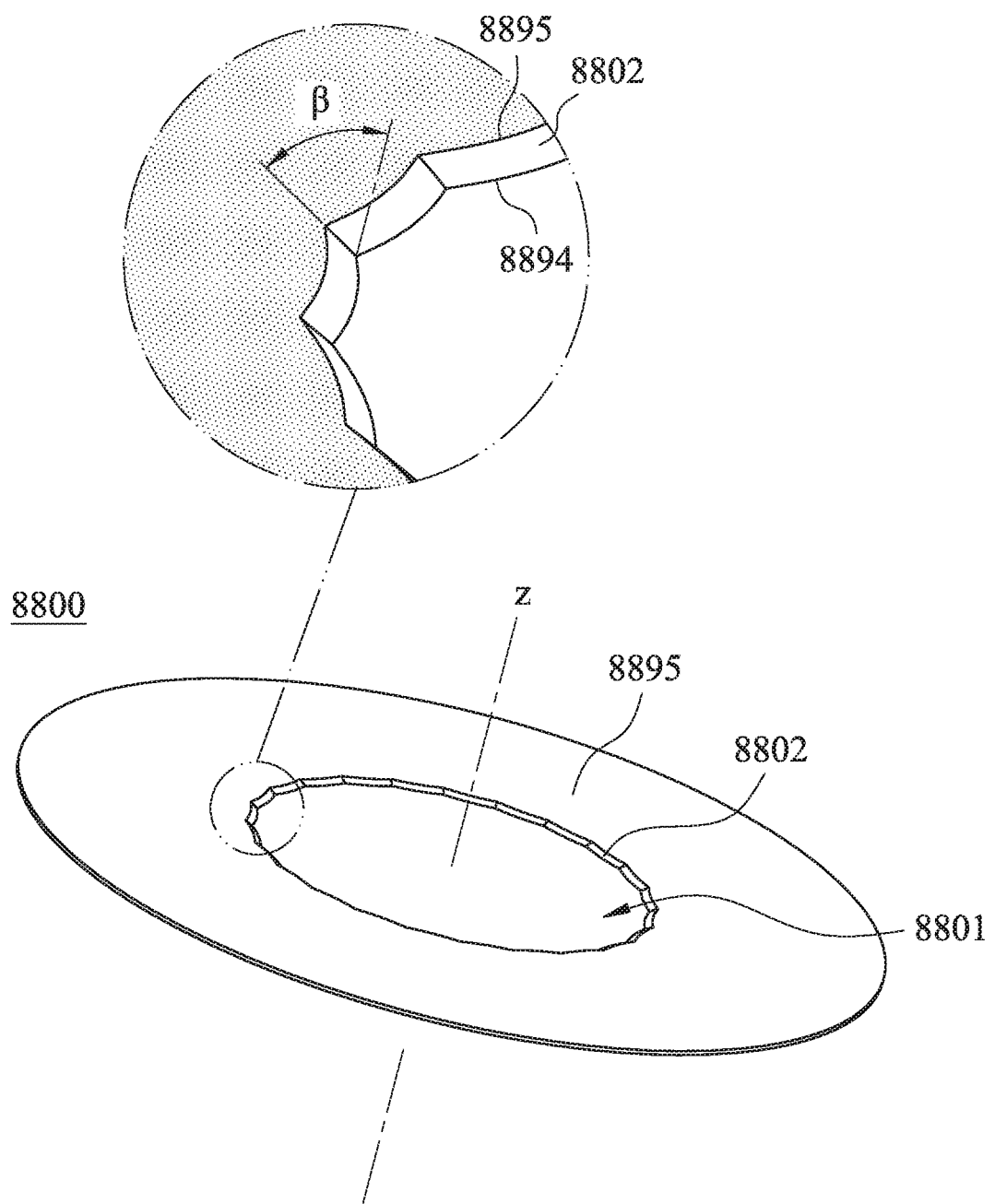
FIG. 11D is a three-dimensional view of the light blocking sheet according to FIG. 11A.

FIG. 11B is a cross-sectional view along line 11B-11B of FIG. 11A, FIG. 1C is a bottom view of the light blocking sheet 8800 according to FIG. 11A, and FIG. 11D is a three-dimensional view of the light blocking sheet 8800 according to FIG. 11A, wherein the light blocking sheet 8800 in FIG. 11C is viewed from a second outer surface 8895 thereof. An angle between the hole inner surface 8802 and the central axis z is β, which is shown in FIG. 11B, and the parameter β shown in FIG. 11D is just for further understanding the present disclosure. Furthermore, in all cross-sectional planes passing through the central axis z of the light blocking sheet 8800 in FIG. 11A, which are represented by FIG. 11B only, the parameter β in every of the cross-sectional planes is with the same value. Specifically, in FIG. 11B to FIG. 11D, the central hole 8801 is gradually and uniformly larger and larger from the first outer surface 8894 to the second outer surface 8895, and thereby the hole inner surface 8802 is gradually and uniformly far away from the central axis, from the first outer surface 8894 to the second outer surface 8895.

Accordingly, the recitations about the inner extended portions 8805 in FIG. 11A (viewed from the first outer surface 8894) in the following paragraphs are also applied to FIG. 11C (viewed from the second outer surface 8895), as well as every of the cross-sectional planes (not shown in drawings) of the light blocking sheet 8800 having normal directions parallel to the central axis z. It could be understood that the differences among FIG. 11A, FIG. 11C and all the cross-sectional planes mentioned in this paragraph are only in the dimension of the inner extended portions 8805.

In FIG. 11A, the hole inner surface 8802 has a first corresponding circle C1 and a second corresponding circle C2, wherein a diameter of the first corresponding circle C1 is greater than a diameter of the second corresponding circle C2.

The inner extended portions 8805 are adjacent to and surround the central hole 8801, wherein each of the inner extended portions 8805 is extended and tapered from the first corresponding circle C1 towards the second corresponding circle C2 and includes an inner surface 8806, and the inner surface 8806 includes an line pair 8810 and an arc section 8820. Furthermore, each of the inner surfaces 8806 has two ends and a position between the two ends, the first corresponding circle C1 being virtual is formed by connecting all of the two ends of the inner surfaces 8806, and the second corresponding circle C2 being virtual is formed by connecting all of the positions between the two ends of the inner surfaces 8806. In the 11th embodiment, the geometric structures of all the inner extended portions 8805 are the same, thus the geometric structures of all the inner surfaces 8806 are the same. Each of the inner extended portions 8805 is extended and tapered towards the central axis z. All the inner extended portions 8805 are connected one by one to surround the central axis z. All the inner surfaces 8806 are connected one by one to form an entire of the hole inner surface 8802.

The line pair 8810 of each of the inner surfaces 8806 includes two line sections 8813 and 8814, wherein each of the line sections 8813 and 8814 is a part of the inner surface 8806 and substantially a straight line. One end of the line section 8813 and one end of the line section 8814 are towards the second corresponding circle C2 and approach to each other, and the other end of the line section 8813 and the other end of the line section 8814 are towards the first corresponding circle C1 and far away from each other.

A middle point of the arc section 8820 is approach to the second corresponding circle C2, and two ends of the arc section 8820 are extended towards the first corresponding circle C1. A center (not shown in drawings) of curvature of the arc section 8820 is farther from the central axis z of the light blocking sheet 8800 than the arc section 8820 is from the central axis z, that is, the arc section 8820 has an inverse radius of curvature.

In the 11th embodiment, the middle point of the arc section 8820 is approach to and further located on the second corresponding circle C2. The two ends of the arc section 8820 are extended towards the first corresponding circle C1, and respectively connected to the one end of the line section 8813 and the one end of the line section 8814. The one end of the line section 8813 and the one end of the line section 8814 are towards the second corresponding circle C2, approach to each other, and respectively connected to the two ends of the arc section 8820. The other end of the line section 8813 and the other end of the line section 8814 are towards and further located on the first corresponding circle C1, and far away from each other.

In the 11th embodiment, the first corresponding circle C1 being virtual is formed by connecting all of the other ends of the line sections 8813 and all of the other ends of the line sections 8814, and the second corresponding circle C2 being virtual is formed by connecting all of the middle points of the arc sections 8820. Furthermore, each of the inner surfaces 8806 is composed of the line section 8813, the arc section 8820 and the line section 8814. The other end of the line section 8813 and the other end of the line section 8814 are respectively the two ends of the inner surface 8806.

In the 11th embodiment, a distance between the two ends of the inner surface 8806 of each of the inner extended portions 8805 is w, wherein the distance w is also a distance between the other end of the line section 8813 and the other end of the line section 8814.

Furthermore, in FIG. 11A to FIG. 11D, because the central hole 8801 is gradually and uniformly larger and larger from the first outer surface 8894 to the second outer surface 8895, it could be understood that the values of the parameters φ1, φ2, w, and π×(φ1−φ2)/(2×w) all slightly change from the first outer surface 8894 to the second outer surface 8895. That is, the values of the parameters φ1, φ2 and w are all gradually slightly greater and greater from the first outer surface 8894 to the second outer surface 8895, and the value of the parameter π×(φ1−φ2)/(2×w) is gradually slightly smaller and smaller from the first outer surface 8894 to the second outer surface 8895.

The light blocking sheet 8800 with the inner extended portions 8805 is formed integrally. The light blocking sheet 8800 may be a composite light blocking sheet. Furthermore, the material arrangement of the light blocking sheet 8800 may be the same as the material arrangement of the light blocking sheet 100 of the 1st embodiment according to the present disclosure, shown as FIG. 1A and FIG. 1D.

The data of the parameters φ1, φ2, φ1−φ2, h, w, π×(φ1−φ2)/(2×w), θ, R, N, α, φ, m and β of the light blocking sheet 8800 according to the 11th embodiment of the present disclosure are listed in the following Table 11, wherein the parameters are also shown as FIG. 11A and FIG. 11B. The definitions of these parameters shown in Table 11 are the same as those stated in the light blocking sheet 100 of the 1st embodiment and the light blocking sheet 200 of the 2nd embodiment with corresponding values for the light blocking sheet 8800.

TABLE 11

| 11th Embodiment | | | |
|---|---|---|---|
| φ1 (mm) | 2.20~2.28 | R (mm) | 0.8 |
| φ2 (mm) | 2.157~2.237 | N | 24 |
| φ1 − φ2 (mm) | 0.043 | α (deg.) | 15 |
| h (mm) | 0.0215 | φ (mm) | 4.8 |
| w (mm) | 0.287~0.298 | m (mm) | 0.023 |
| π × (φ1 − φ2)/(2 × w) | 0.225~0.234 | β (deg.) | 60 |
| θ (deg.) | 165 | | |

12th Embodiment

Figure 12A:
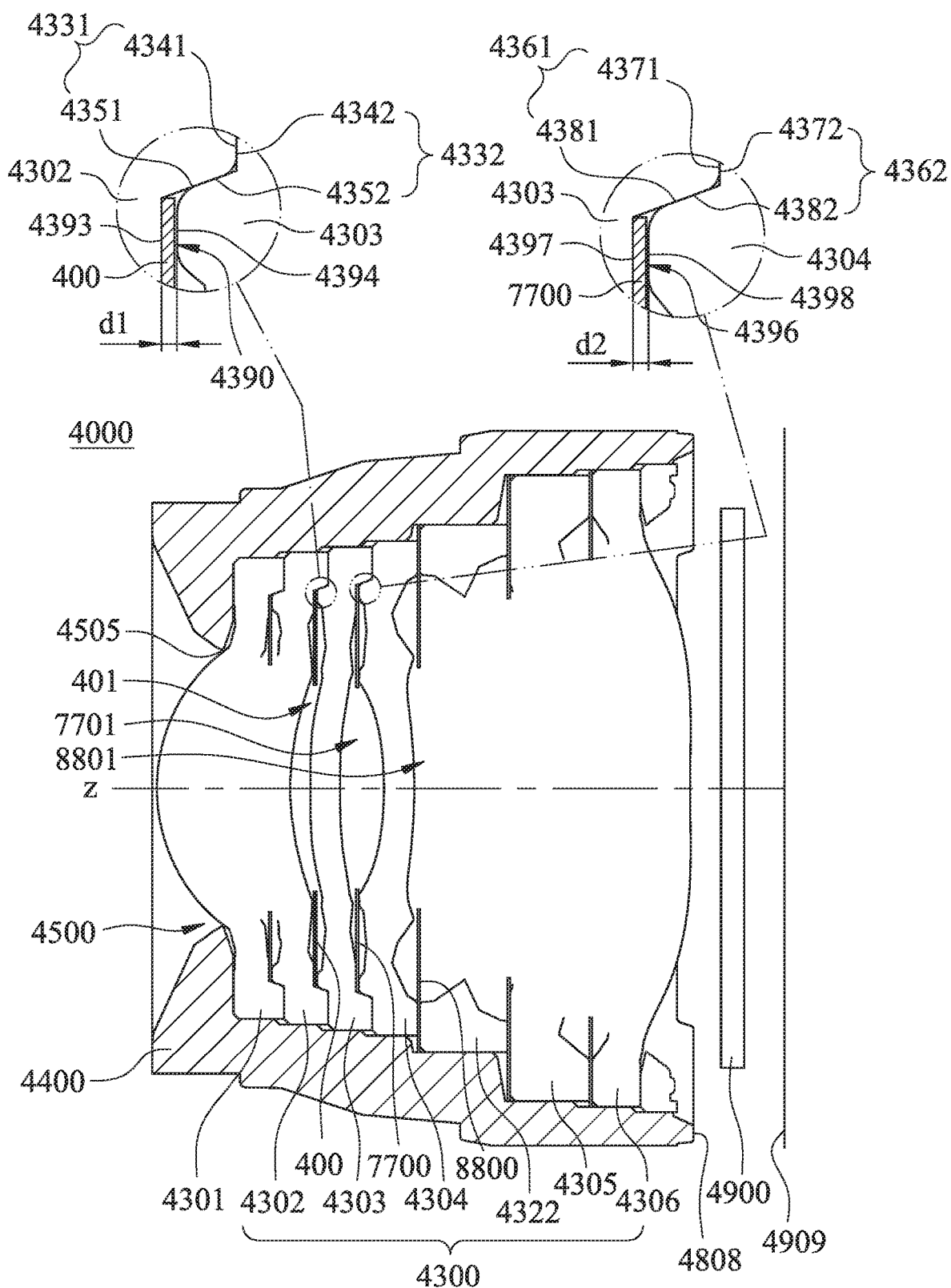
FIG. 12A is a schematic view of an imaging lens assembly according to the 12th embodiment of the present disclosure.

FIG. 12A is a schematic view of an imaging lens assembly 4000 according to the 12th embodiment of the present disclosure (some details about lens elements are omitted). In FIG. 12A, the imaging lens assembly 4000 includes an optical lens set 4300 and a plastic barrel 4400.

The optical lens set 4300 includes the light blocking sheet 400 of the 4th embodiment according to the present disclosure and at least two lens elements (at least lens elements 4302 and 4303), wherein the light blocking sheet 400 is disposed between one lens element (the lens element 4302) and another lens element (the lens element 4303). The other details of the light blocking sheet 400 have been described in the foregoing paragraphs of the 4th embodiment and will not be described again herein.

The optical lens set 4300 with the light blocking sheet 400 is disposed along the central axis z (i.e. an optical axis of the imaging lens assembly 4000) in the plastic barrel 4400. The plastic barrel 4400 includes a barrel hole 4500, wherein a minimum diameter position 4505 of the barrel hole 4500 and the central hole 401 of the light blocking sheet 400 are corresponding to each other along the central axis z.

Figure 12B:
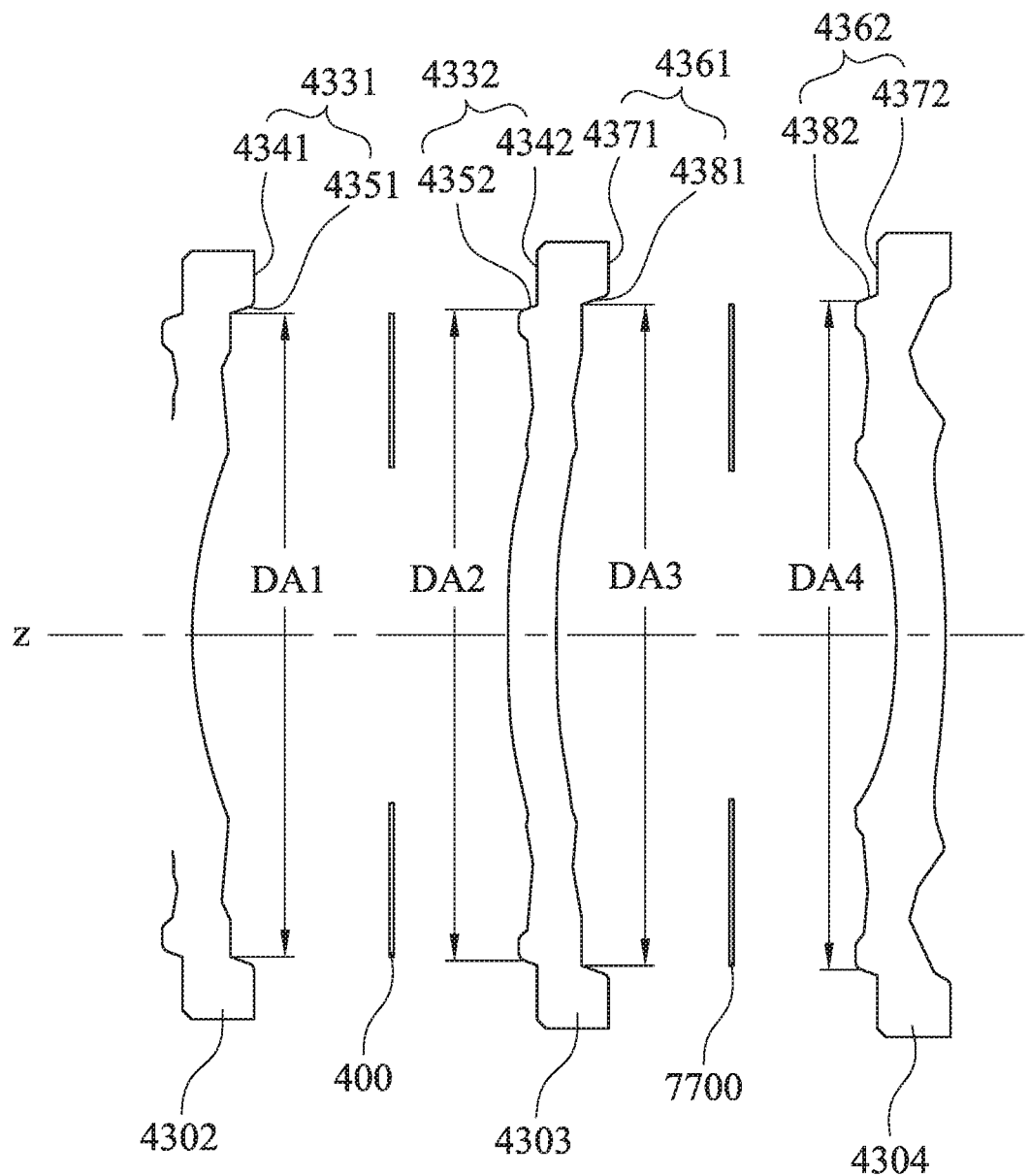
FIG. 12B is an exploded view of the light blocking sheets and the lens elements according to FIG. 12A.

FIG. 12B is an exploded view of the light blocking sheets 400, 7700, lens elements 4302, 4303 and 4304 according to FIG. 12A. In FIG. 12A and FIG. 12B, the lens element 4302 of the optical lens set 4300 includes a first connecting structure 4331, wherein the first connecting structure 4331 includes a first receiving surface 4341 and a first conical surface 4351. The lens element 4303 of the optical lens set 4300 includes a second connecting structure 4332, wherein the second connecting structure 4332 includes a second receiving surface 4342 and a second conical surface 4352, the first receiving surface 4341 and the second receiving surface 4342 are corresponding and connected to each other, the first conical surface 4351 and the second conical surface 4352 are corresponding and connected to each other, the first connecting structure 4331 and the second connecting structure 4332 are for aligning the lens elements 4302 and 4303 with the central axis z, and the outer diameter of the light blocking sheet 400 is smaller than an outer diameter of the lens element 4302 and an outer diameter of the lens element 4303. In the 12th embodiment, each of the first receiving surface 4341 and the second receiving surface 4342 is an annular surface with a normal direction parallel to the central axis z, and each of the first conical surface 4351 and the second conical surface 4352 is a conically annular surface with respect to the central axis z, wherein the first receiving surface 4341 is farther from the central axis z than the first conical surface 4351 is from the central axis z, and the second receiving surface 4342 is farther from the central axis z than the second conical surface 4352 is from the central axis z.

A receiving space 4390 is defined by the lens elements 4302 and 4303, wherein the receiving space 4390 is closer to the central axis z than both the first conical surface 4351 and the second conical surface 4352 are to the central axis z, and the light blocking sheet 400 is received in the receiving space 4390. In the 12th embodiment, a minimum diameter of the first conical surface 4351 is DA1, a minimum diameter of the second conical surface 4352 is DA2, and a width parallel to the central axis z of the receiving space 4390 is d1. It is shown in Table 4 and Table 12 that the outer diameter (φ) of the light blocking sheet 400 is equal to the minimum diameter (DA1) of the first conical surface 4351, and the outer diameter (φ) of the light blocking sheet 400 is smaller than the minimum diameter (DA2) of the second conical surface 4352.

Furthermore, the lens element 4302 further includes a receiving surface 4393, which is closer to the central axis z than the first conical surface 4351 is to the central axis z. The lens element 4303 further includes a receiving surface 4394, which is closer to the central axis z than the second conical surface 4352 is to the central axis z. The receiving surfaces 4393 and 4394 are corresponding and not connected to each other for defining the receiving space 4390 aforementioned, that is, the receiving space 4390 is formed between the receiving surfaces 4393 and 4394. The light blocking sheet 400 is received in the receiving space 4390.

In addition, the receiving space 4390 includes an air gap (its reference numeral is omitted), wherein the air gap is located between the light blocking sheet 400 and the receiving surface 4393 or between the light blocking sheet 400 and the receiving surface 4394.

In FIG. 12A, the imaging lens assembly 4000 includes the optical lens set 4300, a glass panel 4900 and an image surface 4909 in order from an object side to an image side. The optical lens set 4300 includes lens elements 4301, 4302, 4303, 4304, 4305, and 4306 in order from the object side to the image side, wherein the optical lens set 4300 has a total of six lens elements (4301, 4302, 4303, 4304, 4305, and 4306), which are disposed along the optical axis of the imaging lens assembly 4000 in the plastic barrel 4400. Furthermore, the optical lens set 4300 further includes other optical elements, such as the light blocking sheet 400 disposed between the lens elements 4302 and 4303, the light blocking sheet 7700 of the 10th embodiment according to the present disclosure disposed between the lens elements 4303 and 4304, and the light blocking sheet 8800 of the 11th embodiment according to the present disclosure disposed between the lens elements 4304 and a spacer 4322. The minimum diameter position 4505 of the barrel hole 4500, the central hole 401 of the light blocking sheet 400, the central hole 7701 of the light blocking sheet 7700 and the central hole 8801 of the light blocking sheet 8800 are corresponding to each other along the central axis z. The other details of the light blocking sheet 7700 described in the foregoing paragraphs of the 10th embodiment and the other details of the light blocking sheet 8800 described in the foregoing paragraphs of the 11th embodiment will not be described again herein.

In FIG. 12A and FIG. 12B, the lens element 4303 of the optical lens set 4300 includes a first connecting structure 4361, wherein the first connecting structure 4361 includes a first receiving surface 4371 and a first conical surface 4381. The lens element 4304 of the optical lens set 4300 includes a second connecting structure 4362, wherein the second connecting structure 4362 includes a second receiving surface 4372 and a second conical surface 4382, the first receiving surface 4371 and the second receiving surface 4372 are corresponding and connected to each other, the first conical surface 4381 and the second conical surface 4382 are corresponding and connected to each other, the first connecting structure 4361 and the second connecting structure 4362 are for aligning the lens elements 4303 and 4304 with the central axis z, and the outer diameter of the light blocking sheet 7700 is smaller than an outer diameter of the lens element 4303 and an outer diameter of the lens element 4304. In the 12th embodiment, each of the first receiving surface 4371 and the second receiving surface 4372 is an annular surface with a normal direction parallel to the central axis z, and each of the first conical surface 4381 and the second conical surface 4382 is a conically annular surface with respect to the central axis z, wherein the first receiving surface 4371 is farther from the central axis z than the first conical surface 4381 is from the central axis z, and the second receiving surface 4372 is farther from the central axis z than the second conical surface 4382 is from the central axis z.

A receiving space 4396 is defined by the lens elements 4303 and 4304, wherein the receiving space 4396 is closer to the central axis z than both the first conical surface 4381 and the second conical surface 4382 are to the central axis z, and the light blocking sheet 7700 is received in the receiving space 4396. In the 12th embodiment, a minimum diameter of the first conical surface 4381 is DA3, a minimum diameter of the second conical surface 4382 is DA4, and a width parallel to the central axis z of the receiving space 4396 is d2. It is shown in Table 10 and Table 12 that the outer diameter (φ) of the light blocking sheet 7700 is equal to the minimum diameter (DA3) of the first conical surface 4381, and the outer diameter (φ) of the light blocking sheet 7700 is smaller than the minimum diameter (DA4) of the second conical surface 4382.

Furthermore, the lens element 4303 further includes a receiving surface 4397, which is closer to the central axis z than the first conical surface 4381 is to the central axis z. The lens element 4304 further includes a receiving surface 4398, which is closer to the central axis z than the second conical surface 4382 is to the central axis z. The receiving surfaces 4397 and 4398 are corresponding and not connected to each other for defining the receiving space 4396 aforementioned, that is, the receiving space 4396 is formed between the receiving surfaces 4397 and 4398. The light blocking sheet 7700 is received in the receiving space 4396.

In addition, the receiving space 4396 includes an air gap (its reference numeral is omitted), wherein the air gap is located between the light blocking sheet 7700 and the receiving surface 4397 or between the light blocking sheet 7700 and the receiving surface 4398.

The first conical surface 4351 and the second conical surface 4352 are for aligning the light blocking sheet 400 with the lens elements 4302 and 4303, i.e. with the central axis z. The first conical surface 4381 and the second conical surface 4382 are for aligning the light blocking sheet 7700 with the lens elements 4303 and 4304, i.e. with the central axis z.

Figure 12C:
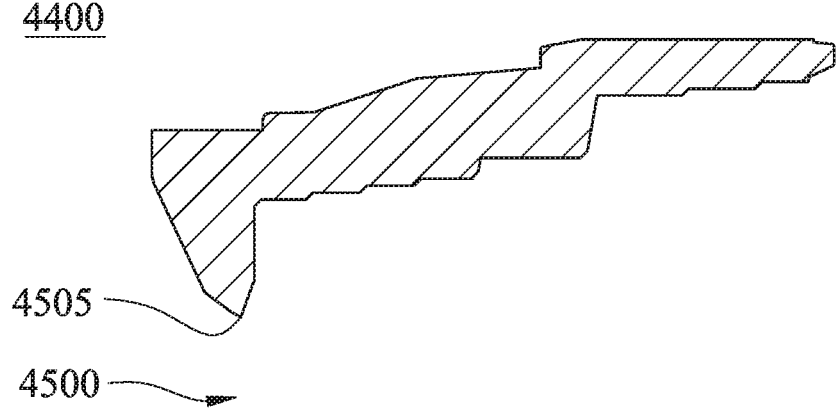
FIG. 12C is a schematic view of the plastic barrel according to FIG. 12A.
Figure 12C:
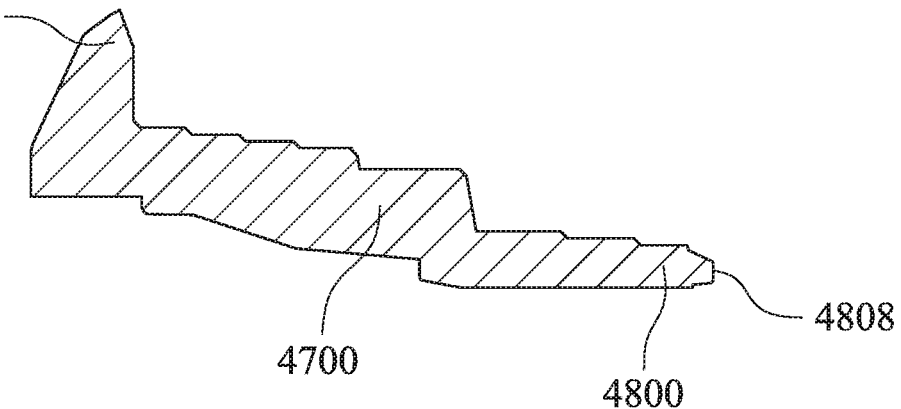
Figure 12D:
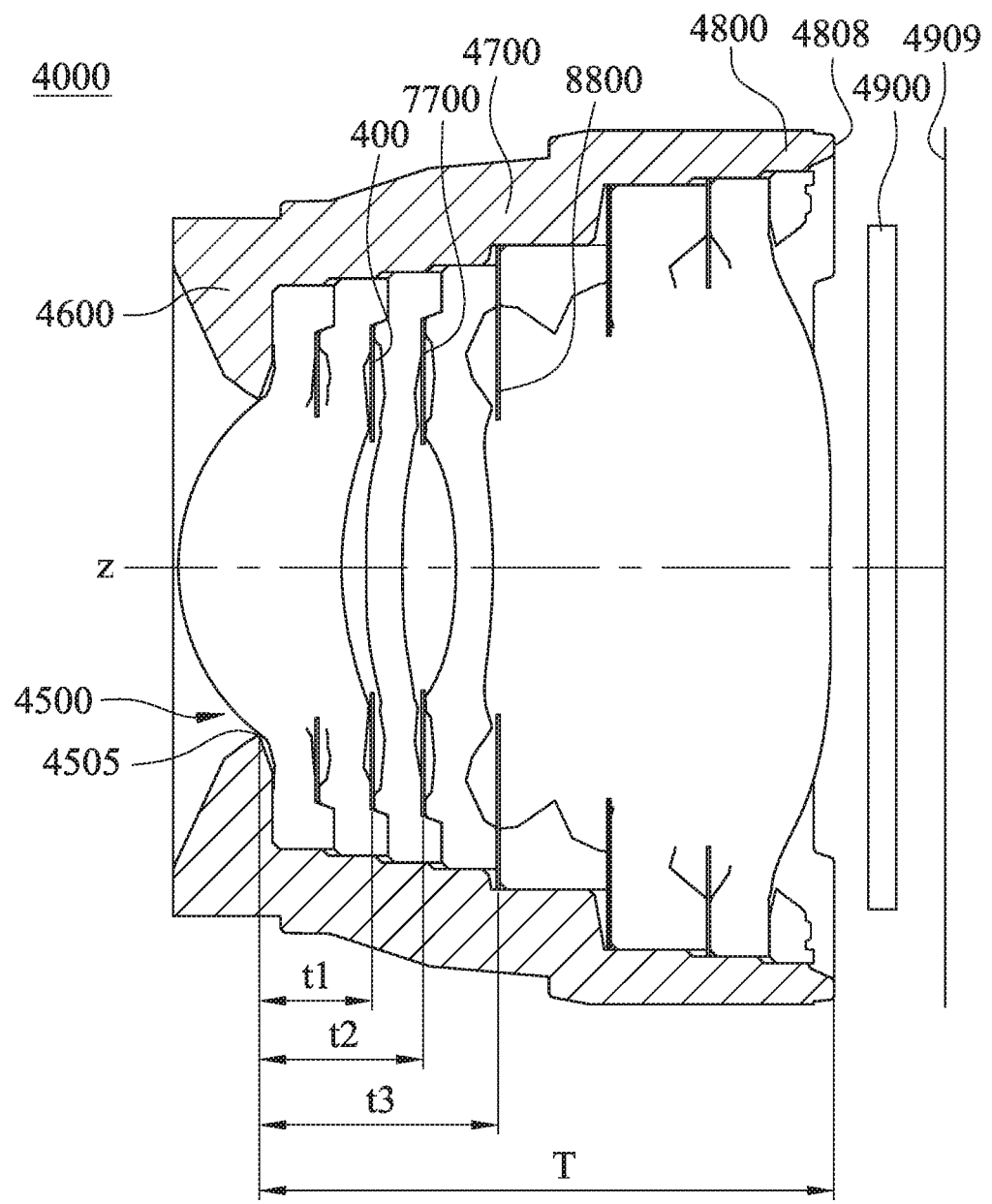
FIG. 12D is a schematic view of the parameters T, t1, t2 and t3 according to FIG. 12A.

The minimum diameter position 4505 of the barrel hole 4500 is an aperture stop of the imaging lens assembly 4000. FIG. 12C is a schematic view of the plastic barrel 4400 according to FIG. 12A, and FIG. 12D is a schematic view of the parameters T, t1, t2 and t3 according to FIG. 12A. In FIG. 12C and FIG. 12D, the plastic barrel 4400 further includes an object-end portion 4600, an image-end portion 4800 and a tube portion 4700. The image-end portion 4800 is disposed opposite to the object-end portion 4600 and includes an outer image-end surface 4808, wherein the outer image-end surface 4808 faces the image surface 4909 of the imaging lens assembly 4000. The tube portion 4700 connects the object-end portion 4600 and the image-end portion 4800. The minimum diameter position 4505 of the barrel hole 4500 is located at the object-end portion 4600.

In FIG. 12D, a distance parallel to the central axis z between the central hole 401 of the light blocking sheet 400 and the minimum diameter position 4505 of the barrel hole 4500 is t1, a distance parallel to the central axis z between the central hole 7701 of the light blocking sheet 7700 and the minimum diameter position 4505 of the barrel hole 4500 is t2, a distance parallel to the central axis z between the central hole 8801 of the light blocking sheet 8800 and the minimum diameter position 4505 of the barrel hole 4500 is t3, and the parameters t1, t2 and t3 are agreed with the definition of the parameter t according to the recitations of the 7th embodiment and claims of the present disclosure.

The data of the aforementioned parameters of the imaging lens assembly 4000 according to the 12th embodiment of the present disclosure are listed in the following Table 12, wherein the parameters are also shown as FIG. 12A, FIG. 12B and FIG. 12D.

TABLE 12

| 12th Embodiment | | | |
| --- | --- | --- | --- |
| DA1 (mm) | 3.6 | t1 (mm) | 0.841 |
| DA2 (mm) | 3.644 | t2 (mm) | 1.222 |
| DA3 (mm) | 3.7 | t3 (mm) | 1.782 |
| DA4 (mm) | 3.744 | t1/T | 0.197 |
| d1 (mm) | 0.027 | t2/T | 0.286 |
| d2 (mm) | 0.027 | t3/T | 0.416 |
| T (mm) | 4.28 | | |

13th Embodiment

Figure 13A:
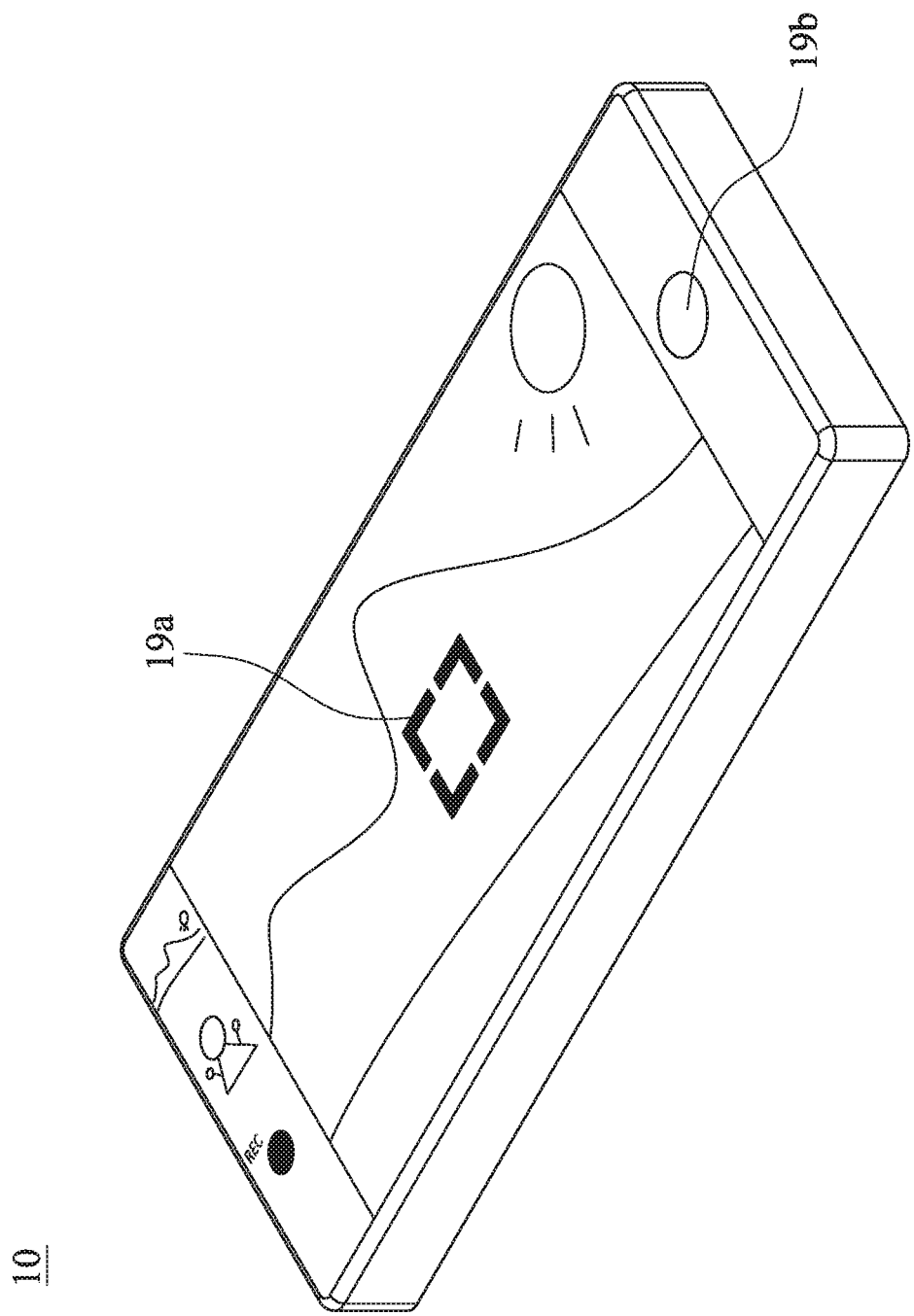
FIG. 13A shows a schematic view of an electronic device according to the 13th embodiment of the present disclosure.
Figure 13B:
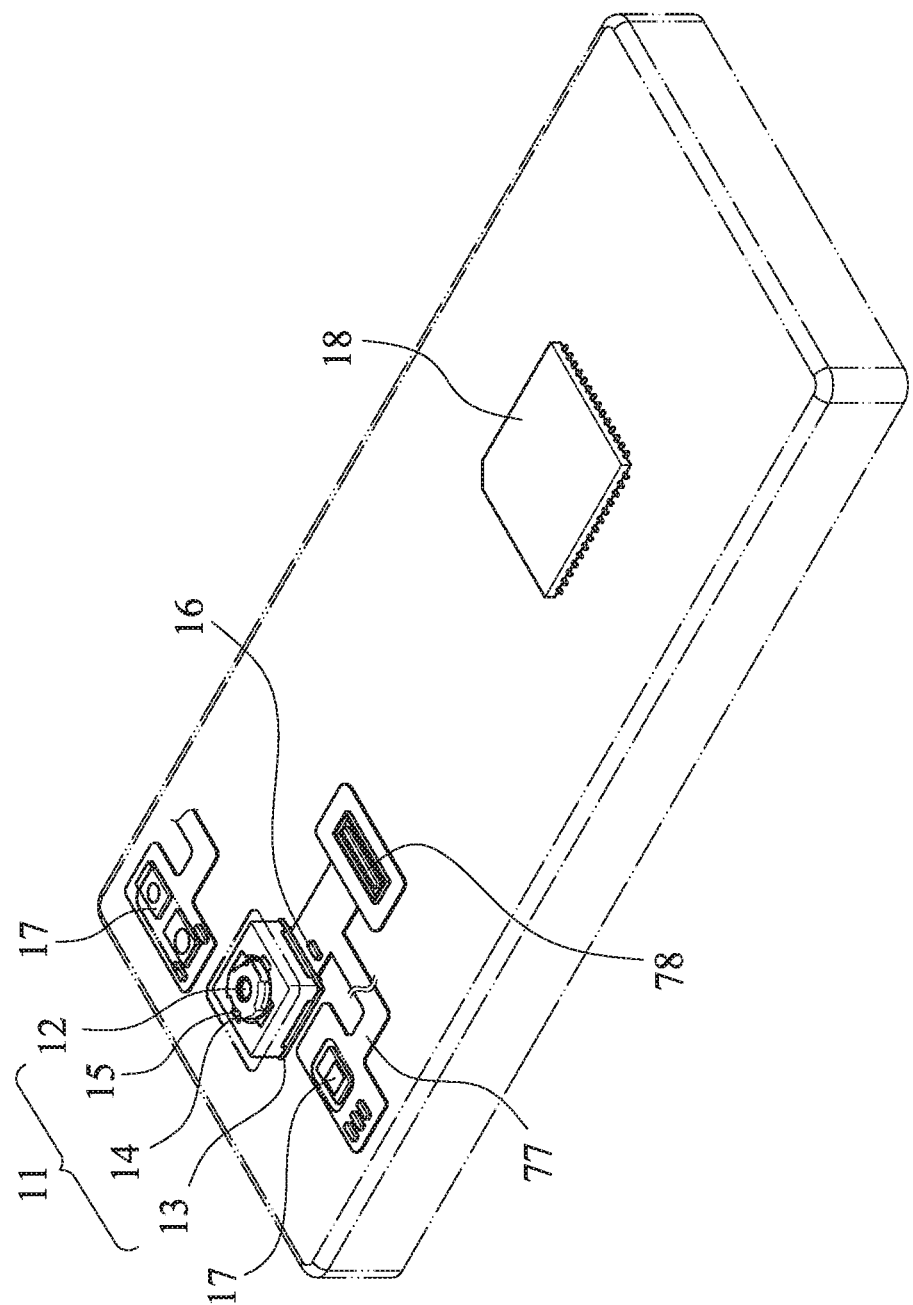
FIG. 13B shows another schematic view of the electronic device according to the 13th embodiment.

FIG. 13A shows a schematic view of an electronic device 10 according to the 13th embodiment of the present disclosure, FIG. 13B shows another schematic view of the electronic device 10 according to the 13th embodiment, and particularly, FIG. 13A and FIG. 13B are schematic views related to a camera of the electronic device 10. In FIG. 13A and FIG. 13B, the electronic device 10 of the 13th embodiment is a smart phone, wherein the electronic device 10 includes a camera module 11. The camera module 11 includes an imaging lens assembly 12 according to the present disclosure and an image sensor 13, wherein the image sensor 13 is disposed on an image surface (not shown in drawings) of the imaging lens assembly 12. Therefore, a better image quality can be achieved, and hence the high-end imaging requirements of modern electronic devices can be satisfied.

Furthermore, the user activates the capturing mode via a user interface 19 of the electronic device 10, wherein the user interface 19 of the 13th embodiment can be a touch screen 19a, a button 19b and etc. At this moment, the imaging light is converged on the image sensor 13 of the imaging lens assembly 12, and the electronic signal associated with image is output to an image signal processor (ISP) 18.

Figure 13C:
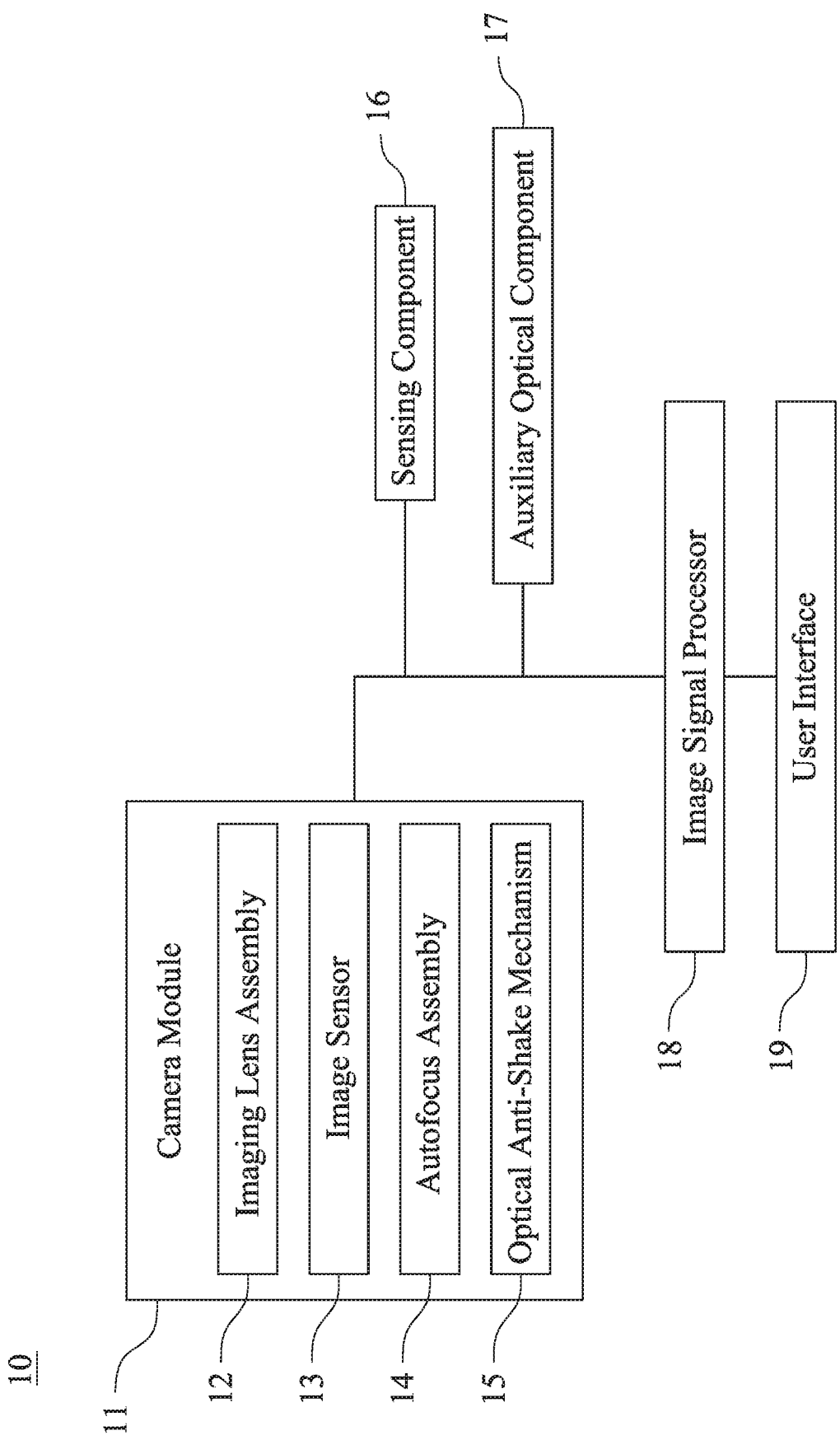
FIG. 13C shows a block diagram of the electronic device according to the 13th embodiment.

FIG. 13C shows a block diagram of the electronic device 10 according to the 13th embodiment, and in particular, the block diagram is related to the camera of the electronic device 10. In FIG. 13A to FIG. 13C, the camera module 11 can further include an autofocus assembly 14 and an optical anti-shake mechanism 15 based on the camera specification of the electronic device 10. Moreover, the electronic device 10 can further include at least one auxiliary optical component 17 and at least one sensing component 16. The auxiliary optical component 17 can be a flash module for compensating for the color temperature, an infrared distance measurement component, a laser focus module and etc. The sensing component 16 can have functions for sensing physical momentum and kinetic energy, and thereby can be an accelerator, a gyroscope, and a hall effect element, to sense shaking or jitters applied by hands of the user or external environments. Accordingly, the functions of the autofocus assembly 14 and the optical anti-shake mechanism 15 of the camera module 11 can be aided and enhanced to achieve the superior image quality. Furthermore, the electronic device 10 according to the present disclosure can have a capturing function with multiple modes, such as taking optimized selfies, high dynamic range (HDR) under a low light condition, 4K resolution recording, etc. Additionally, the user can visually see the captured image of the camera through the touch screen 19a and manually operate the view finding range on the touch screen 19a to achieve the auto focus function of what you see is what you get.

Furthermore, in FIG. 13B, the camera module 11, the sensing component 16 and the auxiliary optical component 17 can be disposed on a flexible printed circuit board (FPC) 77 and electrically connected with the associated components, such as the imaging signal processor 18, via a connector 78 to perform a capturing process. Since the current electronic devices, such as smart phones, have a tendency of being compact, the way of firstly disposing the camera module and related components on the flexible printed circuit board and secondly integrating the circuit thereof into the main board of the electronic device via the connector can satisfy the requirements of the mechanical design and the circuit layout of the limited space inside the electronic device, and obtain more margins. The autofocus function of the camera module can also be controlled more flexibly via the touch screen of the electronic device. In the 13th embodiment, the electronic device 10 includes a plurality of sensing components 16 and a plurality of auxiliary optical components 17. The sensing components 16 and the auxiliary optical components 17 are disposed on the flexible printed circuit board 77 and at least one other flexible printed circuit board (its reference numeral is omitted) and electrically connected with the associated components, such as the image signal processor 18, via corresponding connectors to perform the capturing process. In other embodiments (not shown herein), the sensing components and the auxiliary optical components can also be disposed on the main board of the electronic device or carrier boards of other types according to requirements of the mechanical design and the circuit layout.

In addition, the electronic device 10 can further include but not be limited to a wireless communication unit, a control unit, a storage unit, a random access memory, a read-only memory, or a combination thereof.

14th Embodiment

Figure 14:
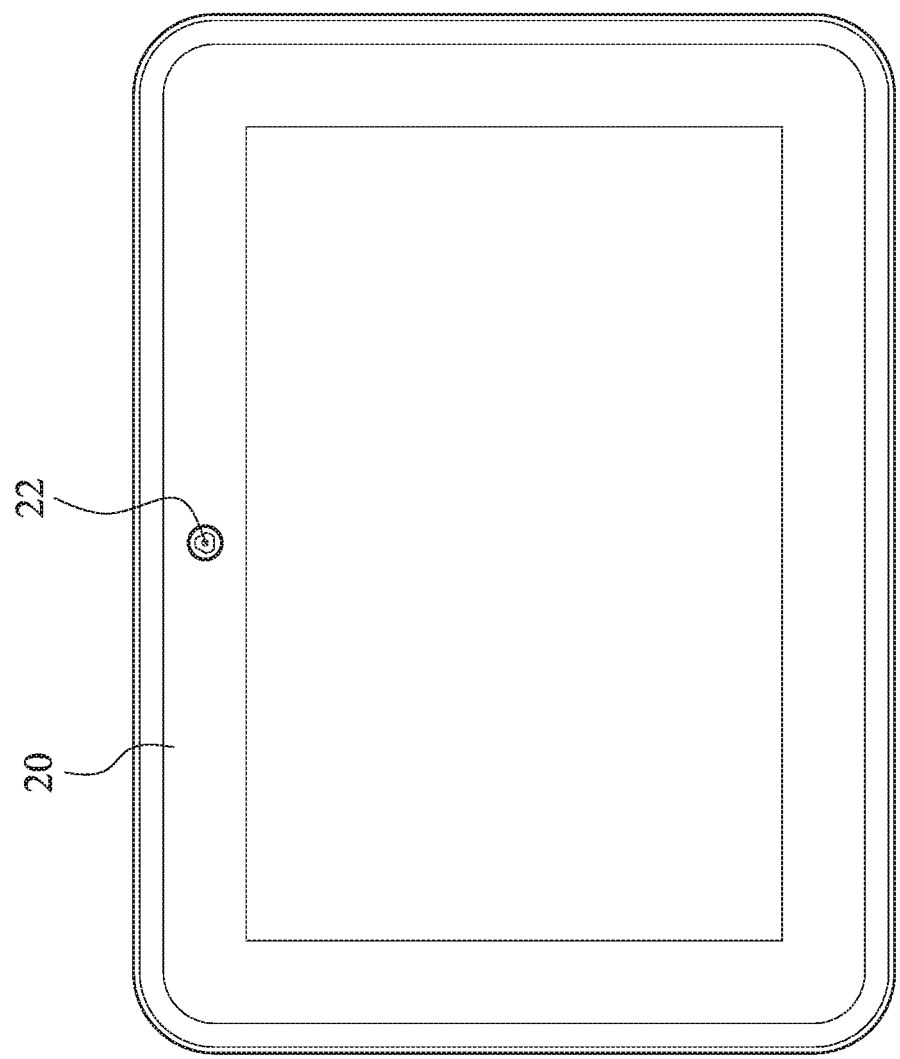
FIG. 14 shows an electronic device according to the 14th embodiment of the present disclosure.

FIG. 14 shows an electronic device 20 according to the 14th embodiment of the present disclosure. The electronic device 20 of the 14th embodiment is a tablet personal computer. The electronic device 20 includes an imaging lens assembly 22 according to the present disclosure and an image sensor (not shown in drawings), wherein the image sensor is disposed on an image surface (not shown in drawings) of the imaging lens assembly 22.

15th Embodiment

Figure 15:
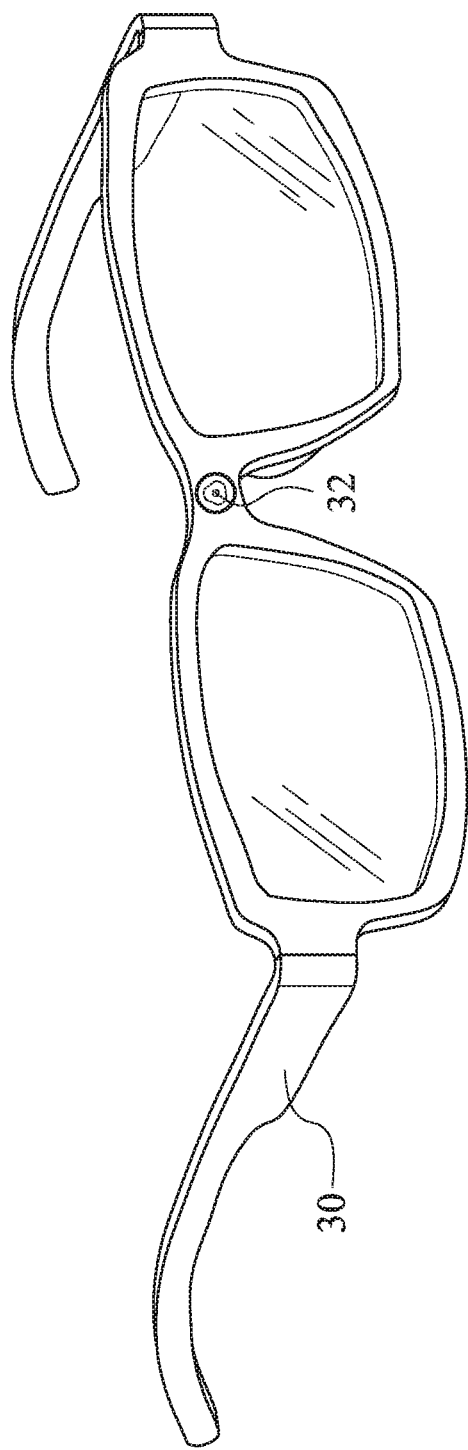
FIG. 15 shows an electronic device according to the 15th embodiment of the present disclosure.
Figure 16:
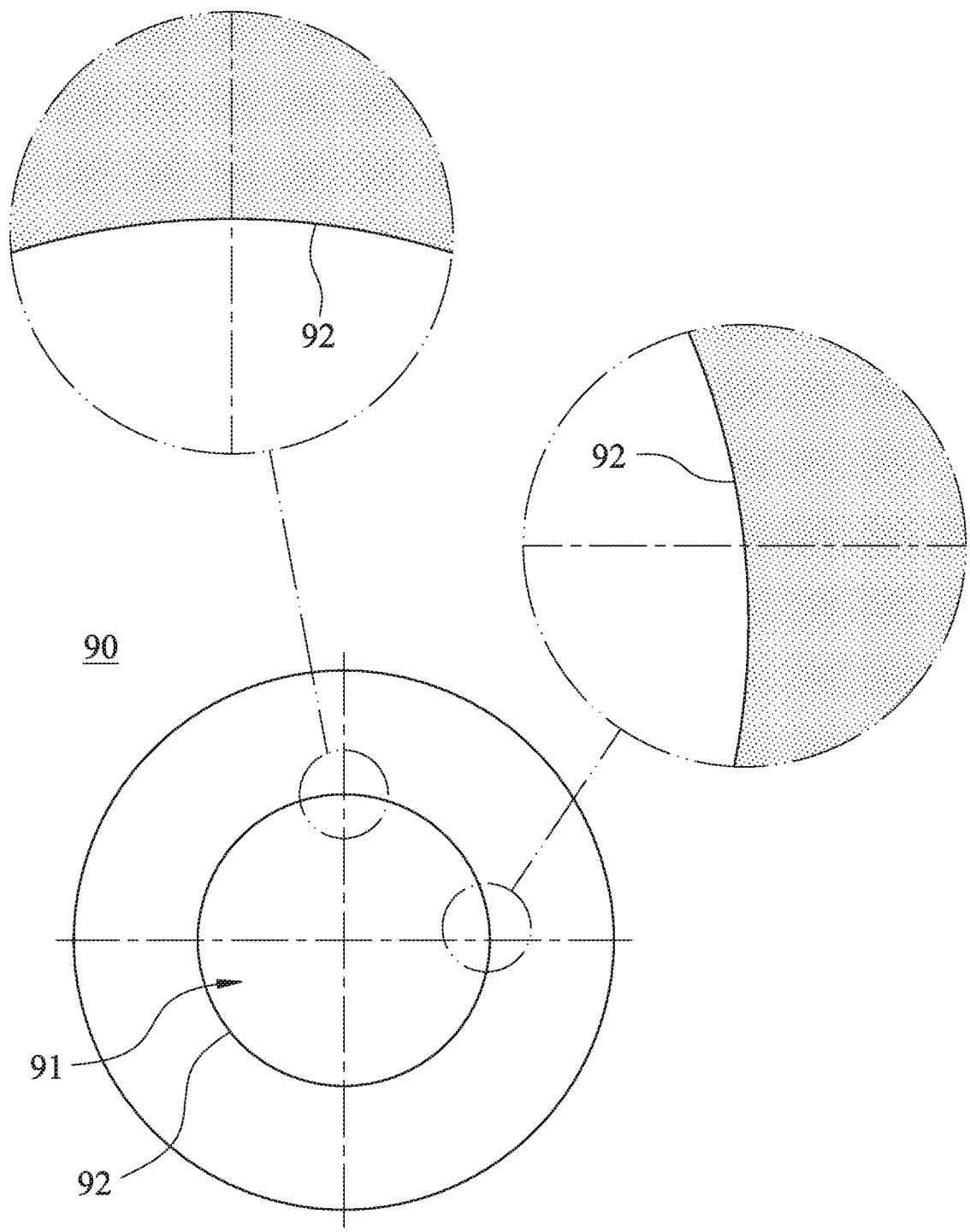
FIG. 16 is a schematic view of a conventional light blocking sheet.

FIG. 15 shows an electronic device 30 according to the 15th embodiment of the present disclosure. The electronic device 30 of the 15th embodiment is a wearable device. The electronic device 30 includes an imaging lens assembly 32 according to the present disclosure and an image sensor (not shown in drawings), wherein the image sensor is disposed on an image surface (not shown in drawings) of the imaging lens assembly 32.

Although the present disclosure has been described in considerable detail with reference to the embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims.

What is claimed is:

1. An optical lens set, comprising:
   a light blocking sheet having a central axis and comprising:
     a central hole, wherein the central axis passes through the central hole, which is enclosed by a hole inner surface, the hole inner surface has a first corresponding circle and a second corresponding circle, and a diameter of the first corresponding circle is greater than a diameter of the second corresponding circle; and
     a plurality of inner extended portions adjacent to and surrounding the central hole, wherein each of the inner extended portions is extended and tapered from the first corresponding circle towards the second corresponding circle and comprises an inner surface; and
   at least two lens elements, wherein one lens element thereof comprises a first connecting structure, the first connecting structure comprises a first receiving surface and a first conical surface, another lens element thereof comprises a second connecting structure, the second connecting structure comprises a second receiving surface and a second conical surface, the first receiving surface and the second receiving surface are corresponding and connected to each other, the first conical surface and the second conical surface are corresponding and connected to each other, the first connecting structure and the second connecting structure are for aligning the one lens element and the another lens element with the central axis, and an outer diameter of the light blocking sheet is smaller than an outer diameter of the one lens element and an outer diameter of the another lens element;

wherein a receiving space is defined by the one lens element and the another lens element, the receiving space is closer to the central axis than both the first conical surface and the second conical surface are to the central axis, the light blocking sheet is received in the receiving space, and the outer diameter of the light blocking sheet is smaller than or equal to a minimum diameter of the first conical surface and a minimum diameter of the second conical surface wherein the diameter of the first corresponding circle is φ1, the diameter of the second corresponding circle is φ2, a distance between two ends of the inner surface of each of the inner extended portions is w, and the following conditions are satisfied:

φ1>φ2; and 0.02<π×(φ1−φ2)/(2×w)<0.9.

2. An imaging lens assembly, comprising:
the optical lens set of claim 1; and
a plastic barrel, wherein the optical lens set with the light blocking sheet is disposed along the central axis in the plastic barrel, the plastic barrel comprises a barrel hole, and a minimum diameter position of the barrel hole and the central hole of the light blocking sheet are corresponding to each other along the central axis.

3. The imaging lens assembly of claim 2, wherein the minimum diameter position of the barrel hole is an aperture stop of the imaging lens assembly.

4. The imaging lens assembly of claim 2, wherein the central hole of the light blocking sheet is an aperture stop of the imaging lens assembly.

5. An electronic device, comprising:
the imaging lens assembly of claim 2; and
an image sensor disposed on an image surface of the imaging lens assembly.

6. An imaging lens assembly, comprising:
an optical lens set comprising:
a light blocking sheet having a central axis and comprising:
a central hole, wherein the central axis passes through the central hole, which is enclosed by a hole inner surface, the hole inner surface has a first corresponding circle and a second corresponding circle, and a diameter of the first corresponding circle is greater than a diameter of the second corresponding circle; and
a plurality of inner extended portions adjacent to and surrounding the central hole, wherein each of the inner extended portions is extended and tapered from the first corresponding circle towards the second corresponding circle and comprises an inner surface; and
at least two lens elements, wherein the light blocking sheet is disposed between one lens element thereof and another lens element thereof; and
a plastic barrel, wherein the optical lens set with the light blocking sheet is disposed along the central axis in the plastic barrel, and the plastic barrel comprises:
a barrel hole, wherein a minimum diameter position of the barrel hole and the central hole of the light blocking sheet are corresponding to each other along the central axis;
an object-end portion;
an image-end portion disposed opposite to the object-end portion and comprising an outer image-end surface, wherein the outer image-end surface faces an image surface of the imaging lens assembly; and
a tube portion connecting the object-end portion and the image-end portion;

wherein the diameter of the first corresponding circle is φ1, the diameter of the second corresponding circle is φ2, a distance between two ends of the inner surface of each of the inner extended portions is w, the minimum diameter position of the barrel hole is located at the object-end portion, a distance parallel to the central axis between the minimum diameter position of the barrel hole and the outer image-end surface is T, a distance parallel to the central axis between the central hole of the light blocking sheet and the minimum diameter position of the barrel hole is t, and the following conditions are satisfied:

φ1>φ2;

0.02<π×(φ1−φ2)/(2×w)<0.9; and 0.01<t/T<0.5.

7. An electronic device, comprising:
the imaging lens assembly of claim 6; and
an image sensor disposed on an image surface of the imaging lens assembly.

* * * * *